United States Patent
Chang et al.

(10) Patent No.: US 10,718,911 B2
(45) Date of Patent: Jul. 21, 2020

(54) ULTRA-SMALL FORM FACTOR OPTICAL CONNECTORS USING A PUSH-PULL BOOT RECEPTACLE RELEASE

(71) Applicant: SENKO Advanced Components, Inc., Marlborough, MA (US)

(72) Inventors: Jimmy Jun-Fu Chang, Worcester, MA (US); Kazuyoshi Takano, Southborough, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/103,555

(22) Filed: Aug. 14, 2018

(65) Prior Publication Data
US 2019/0064447 A1    Feb. 28, 2019
US 2020/0142132 A9    May 7, 2020

Related U.S. Application Data

(63) Continuation-in-part of application No. 16/035,691, filed on Jul. 15, 2018, now Pat. No. 10,281,668.
(Continued)

(51) Int. Cl.
G02B 6/42    (2006.01)
G02B 6/38    (2006.01)
G02B 6/40    (2006.01)

(52) U.S. Cl.
CPC .......... *G02B 6/387* (2013.01); *G02B 6/3825* (2013.01); *G02B 6/3879* (2013.01);
(Continued)

(58) Field of Classification Search
USPC ................................................... 385/78, 135
See application file for complete search history.

(56) References Cited

U.S. PATENT DOCUMENTS 3,721,945 A    3/1973    Hults
4,150,790 A    4/1979    Potter
(Continued)

FOREIGN PATENT DOCUMENTS

CN    2836038 Y    11/2006
CN    201383588 Y    1/2010
(Continued)

OTHER PUBLICATIONS

PCT/US2018/062406 International Search Report dated Mar. 18, 2019.
(Continued)

Primary Examiner — Eric Wong
(74) Attorney, Agent, or Firm — Edward S. Jarmolowicz, Esq.

(57) ABSTRACT

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A connector is released by pulling distally on boot assembly until receptacle hook is displaced from receptacle hook recess at a proximal end of connector.

17 Claims, 71 Drawing Sheets

Related U.S. Application Data

(60) Provisional application No. 62/649,539, filed on Mar. 28, 2018, provisional application No. 62/588,276, filed on Nov. 17, 2017, provisional application No. 62/549,655, filed on Aug. 24, 2017.

(52) U.S. Cl.
CPC ......... *G02B 6/3887* (2013.01); *G02B 6/3893* (2013.01); *G02B 6/403* (2013.01); *G02B 6/406* (2013.01); *G02B 6/4292* (2013.01); *G02B 6/3821* (2013.01)

(56) References Cited

U.S. PATENT DOCUMENTS

| | | |
|---|---|---|
| 4,240,695 A | 12/1980 | Evans |
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |
| 4,872,736 A | 10/1989 | Myers |
| 4,979,792 A | 12/1990 | Weber |
| 5,026,138 A | 6/1991 | Boudreau |
| 5,031,981 A | 7/1991 | Peterson |
| 5,041,025 A | 8/1991 | Haitmanek |
| 5,073,045 A | 12/1991 | Abendschein |
| D323,143 S | 1/1992 | Ohkura |
| 5,101,463 A | 3/1992 | Cubukciyan |
| 5,146,813 A | 9/1992 | Stanfill, Jr. |
| 5,159,652 A | 10/1992 | Grassin D'Alphonse |
| 5,265,181 A | 11/1993 | Chang |
| 5,289,554 A | 2/1994 | Cubukciyan |
| 5,315,679 A | 5/1994 | Baldwin |
| 5,317,663 A | 5/1994 | Beard |
| 5,321,784 A | 6/1994 | Cubukciyan et al. |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,862,282 A | 1/1999 | Matsuura |
| 5,915,987 A | 6/1999 | Reed |
| 5,930,426 A | 7/1999 | Harting |
| 5,937,130 A | 8/1999 | Amberg |
| 5,953,473 A | 9/1999 | Shimotsu |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,250,817 B1 | 6/2001 | Lampert et al. |
| 6,276,840 B1 | 8/2001 | Weiss |
| 6,318,903 B1 | 11/2001 | Andrews et al. |
| 6,364,537 B1 | 4/2002 | Maynard |
| 6,379,052 B1 | 4/2002 | de Jong |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,527,450 B1 | 3/2003 | Miyachi |
| 6,530,696 B1 | 3/2003 | Ueda |
| 6,551,117 B2 | 4/2003 | Poplawski |
| 6,565,262 B2 | 5/2003 | Childers |
| 6,572,276 B1 | 6/2003 | Theis |
| 6,579,014 B2 | 6/2003 | Melton |
| 6,585,194 B1 | 7/2003 | Brushwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,817,272 B2 | 11/2004 | Holland |
| 6,854,894 B1 | 2/2005 | Yunker |
| 6,869,227 B2 | 3/2005 | Del Grosso |
| 6,872,039 B2 | 3/2005 | Ba |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,091,421 B2 | 8/2006 | Kukita |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kuda |
| 7,473,124 B1 | 1/2009 | Briant |
| 7,510,335 B1 | 3/2009 | Su |
| 7,513,695 B1 | 4/2009 | Lin |
| 7,534,128 B2 | 5/2009 | Caveney et al. |
| 7,540,666 B2 | 6/2009 | Luther |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden et al. |
| 7,695,199 B2 | 4/2010 | Teo |
| 7,712,970 B1 | 5/2010 | Lee |
| 7,717,625 B2 | 5/2010 | Margolin |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,414,196 B2 | 4/2013 | Lu |
| 8,465,317 B2 | 6/2013 | Gniadek |
| 8,534,928 B2 | 9/2013 | Cooke |

(56) References Cited

U.S. PATENT DOCUMENTS

| | | |
|---|---|---|
| 8,550,728 B2 | 10/2013 | Takahashi |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,757,894 B2 | 6/2014 | Katoh |
| 8,764,308 B2 | 7/2014 | Irwin |
| 8,770,863 B2 | 7/2014 | Cooke |
| 8,869,661 B2 | 10/2014 | Opstad |
| 9,052,474 B2 | 6/2015 | Jiang |
| 9,063,296 B2 | 6/2015 | Dong |
| 9,250,402 B2 | 2/2016 | Ishii et al. |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |
| 9,581,768 B1 | 2/2017 | Baca |
| 9,599,778 B2 | 3/2017 | Wong |
| 9,658,409 B2 | 5/2017 | Gniadek |
| 9,678,283 B1 | 6/2017 | Chang et al. |
| 9,684,130 B2 | 6/2017 | Veatch et al. |
| 9,684,313 B2 | 6/2017 | Chajec |
| 9,709,753 B1 | 7/2017 | Chang |
| 9,778,425 B2 | 10/2017 | Nguyen |
| 9,829,645 B2 | 11/2017 | Good |
| 9,829,653 B1 | 11/2017 | Nishiguchi |
| 9,869,825 B2 | 1/2018 | Bailey |
| 9,880,361 B2 | 1/2018 | Childers |
| 9,946,035 B2 | 4/2018 | Gtafson |
| 9,989,711 B2 | 6/2018 | Ott et al. |
| 10,031,296 B2 | 7/2018 | Good |
| 10,067,301 B2 | 9/2018 | Murray et al. |
| 10,107,972 B1 | 10/2018 | Gniadek et al. |
| 10,114,180 B2 | 10/2018 | Suzic |
| 10,146,011 B2 | 12/2018 | Nhep |
| 2002/0168148 A1 | 11/2002 | Gilliland |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0036744 A1 | 2/2005 | Caveney et al. |
| 2005/0111796 A1 | 5/2005 | Matasek |
| 2006/0013539 A1 | 1/2006 | Thaler |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki |
| 2006/0160429 A1 | 7/2006 | Dawiedczyk |
| 2006/0193562 A1 | 8/2006 | Theuerkorn |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149028 A1* | 6/2007 | Yu .................. G02B 6/4292 439/352 |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin et al. |
| 2008/0064334 A1 | 3/2008 | Hamadi |
| 2008/0226237 A1 | 9/2008 | O'Riorden et al. |
| 2009/0022457 A1 | 1/2009 | de Jong |
| 2009/0028507 A1 | 1/2009 | Jones |
| 2009/0047818 A1 | 2/2009 | Irwin et al. |
| 2009/0176401 A1 | 7/2009 | Gu |
| 2009/0196555 A1 | 8/2009 | Lin |
| 2009/0214162 A1 | 8/2009 | O'Riorden |
| 2009/0290938 A1 | 11/2009 | Asaoka |
| 2010/0054668 A1 | 3/2010 | Nelson |
| 2010/0092136 A1 | 4/2010 | Nhep |
| 2010/0220961 A1 | 9/2010 | De Jong et al. |
| 2010/0247041 A1 | 9/2010 | Szilagyi |
| 2010/0061069 A1 | 11/2010 | Cole |
| 2010/0284656 A1 | 11/2010 | Morra |
| 2011/0044588 A1 | 2/2011 | Larson |
| 2011/0058773 A1 | 3/2011 | Peterhans et al. |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2012/0308183 A1 | 12/2012 | Irwin |
| 2012/0328248 A1 | 12/2012 | Larson |
| 2013/0019423 A1 | 1/2013 | Srutkowski |
| 2013/0071067 A1 | 3/2013 | Lin |
| 2013/0094816 A1 | 4/2013 | Lin |
| 2013/0101258 A1 | 4/2013 | Hikosaka |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0308915 A1 | 11/2013 | Buff |
| 2014/0016901 A1 | 1/2014 | Lambourn |
| 2014/0050446 A1 | 2/2014 | Chang |
| 2014/0056562 A1 | 2/2014 | Limbert |
| 2014/0133808 A1 | 5/2014 | Hill |
| 2014/0169727 A1 | 6/2014 | Veatch et al. |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0177463 A1 | 6/2015 | Lee |
| 2015/0198766 A1 | 7/2015 | Takahashi et al. |
| 2015/0212282 A1 | 7/2015 | Lin |
| 2015/0241644 A1 | 8/2015 | Lee |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2016/0131849 A1 | 5/2016 | Takano |
| 2016/0139343 A1 | 5/2016 | Dean, Jr. et al. |
| 2016/0161681 A1 | 6/2016 | Banal, Jr. et al. |
| 2016/0172852 A1 | 6/2016 | Tamura |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0349458 A1 | 12/2016 | Murray et al. |
| 2016/0370545 A1 | 12/2016 | Jiang |
| 2017/0003458 A1 | 1/2017 | Gniadek |
| 2017/0205587 A1 | 7/2017 | Chang et al. |
| 2017/0205590 A1 | 7/2017 | Bailey et al. |
| 2017/0205591 A1 | 7/2017 | Takano et al. |
| 2017/0212313 A1 | 7/2017 | Elenabaas |

(56) References Cited

U.S. PATENT DOCUMENTS

| | | |
|---|---|---|
| 2017/0212316 A1 | 7/2017 | Takano et al. |
| 2017/0254961 A1 | 9/2017 | Kamada et al. |
| 2017/0276275 A1 | 9/2017 | Beemer et al. |
| 2017/0276887 A1 | 9/2017 | Allen |
| 2017/0343740 A1 | 11/2017 | Nguyen |
| 2018/0128988 A1 | 5/2018 | Chang |
| 2018/0156988 A1 | 6/2018 | Gniadek |
| 2018/0172923 A1 | 6/2018 | Bauco |
| 2018/0252872 A1 | 9/2018 | Chen |
| 2018/0341069 A1 | 11/2018 | Takano |
| 2019/0204513 A1 | 7/2019 | Davidson et al. |

FOREIGN PATENT DOCUMENTS

| | | |
|---|---|---|
| DE | 19507669 C2 | 10/1998 |
| DE | 202006011910 U1 | 4/2007 |
| DE | 102006019335 A1 | 10/2007 |
| EP | 1211537 A2 | 6/2002 |
| EP | 1245980 B1 | 6/2006 |
| EP | 1566674 B1 | 5/2009 |
| GB | 2111240 B | 9/1985 |
| JP | 2000089059 A | 3/2000 |
| JP | 03752331 B2 | 3/2006 |
| JP | 2009229545 A | 10/2009 |
| JP | 2009276493 A | 11/2009 |
| JP | 04377820 B2 | 12/2009 |
| KR | 200905382 U | 6/2009 |
| KR | 1371686 B1 | 3/2014 |
| RE | 37080 E1 | 3/2001 |
| TW | 200821653 A | 5/2008 |
| WO | WO2001079904 A2 | 10/2001 |
| WO | WO2004027485 A1 | 4/2004 |
| WO | WO2006007120 A1 | 1/2006 |
| WO | WO2010024851 A2 | 3/2010 |
| WO | WO2012136702 A1 | 10/2012 |
| WO | 2015103783 A1 | 7/2015 |
| WO | 2016019993 A1 | 2/2016 |
| WO | WO2019126333 A1 | 6/2019 |

OTHER PUBLICATIONS

PCT/US2018/062406 The written Opinion dated Mar. 18, 2019.
PCT/US2018/062405 International Search Report dated Apr. 3, 2019.
PCT/US2018/062405 The written Opinion dated Apr. 3, 2019.
PCT/IB2018/056133 Written Opinion dated Jan. 3, 2019.
PCY/IB/056133 Search Report dated Jan. 3, 2019.
Fiber Optic Interconnect Solutions, Tactical Fiber Optic Connector Cables and Termini, 2006, Glenair, Inc., Glendale, California.
Fiber Optic Connectors and Assemblies Catalog, 2009, Huber & Suhner Fiber Optics, Herisau, Switzerland.
Fiber Optic Products Catalog, Nov. 2007, Tyco Electronics Corporation, Harrisburg, Pennsylvania.
Final Office Action, U.S. Appl. No. 16/035,691, dated Feb. 11, 2019, pp. 8.
Non-Final Office Action, U.S. Appl. No. 16/035,695, dated Sep. 28, 2018, pp. 7.
International Search Report and Written Opinion, Application No. PCT/US/2018/042202, pp. 17, dated Dec. 7, 2018.
International Search Report and Written Opinion, Application No. PCT/US19/24718, dated Jun. 26, 2019, pp. 7.
ISR for PCT/US2019/013861, Apr. 8, 2019, 3 pages.
WO for PCT/US2019/013861, Apr. 8, 2019, 11 pages.
International Search Report and Written Opinion for Application No. PCT/US2018/62406 dated Mar. 18, 2019, 12, pages, United States.
International Search Report and Written Opinion for Application No. PCT/US2019/40700 dated Sep. 27, 2019, 12, pages, United States.
International Search Report and Written Opinion for Application No. PCT/US2019/50895 dated Jan. 6, 2020, 12, pages, United States.
International Search Report and Written Opinion for Application No. PCT/US2019/50909 dated Dec. 17, 2019, 11, pages, United States.
International Search Report and Written Opinion for Application No. PCT/US2019/56564 dated Jan. 14, 2020, 14, pages, United States.
International Search Report and Written Opinion, Application No. PCT/US19/46397, dated Nov. 12, 2019, pp. 6.

\* cited by examiner

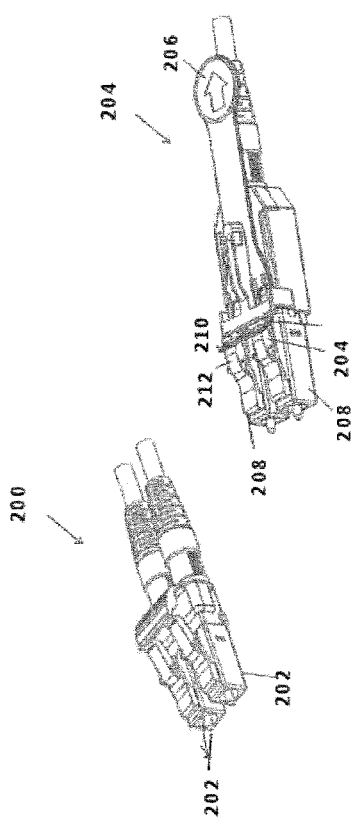

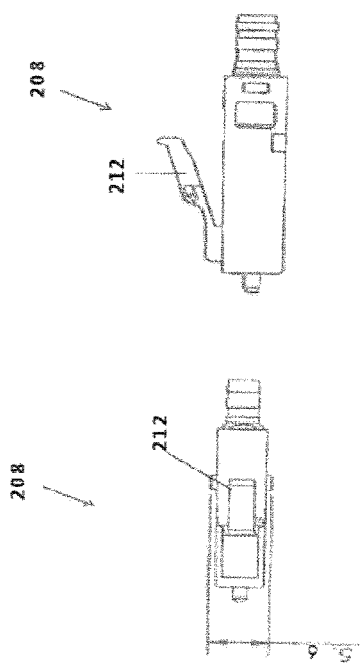

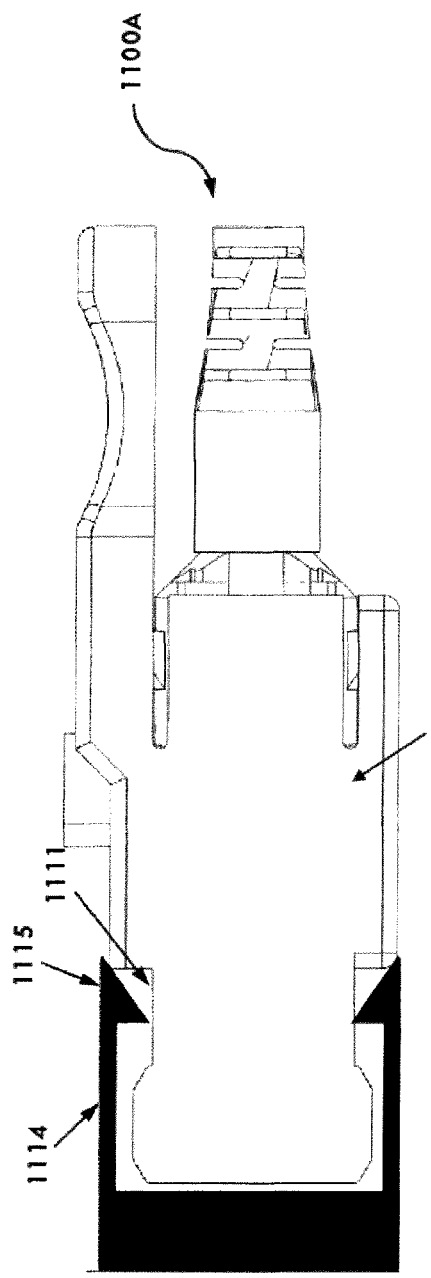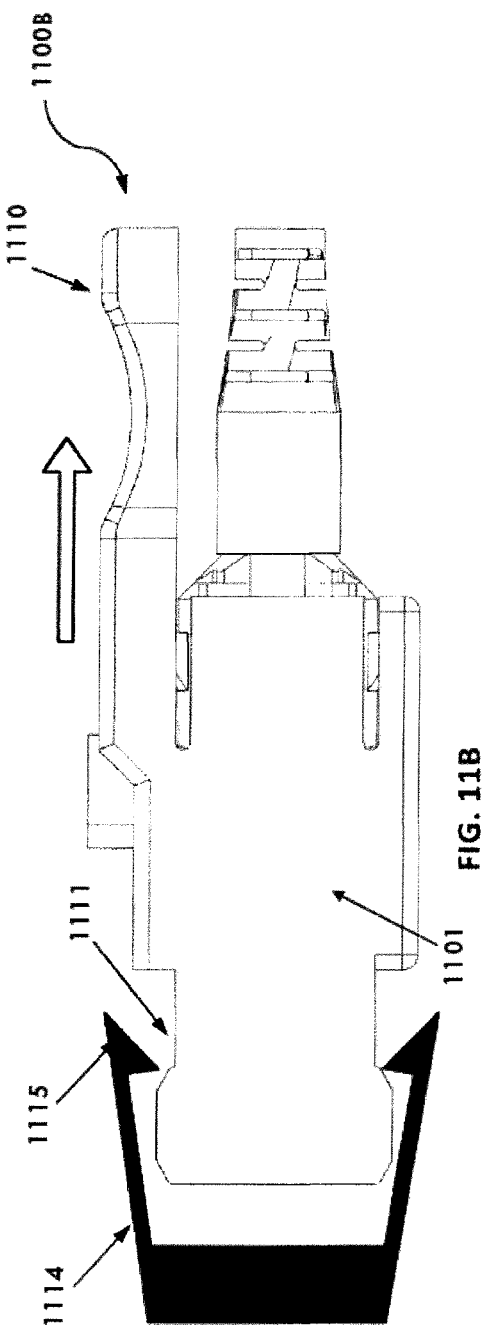

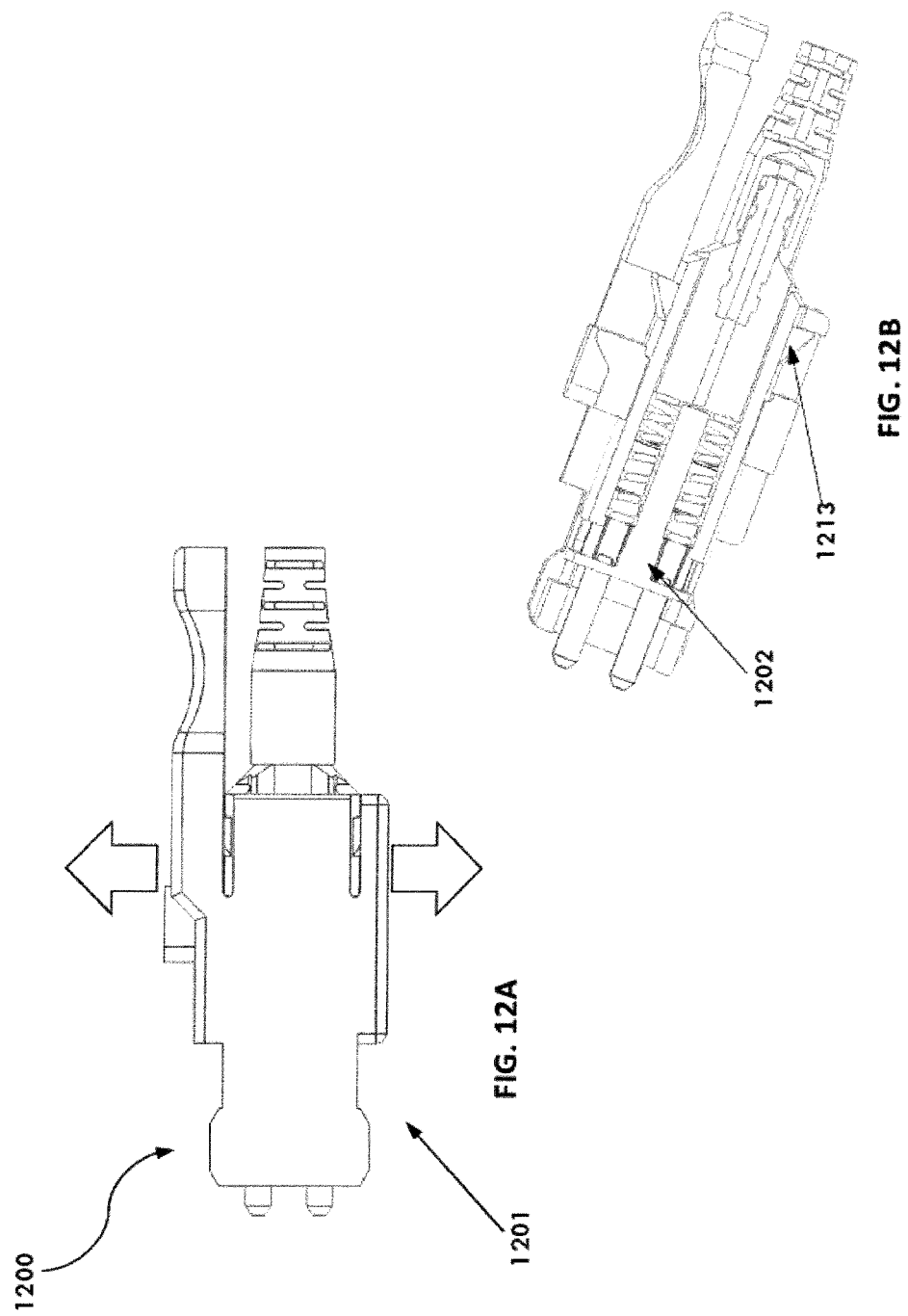

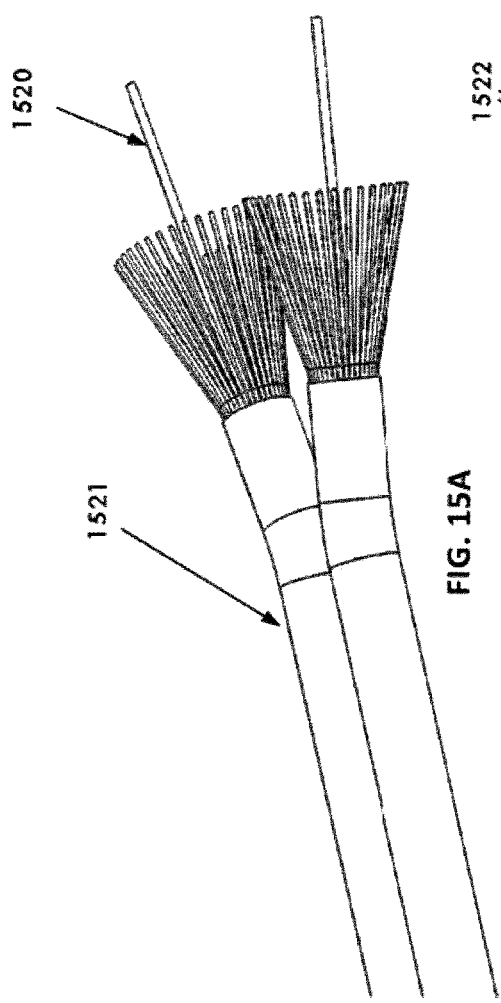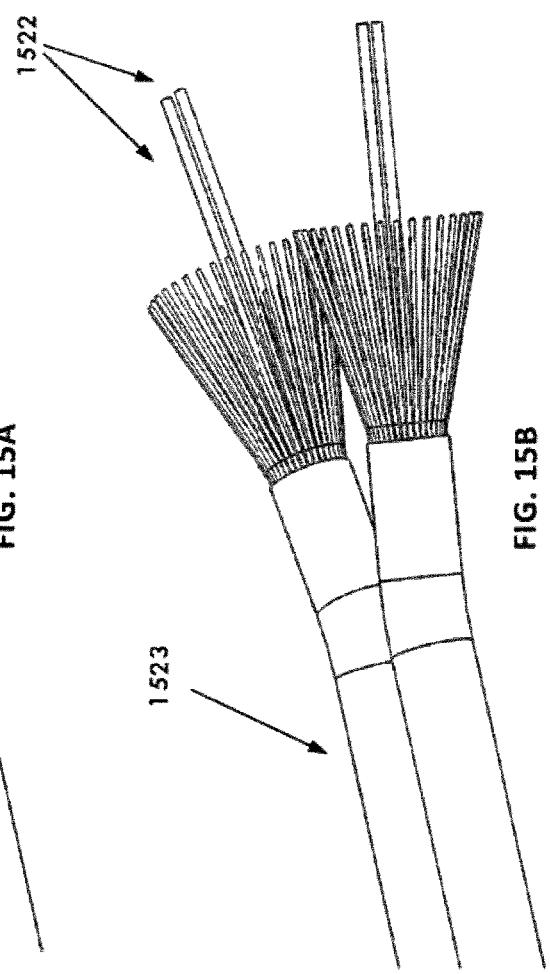
FIG. 15A
FIG. 15B

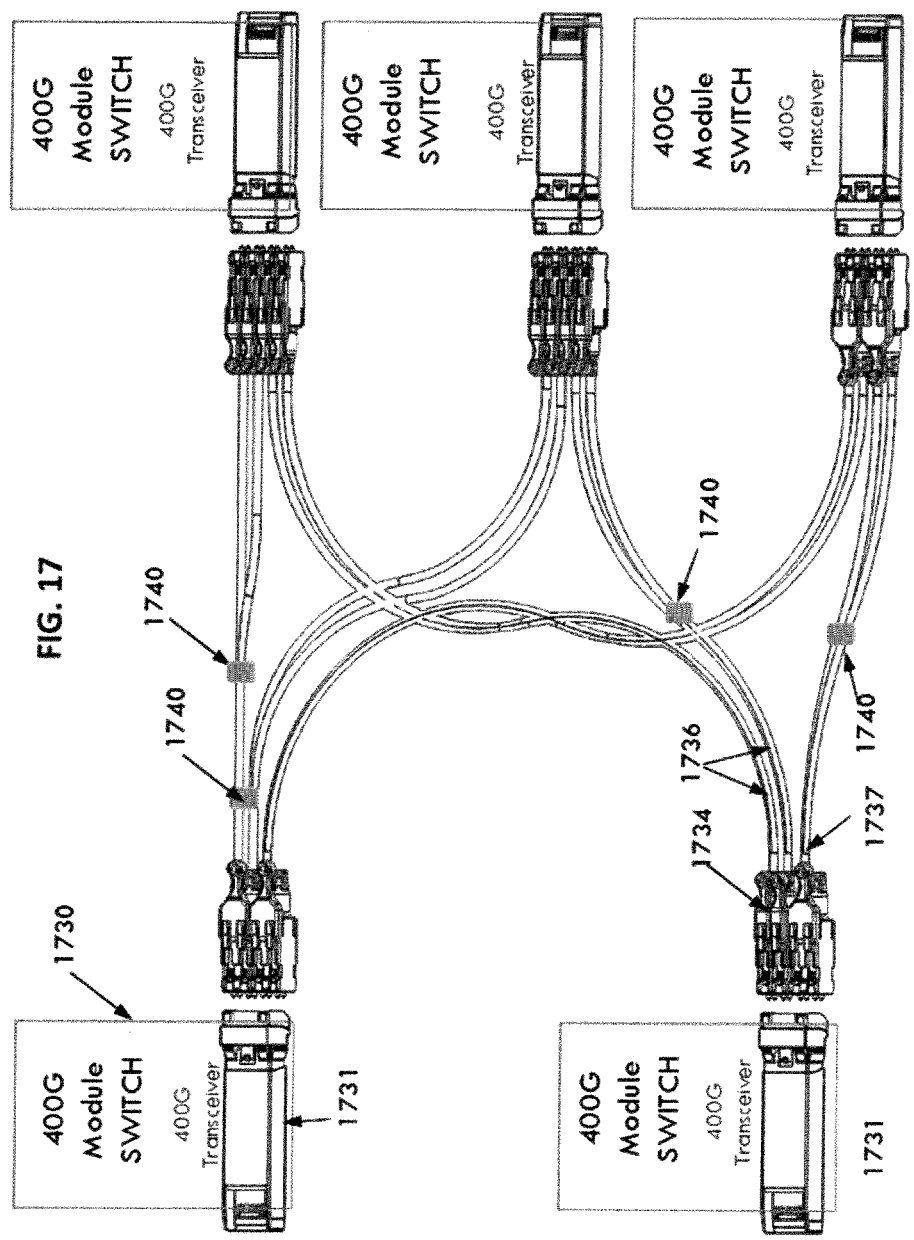

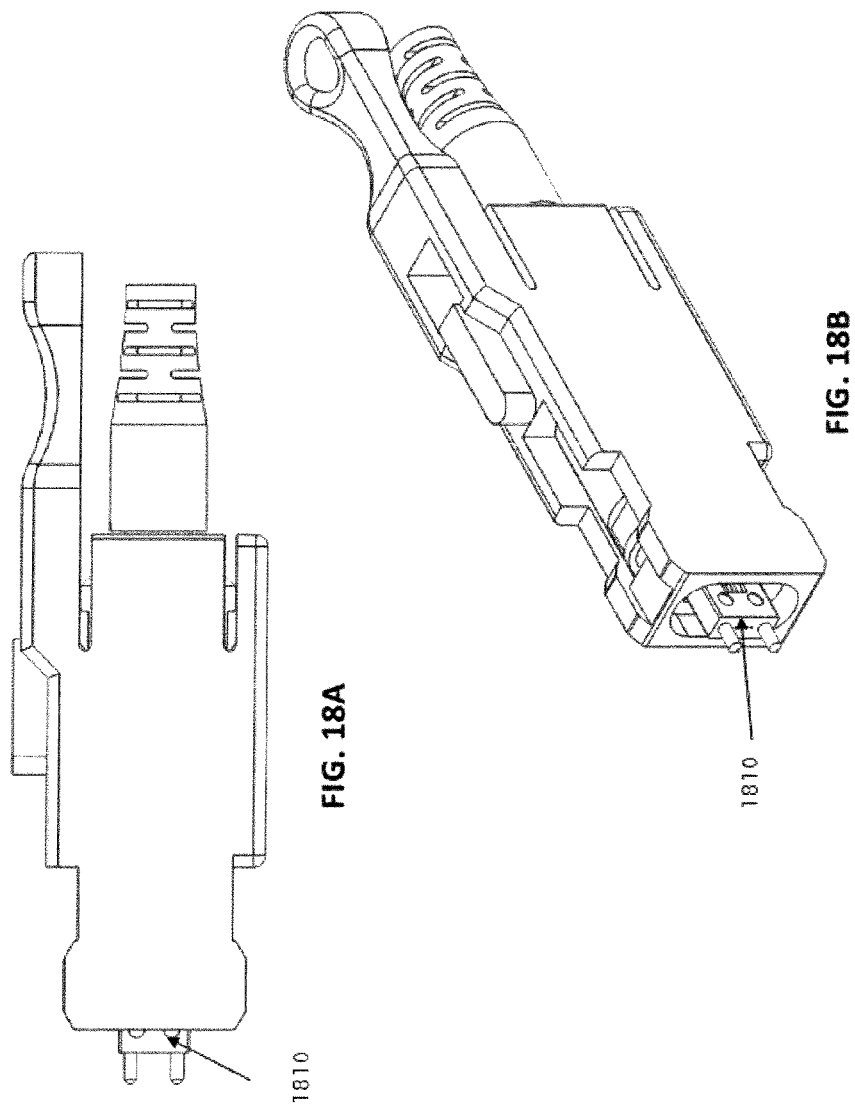

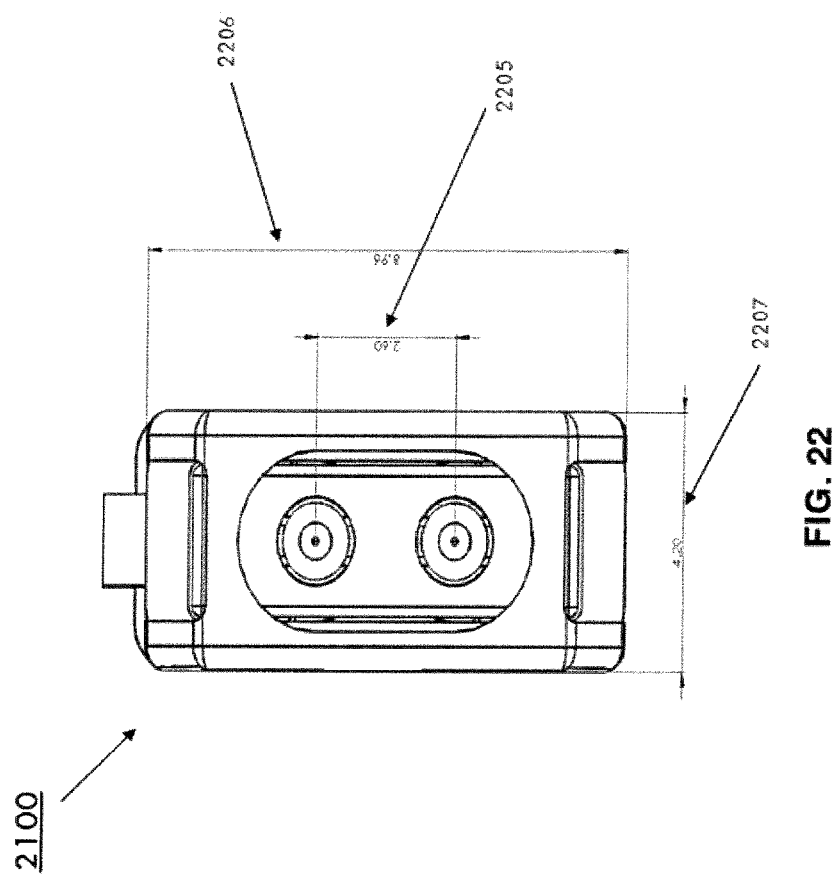

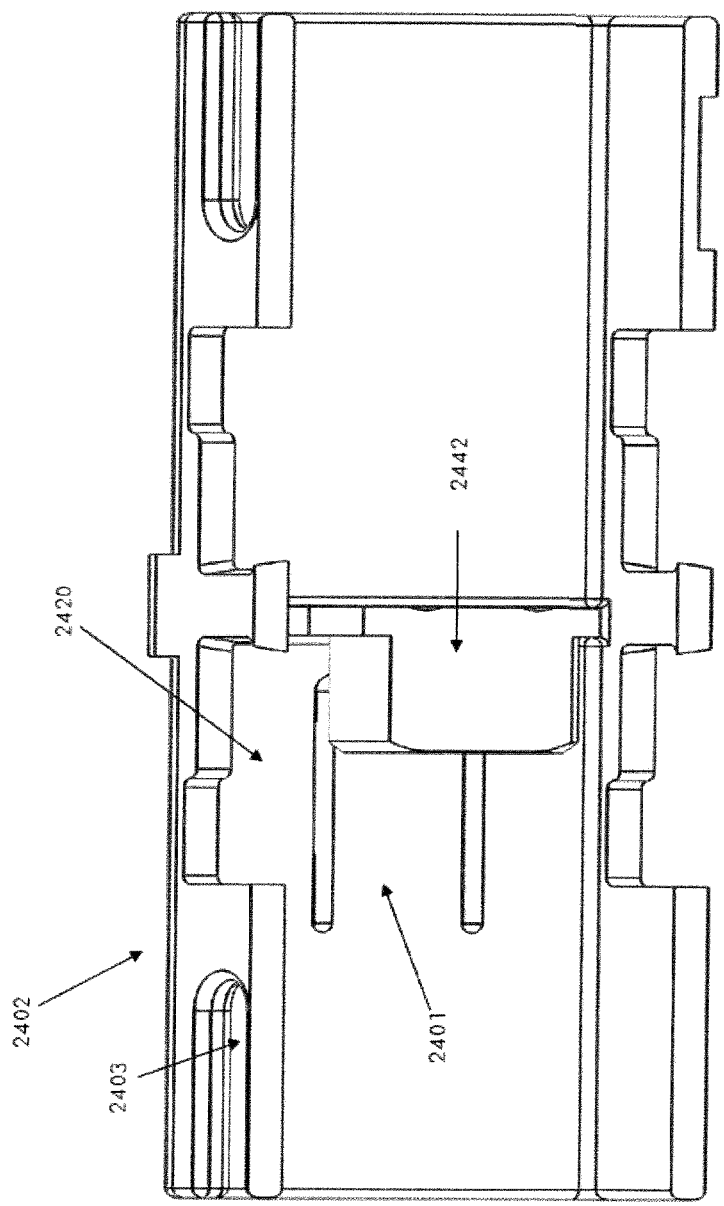

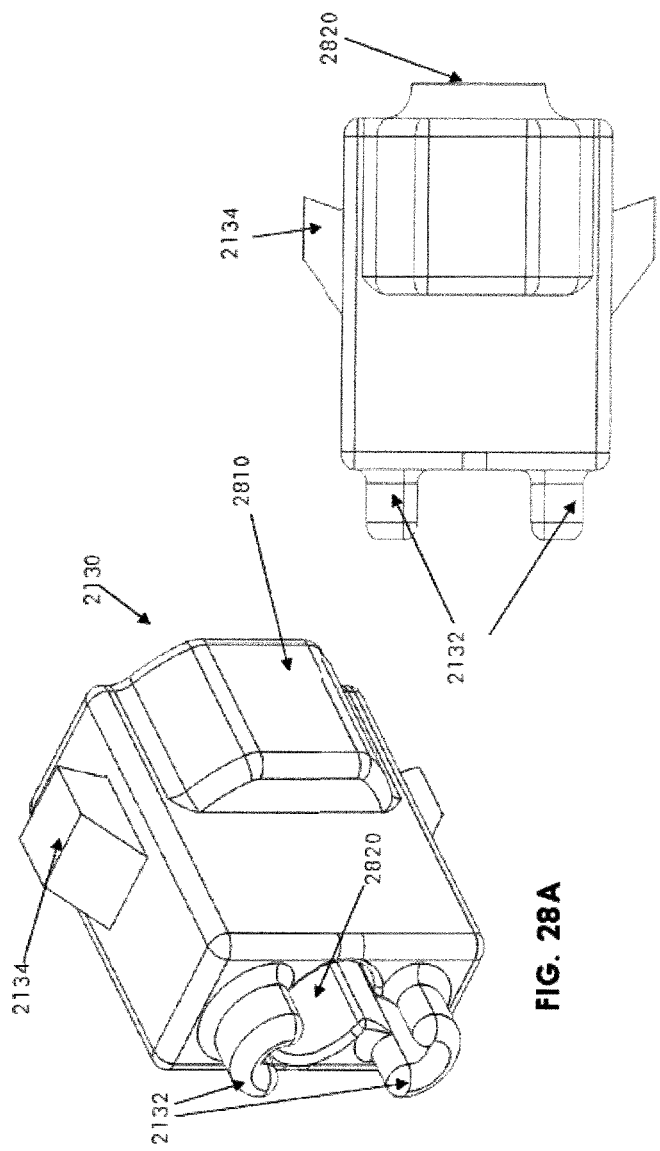

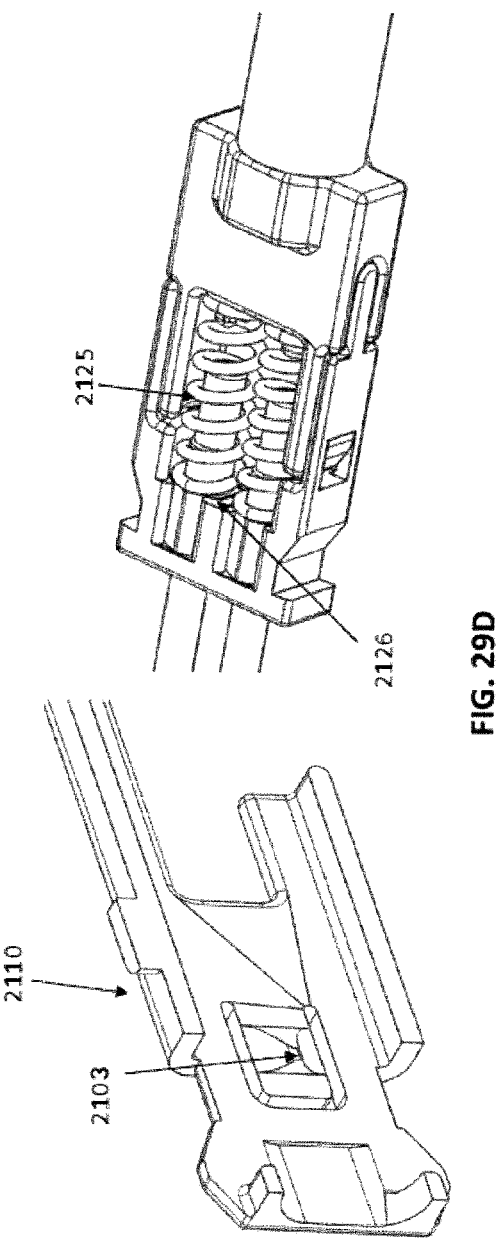

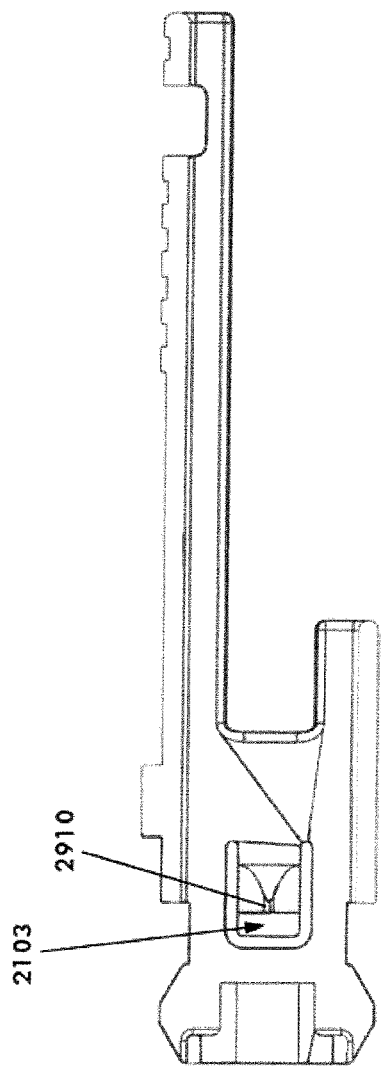

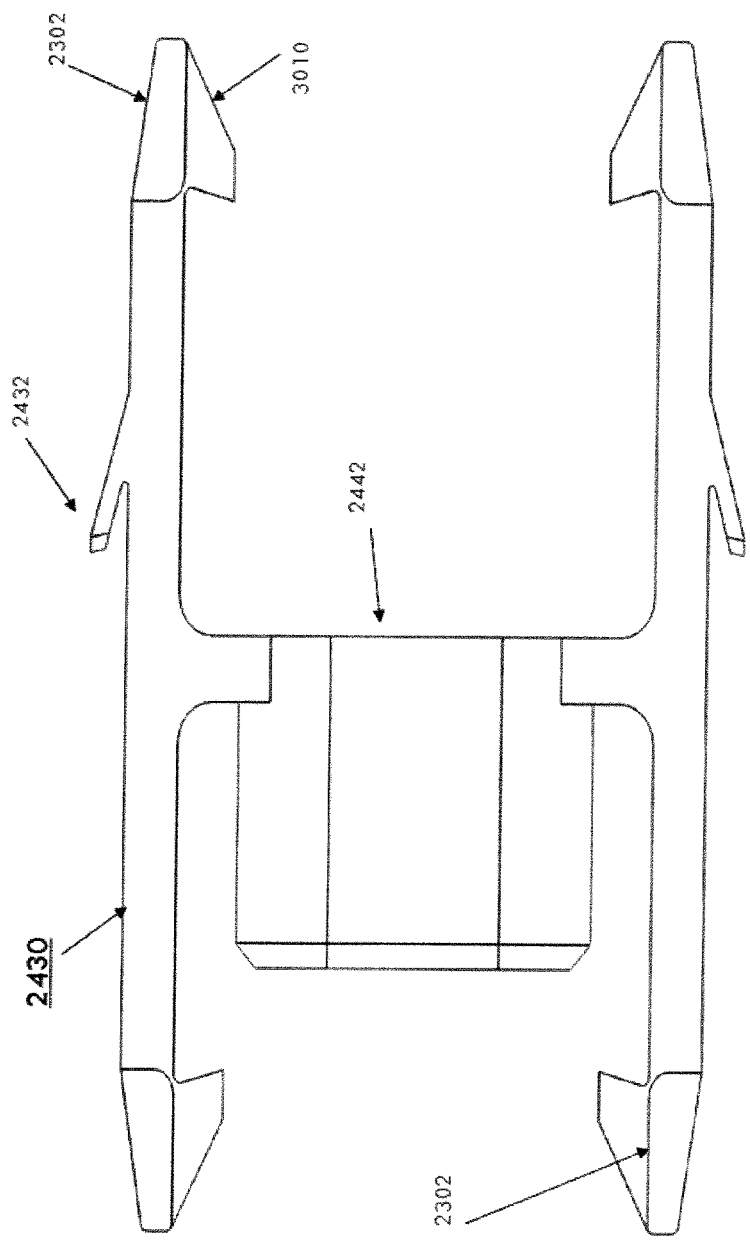

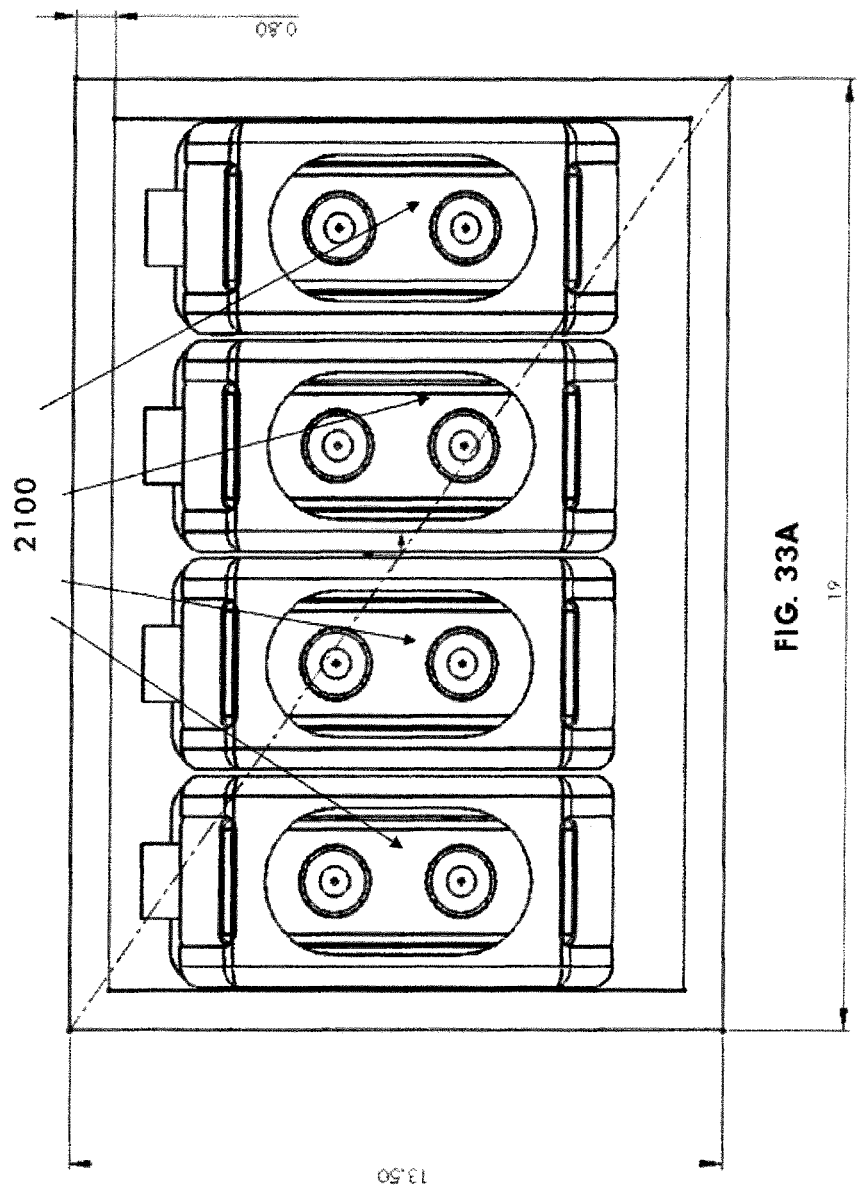

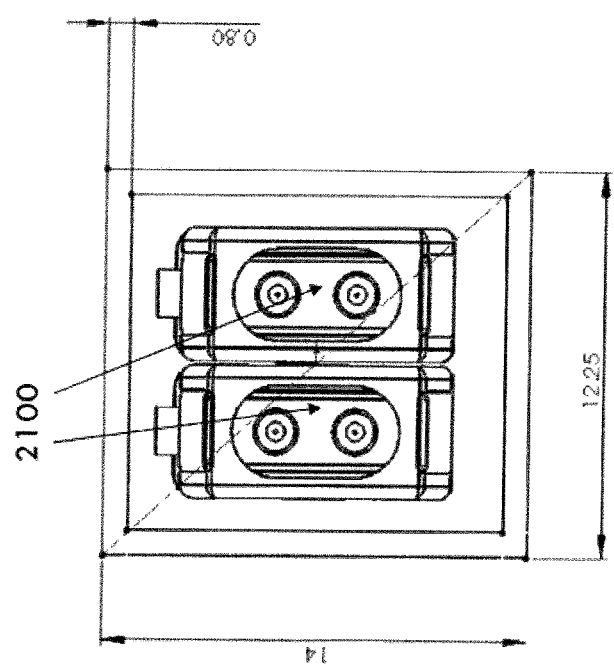

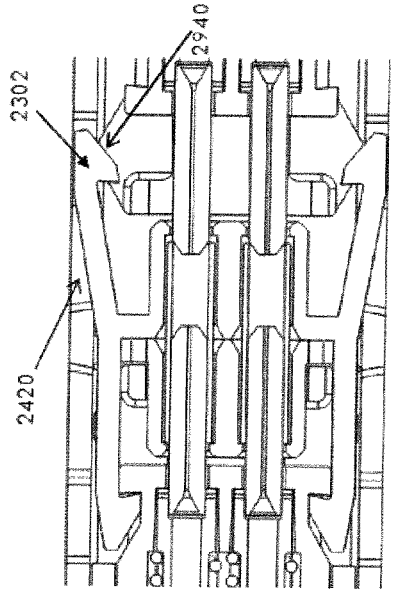
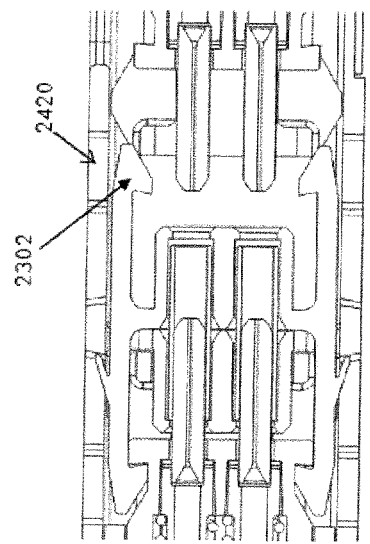
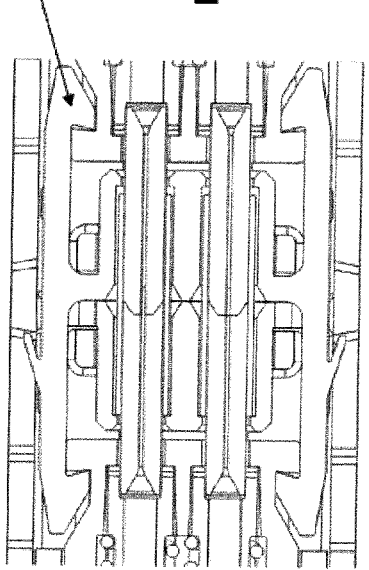
FIG. 34B
FIG. 34A
FIG. 34C

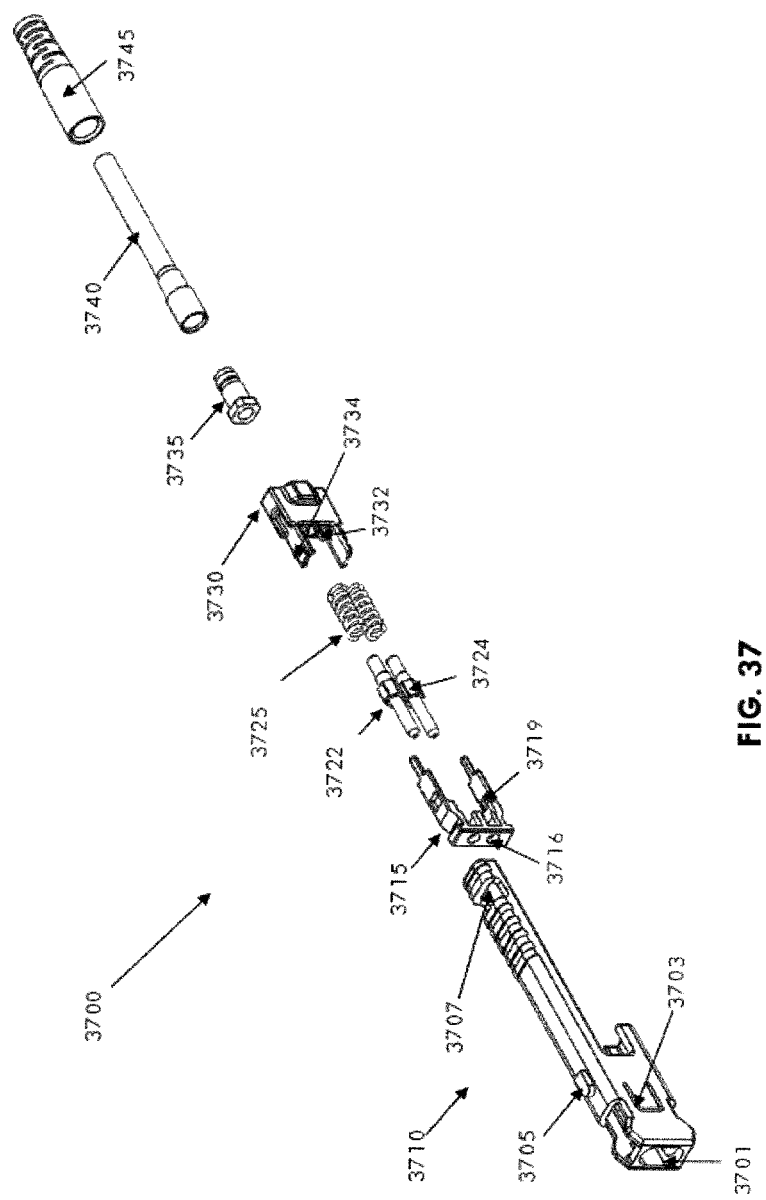

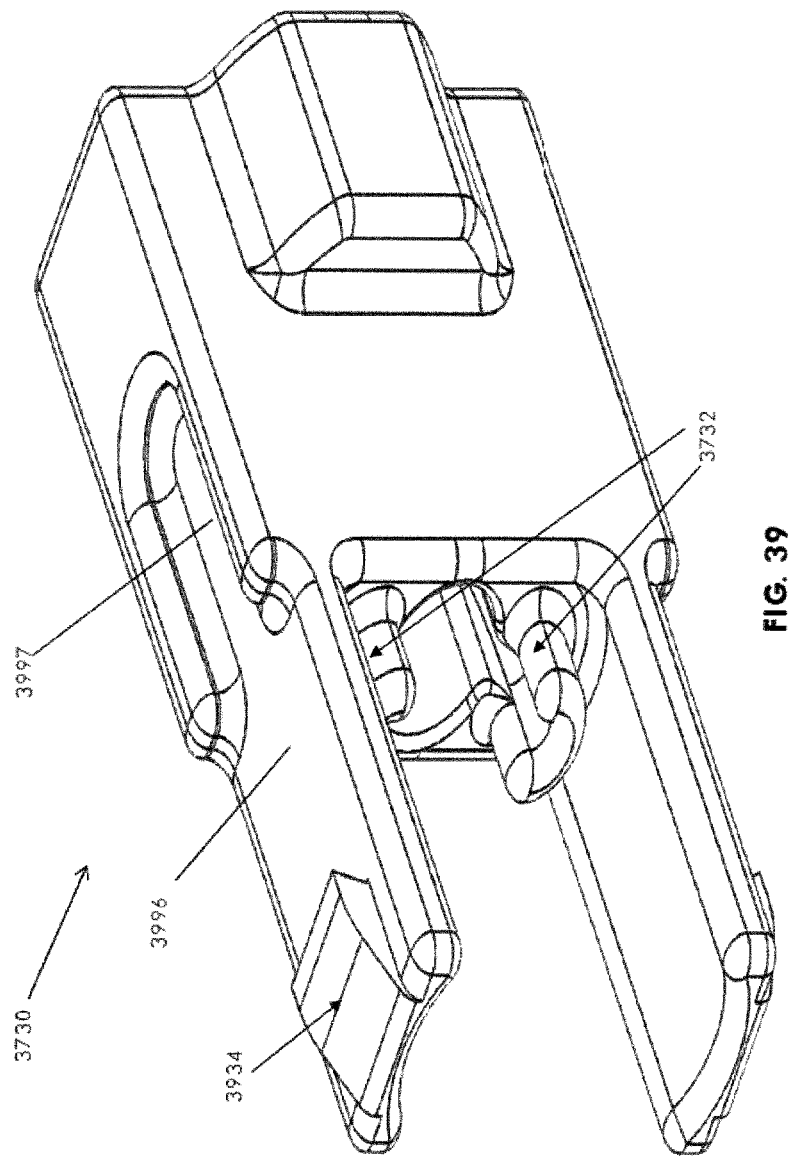

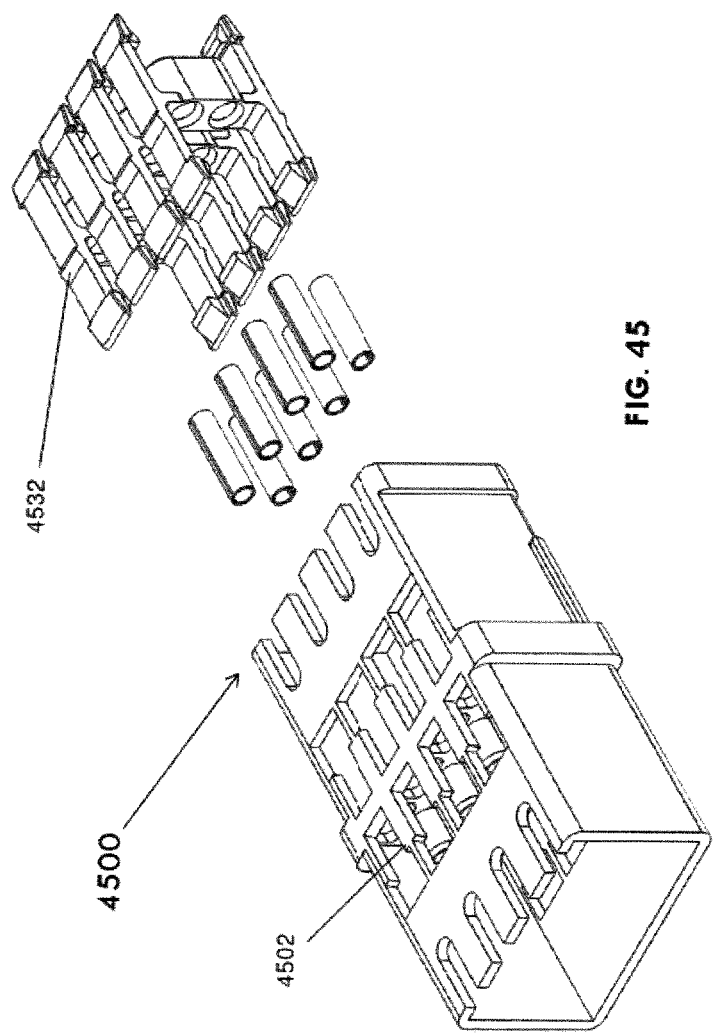

ULTRA-SMALL FORM FACTOR OPTICAL CONNECTORS USING A PUSH-PULL BOOT RECEPTACLE RELEASE

CROSS-REFERENCE TO RELATED APPLICATION

This application is a continuation-in-part and claims priority to U.S. Provisional Patent Application Ser. Nos. 62/549,655 filed Aug. 24, 2017, and 62/588,276 filed Nov. 17, 2017, the disclosures of which are incorporated by reference herein.

FIELD OF THE INVENTION

The present disclosure relates generally to ultra-small form factor optical connectors and related connections within adapters and optical transceivers.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may not be effective at reducing support time and increasing the quality of service.

SUMMARY OF THE INVENTION

An optical connector holding two or more LC-type optical ferrules is provided. The optical connector includes an outer body, an inner front body accommodating the two or more LC-type optical ferrules, ferrule springs for urging the optical ferrules towards a mating receptacle, and a back body for supporting the ferrule springs. The outer body and the inner front body are configured such that four LC-type optical ferrules are accommodated in a small form-factor pluggable (SFP) transceiver footprint or eight LC-type optical ferrules are accommodated in a quad small form-factor pluggable (QSFP) transceiver footprint. A mating receptacle (transceiver or adapter) includes a receptacle hook and a housing with an opening that accommodates the receptacle hook in a flexed position as the optical connector makes connection with the mating receptacle by introducing the receptacle hook into an optical receptacle hook recess.

Optical connector disclosed herein is released from a receptacle using a boot release. The boot release is integrated with fiber cable. The boot release is configured with one or more outer wings or protrusions received in an opening of connector outer housing at a distal end of connector. The protrusions limit travel of connector to ensure receptacle hook is displaced from front body recess so connector can be removed from receptacle opening.

BRIEF DESCRIPTION OF THE DRAWINGS

FIG. 2A is a perspective view of a prior art LC duplex connector;

FIG. 2B is a perspective view of a prior art LC duplex connector with a remote release pull tab;

FIG. 2C is a top view of a prior art LC connector used in the embodiments shown in FIGS. 2A and 2B;

FIG. 2D is a side view of the prior art LC connector of FIG. 2C;

FIG. 11A is a side view of a connector connected to an adapter;

FIG. 11B is a side view of a connector being removed from an adapter;

FIG. 12A is a side view of the outer housing of a connector being removed;

FIG. 12B is a perspective view of a transparent outer housing of a connector showing the front body;

FIGS. 15A-B are illustrative examples of cable management using multiple fiber strands per jacket;

FIG. 17 is another illustrative example of using a cable management system using multiple fiber strands per jacket.

FIGS. 18A-B are various views of one embodiment of a MT connector.

FIG. 22 is a front view of the micro optical connector of FIG. 21B showing overall connector dimensions and ferrule pitch.

FIG. 25B is a cross-sectional side view of the adapter housing of FIG. 24.

FIG. 28A is an isometric view of the back body of the micro optical connector of FIG. 21A.

FIG. 28B is a side view of the back body of FIG. 28A.

FIG. 29D is an inner view of the outer housing of FIG. 29A;

FIG. 29E is an inner view of the outer housing of FIG. 29A.

FIG. 30 is a side view of an adapter hook of the adapter of FIG. 24.

FIG. 33A depicts the micro optical connector of FIG. 21B in a QSFP footprint, depicting dimensions in millimeters.

FIG. 33B depicts the micro optical connectors of FIG. 21B in an SFP footprint, depicting dimensions in millimeters.

FIG. 34A-34C depicts adapter hooks interacting with the micro optical connectors of FIG. 21B before (FIG. 34A), during (FIG. 34B), and after (FIG. 34C) latching.

FIG. 37 is an exploded view of a micro optical connector according to a further embodiment.

FIG. 39 is an isometric view of a back body of the micro optical connector of FIG. 37.

FIG. 45 is an exploded view of an adapter according to a further embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow-pitch LC duplex connectors and narrow-width multi-fiber connectors, for use, for example, with future narrow-pitch LC SFPs and future narrow width SFPs. The remote release mechanisms allow use of the narrow-pitch LC duplex connectors and narrow-width multi-fiber connectors in dense arrays of narrow-pitch LC SFPs and narrow-width multi-fiber SFPs.

Figure 1B:
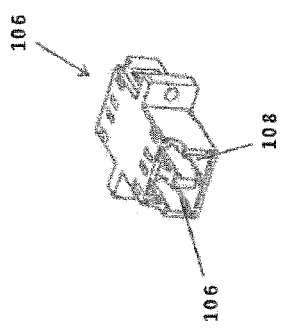
FIG. 1B is a perspective view of a prior art standard 6.25 mm pitch LC adapter.
Figure 1A:
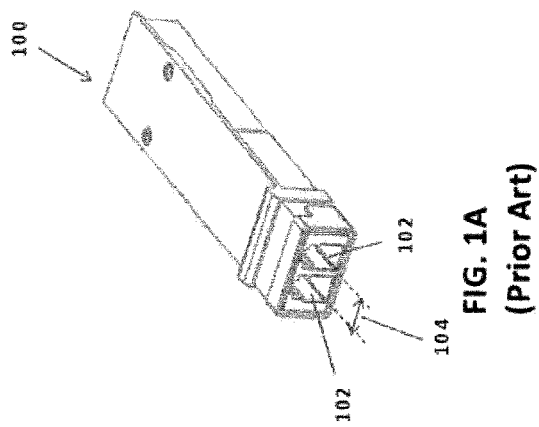
FIG. 1A is a perspective view of a prior art standard 6.25 mm pitch LC connector SFP.
Figure 1D:
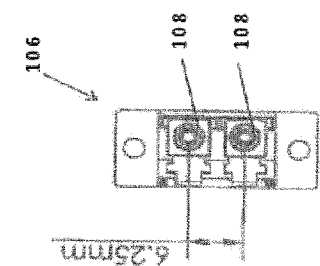
FIG. 1D is a front view of the prior art adapter of FIG. 1B, showing the 6.25 mm pitch.
Figure 1C:
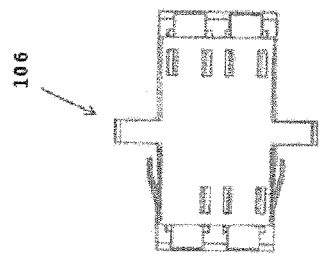
FIG. 1C is a top view of the prior art adapter of FIG. 1B.

FIG. 1A shows a perspective view of a prior art standard 6.25 mm pitch LC connector SFP 100. The SFP 100 is configured to receive a duplex connector and provides two receptacles 102, each for receiving a respective LC connector. The pitch 104 is defined as the axis-to-axis distance between the central longitudinal axes of each of the two receptacles 102. FIG. 1B shows a perspective view of a prior art standard 6.25 mm pitch LC adapter 106. The adapter 106 is also configured to receive a duplex connector, and provides two receptacles 108, each for receiving a respective LC connector. FIG. 1C is a top view of the adapter 106 of FIG. 1B. The pitch of the adapter 106 is defined similarly to that of the SFP 100, as the axis-to-axis distance between the central longitudinal axes of each of the two receptacles 108, as illustrated in FIG. 1D, which shows a front view of the adapter 106.

FIG. 2A shows a prior art LC duplex connector 200 that may be used with the conventional SFP 100 and the conventional adapter 106. The LC duplex connector 200 includes two conventional LC connectors 202. FIG. 2B shows another prior art LC duplex connector 204 having a remote release pull tab 206, and including two conventional LC connectors 208. As shown, the remote release pull tab includes two prongs 210, each configured to couple to the extending member 212 of a respective LC connector 208. FIGS. 2C and 2D show top and side views, respectively, of the conventional LC connector 208, having a width of 5.6 mm, and further showing the extending member 212.

As discussed herein, current connectors may be improved by various means, such as, for example, reducing the footprint, increasing the structural strength, enabling polarity changes, etc. Various embodiments disclosed herein offer improvements over the current state of the art, as will be further discussed below.

Figure 3:
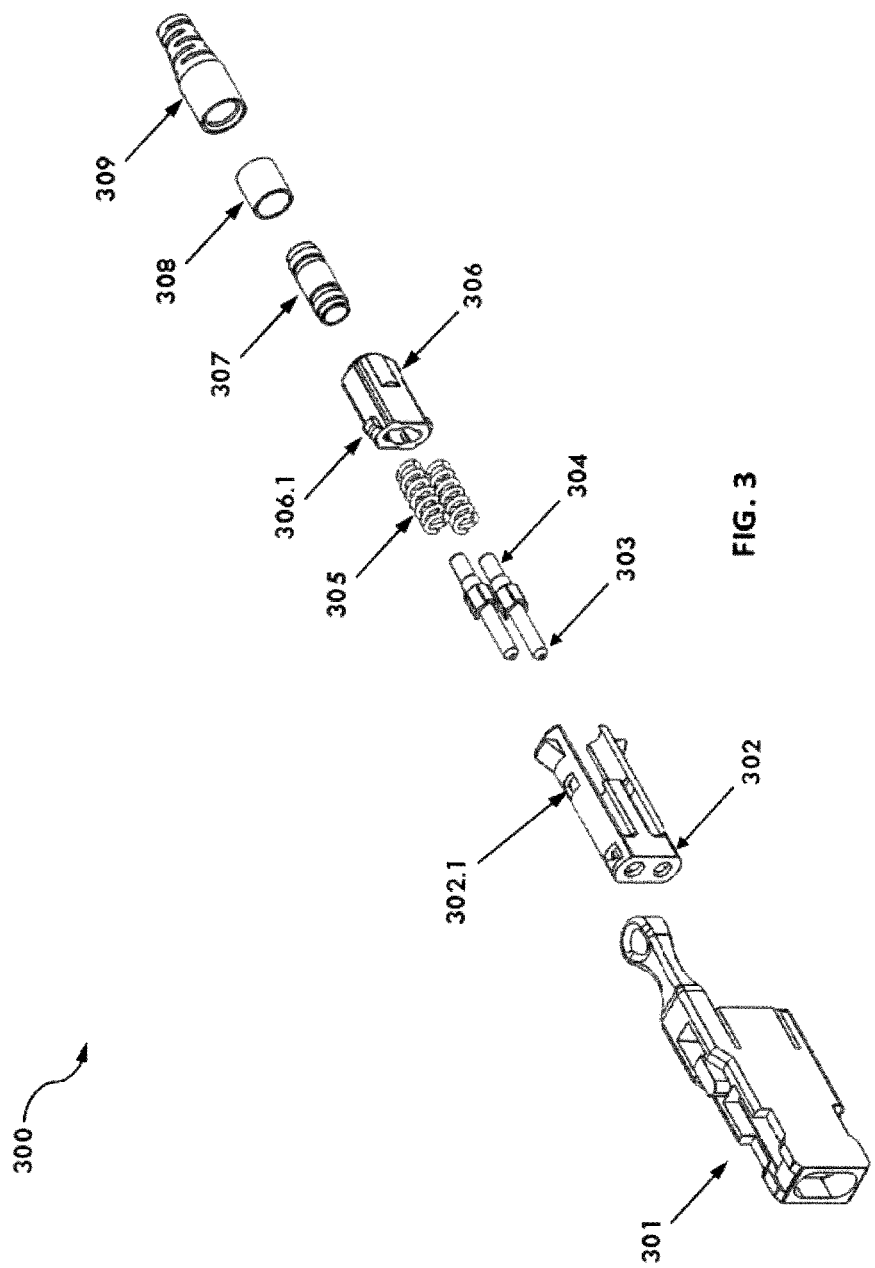
FIG. 3 is an exploded view of one embodiment of a connector.

In some embodiments, as shown in FIG. 3, a connector 300 may comprise various components. Referring to FIG. 3, an illustrative embodiment of a connector 300 is shown in an exploded view to display detail. In some embodiments, and as discussed further herein, a connector 300 may have an outer housing 301, a front body 302, one or more ferrules 303, one or more ferrule flanges 304, one or more springs 305, a back body 306, a back post 307, a crimp ring 308, and a boot 309. In some embodiments, the back body 306 may comprise one or more protrusions 306.1 which may interlock with a window/cutout 302.1 in the front body 302. This may allow for the back body 306 and the front body 302 to be securely fastened together around the ferrule(s) 303, ferrule flange(s) 304, and the spring(s) 305. The elements of FIG. 3 are configured such that two optical connectors having four LC-type optical ferrules may be accommodated in a small form-factor pluggable (SFP) transceiver footprint or at least two optical connectors having a total of eight LC-type optical ferrules may be accommodated in a quad small form-factor pluggable (QSFP) transceiver footprint.

Figure 4:
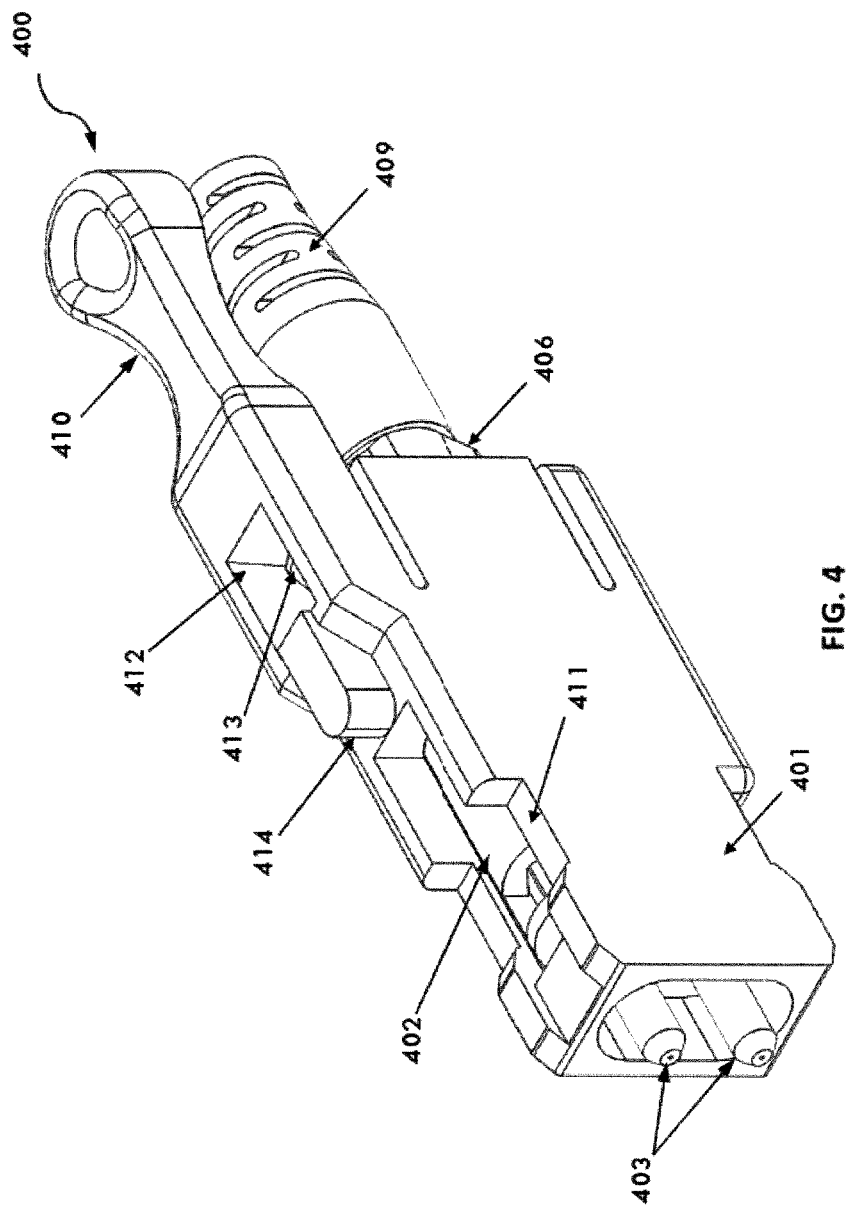
FIG. 4 is a perspective view of one embodiment of a connector.

Referring now to FIG. 4, an embodiment is shown wherein the connector 400 is assembled. In some embodiments, the assembled connector may have an outer housing 401, a front body 402 positioned within the outer housing, one or more ferrules 403, one or more ferrule flanges (not shown), one or more springs (not shown), a back body 406, a back post (not shown), a crimp ring (not shown), a boot 409, and a push-pull tab 410. In some embodiments, the connector may have one or more latching mechanisms made up of a window 412 on the outer housing 401 near the push-pull tab 410 and a protrusion 413 on the front body. The latching mechanism made up of the window 412 and protrusion 413 securely attaches the outer housing 401 to the front body 402. In a further embodiment, the outer housing 401 may have a recess 411 to receive a locking tab or locking mechanism from an adapter (depicted in FIG. 13, below). The recess 411 of the outer housing 401 is used to interlock with an adapter (depicted in FIG. 13, below) or transceiver receptacle to secure the connector into the adapter. As would be understood by one skilled in the art, the push-pull tab 410 enables removal of the connector from a receptacle without requiring additional tools. Alternatively, the push-pull tab may be eliminated and the connector removed manually. In one or more further embodiments, the outer housing 401 may also have a key 414. The key 414 may keep the connector in a given orientation when inserted into a receptacle such as an adapter or transceiver.

Figure 5:
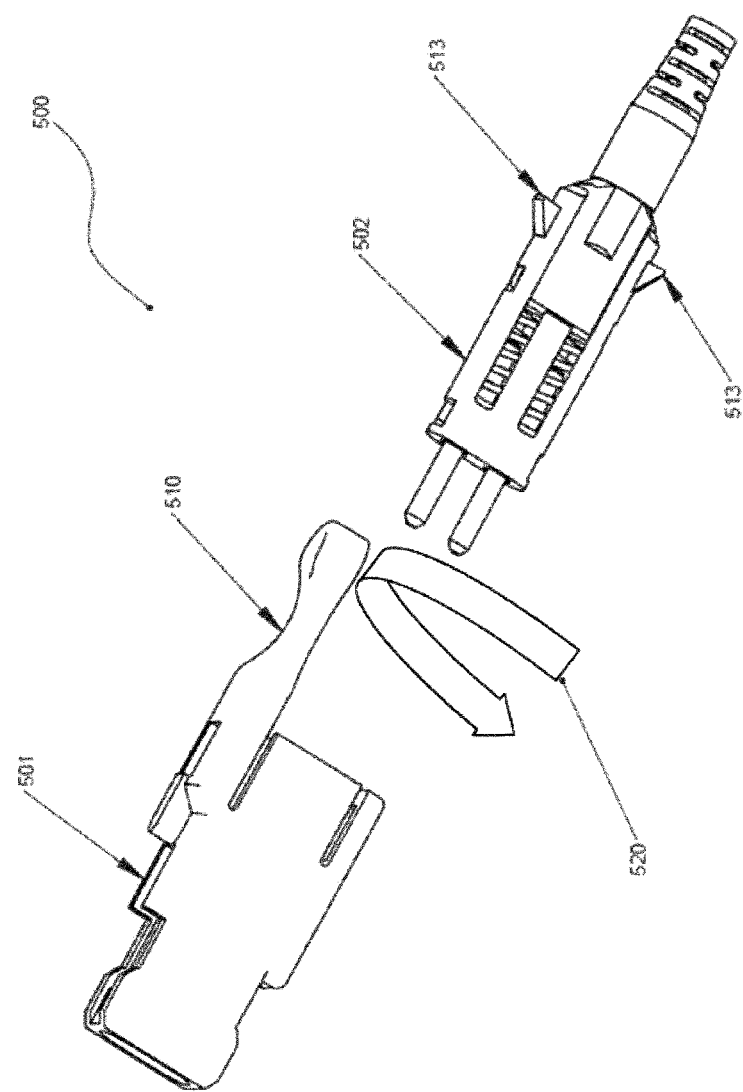
FIG. 5 is a perspective view of one embodiment of a connector with the outer housing removed from the front body.

FIG. 5 depicts a procedure for changing the polarity of the optical connectors of the present disclosure. As shown in FIG. 5, in some embodiments, the latching mechanism of the connector 500 may be made up of two main parts: a window (not visible) and one or more protrusions 513. As illustrated in FIG. 5, the outer housing 501 can slide on to or be removed from the front body 502 by disengaging the latching mechanisms formed by the protrusion 513 exiting through the window, whereby it contacts a rear wall of the window (refer to FIG. 4 for an illustrated example of the outer housing being attached to the front body via the latching mechanism). In some embodiments, the push-pull tab 510 may be permanently attached to the outer housing 501, as shown.

The front body 502 may be removed from the outer housing 501, rotated 180° as indicated by arrow 520, and re-inserted into the outer housing. This allows for a change in the polarity of the front body 502, as shown by the arrow diagram in FIG. 5, and therefore the ferrules can switch quickly and easily without unnecessarily risking the delicate fiber cables and ferrules.

Figure 6:
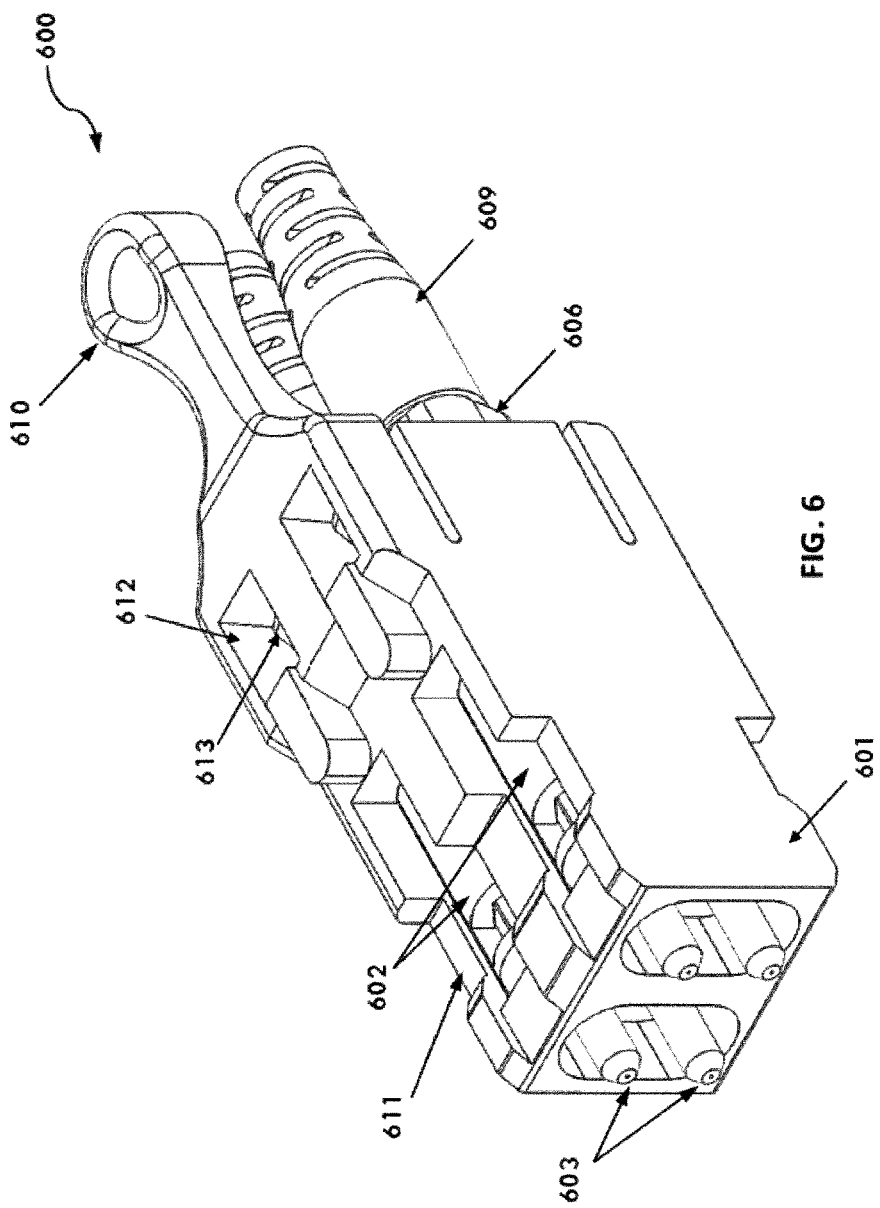
FIG. 6 is a perspective view of one embodiment of a duplex connector.

In some embodiments, it may be beneficial to connect two or more connectors together to increase structural integrity, reduce the overall footprint, and cut manufacturing costs. Accordingly, as shown in FIG. 6, a connector 600 may in some embodiments, utilize an outer housing 601 that is capable of holding two front bodies 602. Various other embodiments are disclosed herein, and it should be noted that the embodiments disclosed herein are all non-limiting examples shown for explanatory purposes only.

Accordingly, although the embodiment shown in FIG. 6 utilizes a duplex outer housing 601, additional or alternative embodiments may exist with more capacity, for example, six or eight optical connectors within a single outer housing. As shown in FIG. 6, in some embodiments, the outer housing 601 may accept two front bodies 602, each with two separate ferrules 603. As shown, the front body(s) 602 may securely fasten to the outer housing 601 via the latching mechanism 612 and 613. In additional embodiments, the push-pull tab 610 may be modified, as shown, such that a single tab can be used to free the two or more connectors from an adapter. As illustrated in FIG. 6, the uni-body push-pull tab 610 and the outer housing 601 may have two windows 612 with which to receive multiple protrusions 613 of the front body(s) 602. As discussed herein the recesses 611 of the outer housing 601 are used to secure the connectors to an adapter (depicted in FIG. 13 below). In one or more further embodiments, the connectors may have individual back bodies 606 and boots 609 (i.e., one back body/boot per front body) as shown.

Figure 7:
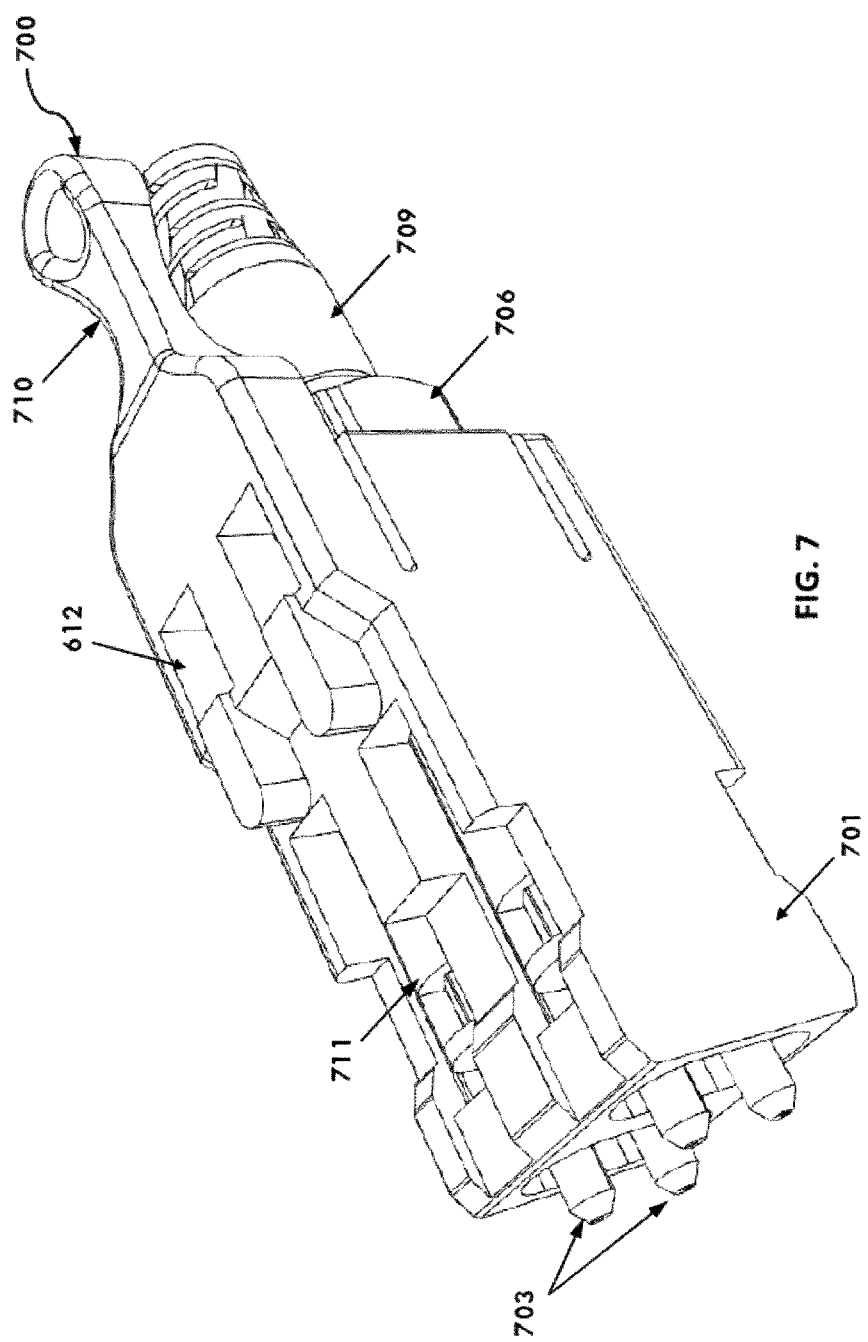
FIG. 7 is a perspective view of another embodiment of a duplex connector.

Alternatively, in some embodiments, such as that shown in FIG. 7, the connector 700 may have a single boot 709 and a duplex (i.e., uni-body) back body 706 instead of individual back bodies (e.g., such as shown in FIG. 6). In some embodiments, the duplex back body 706 may have different dimensions than that of the individual back bodies of FIG. 6, such as, for example, they may be longer to accommodate the need for routing the fiber after it exits the boot 709. As with other embodiments discussed herein, the connector shown in FIG. 7 may also include an outer housing (e.g., duplex outer housing) 701, one or more ferrules 703, at least one latching mechanism formed by the protrusion (not shown) exiting through one or more windows 712, and a push-pull tab 710.

As stated, it may be beneficial to connect two or more connectors together to increase structural integrity, reduce the overall footprint, and cut manufacturing costs. Accordingly, similar to FIG. 6, FIG. 8 shows a connector 800 that may, in some embodiments, utilize an outer housing 801 that is capable of holding multiple (e.g., four) front bodies 802.

Figure 8:
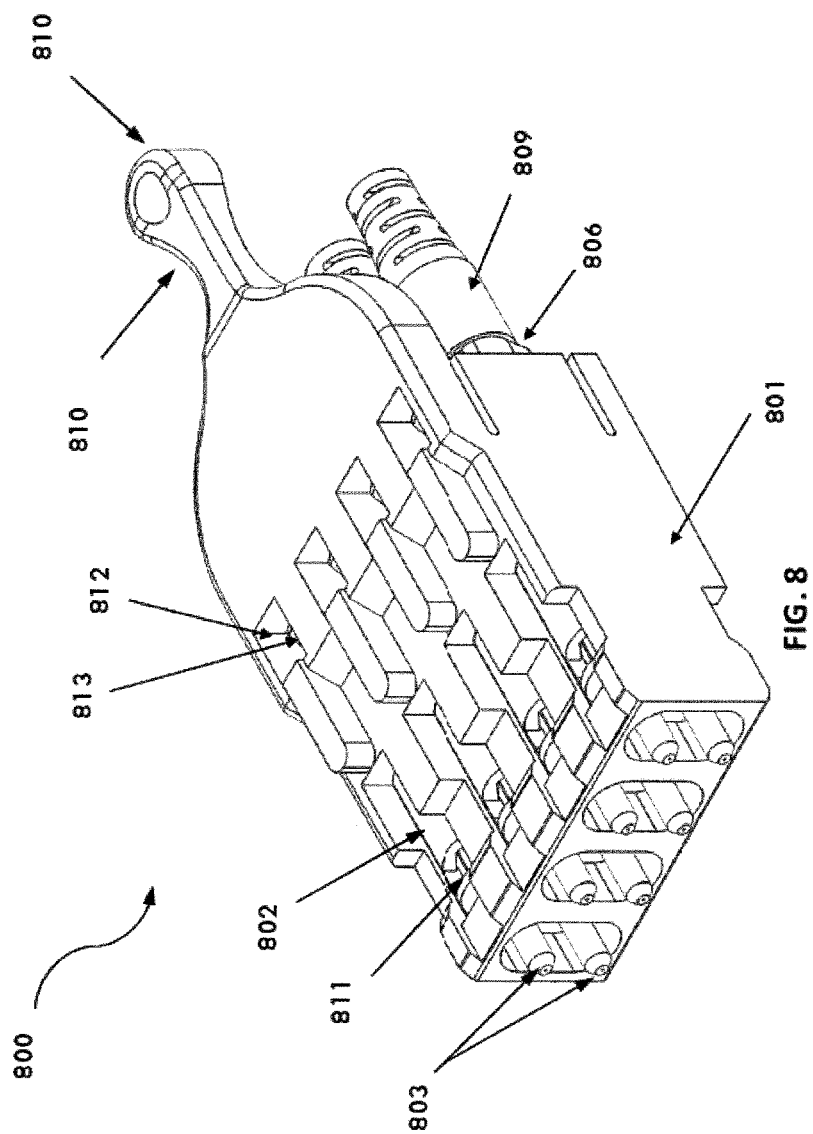
FIG. 8 is a perspective view of one embodiment of a quad connector.

As shown in FIG. 8, some embodiments may have an outer housing 801 able to accept up to four front bodies 802, each with one or more ferrules 803. As shown, each front body 802 may securely fasten to the outer housing 801 via the latching mechanism 812 and 813. In additional embodiments, the push-pull tab 810 may be modified such that a single tab can be used to remove the up to four connectors from an adapter. As illustrated in FIG. 8, the push-pull tab 810 may include four recesses 811, which as discussed herein are used to secure the connector to a receptacle such as an adapter (shown in FIG. 13, below) or the front receptacle portion of a transceiver. In one or more further embodiments, the connectors may have individual back bodies 806 and boots 809 (i.e., one back body/boot per front body) as shown.

Figure 9:
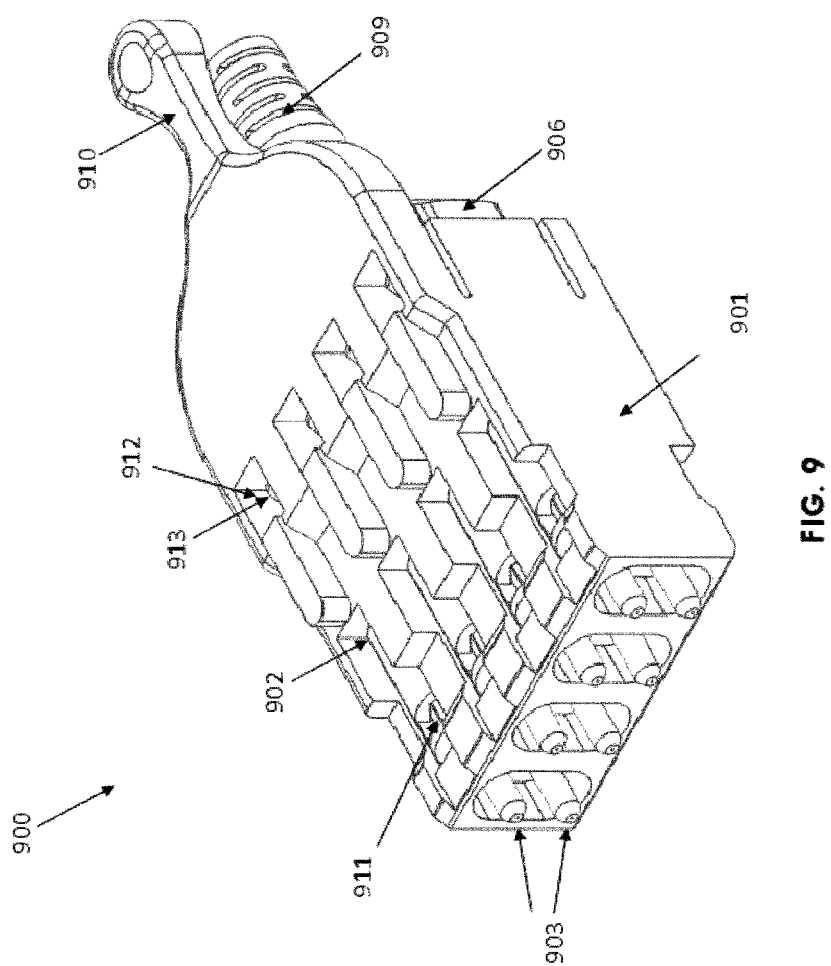
FIG. 9 is another perspective view of one embodiment of a quad connector.

Similar to FIG. 8, FIG. 9 shows an embodiment where the outer housing 901 is able to accept up to four front bodies 902, each with one or more ferrules 903. As shown, each front body 902 may securely fasten to the outer housing 901 via the latching mechanism 912 and 913. In additional embodiments, the push-pull tab 910 may be modified such that a single tab can be used to remove the up to four CS connectors from an adapter. As illustrated in FIG. 9, the push-pull tab 910 may include four recesses 911, which as discussed herein are used to secure the connector to an adapter (shown in FIG. 13, below) or the optical receptacle portion of a transceiver. The FIG. 9 embodiment may utilize a single back body 906 and a single boot 909. In one or more further embodiments, the connectors may have individual back bodies 906 and boots 909 (i.e., one back body/boot for all four front bodies) as shown.

In another aspect, the present disclosure provides method for reconfiguring optical cables in which the outer housings of the connectors may be removed and the remaining portion of the assembled connector is inserted into a housing having a larger or smaller capacity.

For example, the outer housings of plural two-ferrule capacity housings may be removed and the connector inner body and associated components inserted into a second outer housing that has either a four-ferrule or eight-ferrule capacity. Alternatively, an outer housing with a four-ferrule capacity may be removed and the inner bodies and associated components are inserted into two second outer housings, each of the two second housings having a two-ferrule capacity. Similarly, an outer housing with an eight-ferrule capacity may be removed and replaced by two four-ferrule capacity housing or a four-ferrule capacity and two two-ferrule capacity housings. In this manner, cables may be flexibly reconfigured to match the capacity of a mating optical-electrical component such as a transceiver. This aspect of the present disclosure is demonstrated in connection with FIG. 10.

Figure 10:
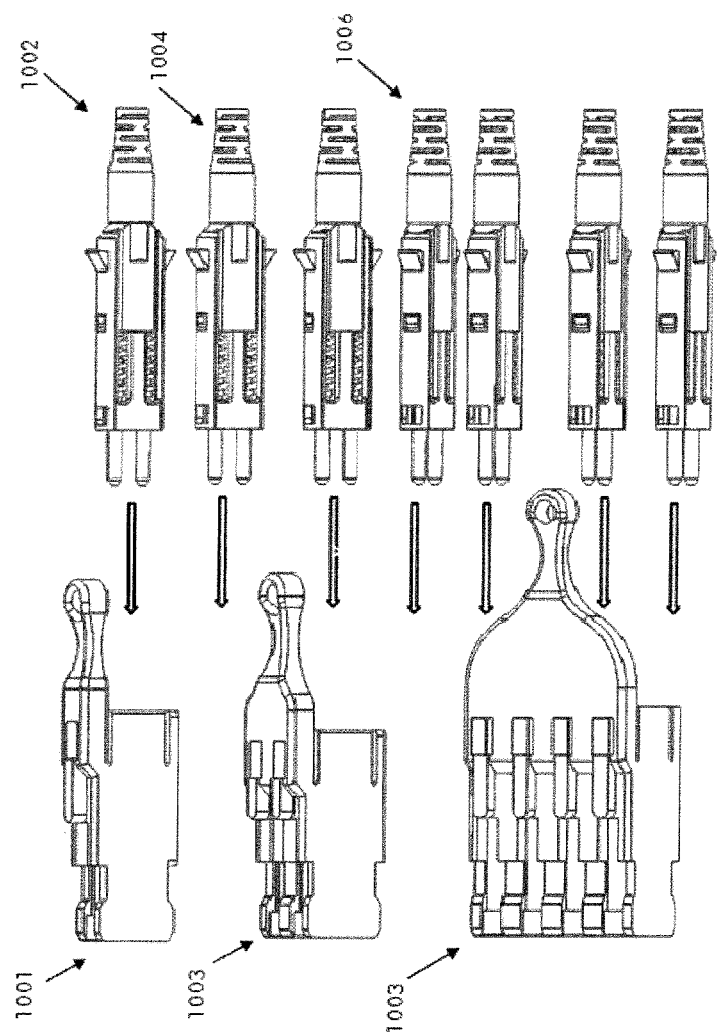
FIG. 10 shows various embodiments of adapter types.

Referring now to FIG. 10, various embodiments may exist such as a single housing 1001 which receives a single connector 1002. Additional embodiments may also exist, such as a duplex housing 1003 which receives two connectors 1004 and/or a quad housing 1005 which may receive up to four connectors 1006. It should be understood by one skilled in the art that various other embodiments may exist that are not explicitly shown. For example, a housing with the capacity for 5, 6, 7, 8, 9, 10 or more connectors may be utilized for various embodiments disclosed herein. As shown below, it is desirable to have flexible housing configurations so that connectors may be grouped and ungrouped between optical and optoelectronic components such as adapters and transceivers.

Alternatively, in some embodiments the connector may utilize one or more duplex back bodies with a single boot, similar to that shown in FIG. 7. Thus, similar to FIG. 7, an embodiment may allow for a further reduced footprint, less cabling, and easier maintenance of the connector. Accordingly, one or more embodiments may have an outer housing that may accept up to four front bodies, each with one or more ferrules. In some embodiments, each front body may securely fasten to the outer housing via a latching mechanism. In additional embodiments, the push-pull tab may be modified such that a single tab can be used to free the up to four front bodies from an adapter. The push-pull tab may include four openings with which to receive multiple locking tabs of the outer housing. As discussed herein the locking tabs of the outer housing are used to secure the connectors to an adapter (shown in FIG. 13) or the optical receptacle portion of a transceiver.

In further embodiments, the connector may utilize a single uni-body back body with a single boot (i.e., as shown in FIG. 9). Thus, an embodiment may allow for a further reduced foot print, less cabling, and easier maintenance of the connector. Accordingly, one or more embodiments may have an outer housing that may accept up to four front bodies, each with one or more ferrules. Each front body may securely fasten to the outer housing via the latching mechanism as discussed herein. In additional embodiments, the push-pull tab may be modified such that a single tab can be used to remove up to four connectors from an adapter. The push-pull tab may include four openings with which to receive multiple locking tabs of the outer housing. As discussed herein the locking tabs of the outer housing are used to secure the connectors to an adapter.

The optical connectors of the present disclosure are all configured to be received in a receptacle. As used herein, the term "receptacle" relates generically to a housing that receives an optical connector. A receptacle includes both optical adapters, that is, components that mate two or more optical connectors, and transceivers, which include an optical receptacle to hold connectors that are to communicate with an optoelectronic component (e.g., a component that converts optical signals to electrical signals). As shown in FIG. 11A, in one embodiment 1100A, the outer housing 1101 may comprise one or more recesses 1111. As discussed and shown herein, the one or more recesses may allow for a receptacle 1114 to securely connect to the connector 1100A. Accordingly, in some embodiments, the receptacle 1114 may have a receptacle hook 1115, which is flexible and can secure the connector 1100A into the receptacle via latching onto the wall of the recess 1111, as shown. This latching takes place when the outer housing 1101 is pushed forward into the receptacle. The sloped portions of the outer housing 1101 allow the receptacle hook 1115 to slide up and over the front of the outer housing thereby securing the connector 1100A into the receptacle.

Additionally or alternatively, in some embodiments, such as that shown in FIG. 11B, a connector 1100B may be removed from a receptacle 1114 by pulling the connector away from the adapter as indicated by the directional arrow. In some embodiments, the force may be applied by a user via the push-pull tab 1110. Alternatively, when a push-pull tab is not present, the connector may still be manually removed from a receptacle. As shown in FIG. 11B, as the connector 1100B is removed from the receptacle 1114, the flexible receptacle hooks 1115 separate and slide up the slope of the end of the connector and allow for removal of the connector from the receptacle.

Referring now to FIGS. 12A and 12B, as discussed herein and previously shown in FIG. 5, the front body 1202 can be removed from the outer housing 1201. In some embodiments, a portion of the outer body 1201 can be flexibly extended away from the front body 1202 as shown by the arrows in FIG. 12A. As discussed herein, in some embodiments, the front body 1202 may comprise a protrusion 1213 which interlocks with a window (not shown) on the outer housing 1201. Accordingly, when force is applied to the outer housing 1201 in a manner that removes the one or more protrusions 1213 from the one or more windows (not shown, see FIG. 4), the front body 1202 may be removed from the outer housing.

Figure 13:
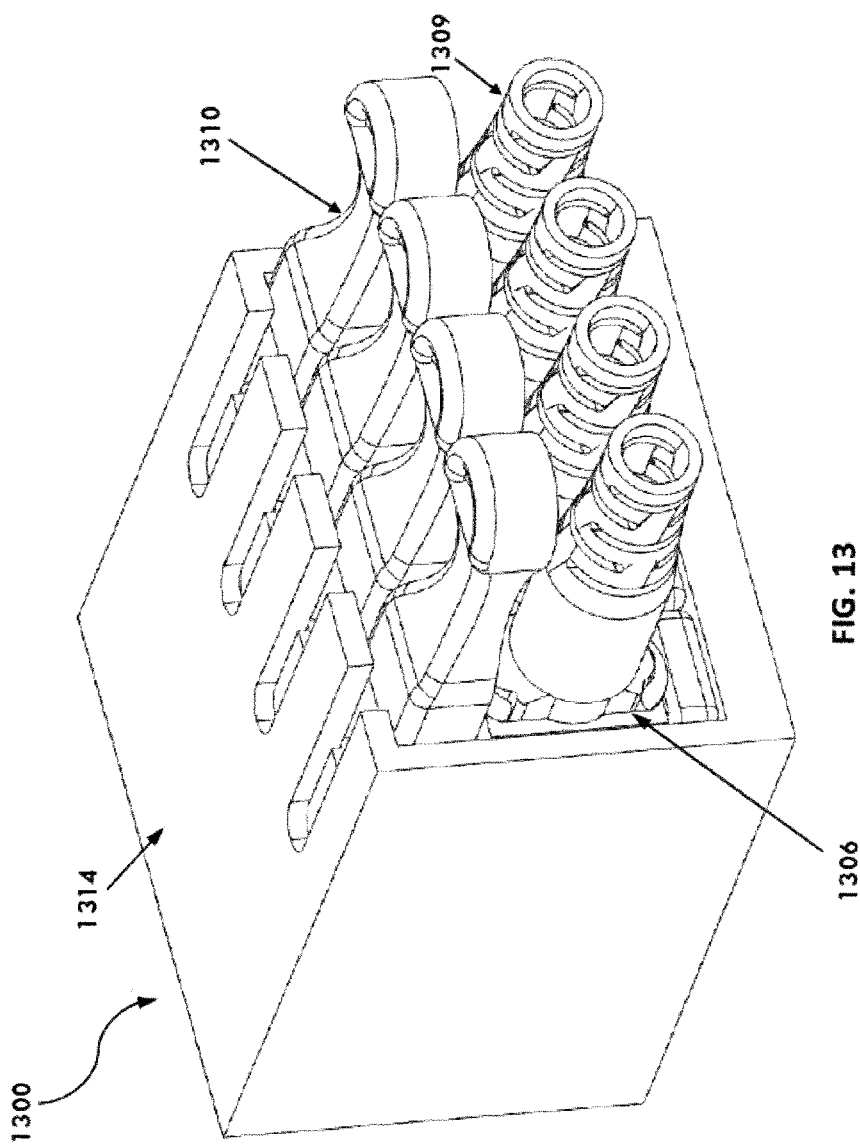
FIG. 13 is a perspective view of one embodiment of a quad connector inserted into a corresponding adapter.

Referring now to FIG. 13, an embodiment 1300 is shown in which the connector (not shown in its entirety) is inserted into a receptacle such as adapter 1314. In this specific non-limiting example, the connector is similar to that shown in FIG. 8 (i.e., comprising four front bodies each with their own back body 1306 and boot 1309). However, unlike FIG. 8, the embodiment shown here utilizes four individual push-pull tabs 1310 instead of a duplex push-pull tab system which manipulates two latching tabs per push-pull tab to allow the connector to be removed from the adapter 1314.

Figure 14A:
FIGS. 14A-C are illustrative examples of cable management using various embodiments of connectors.
Figure 14B:
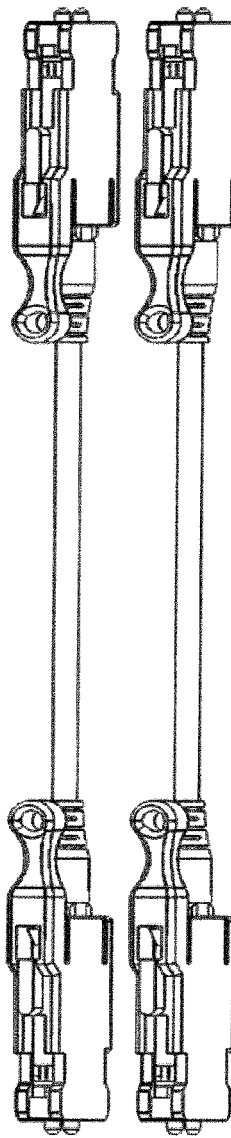
Figure 14C:
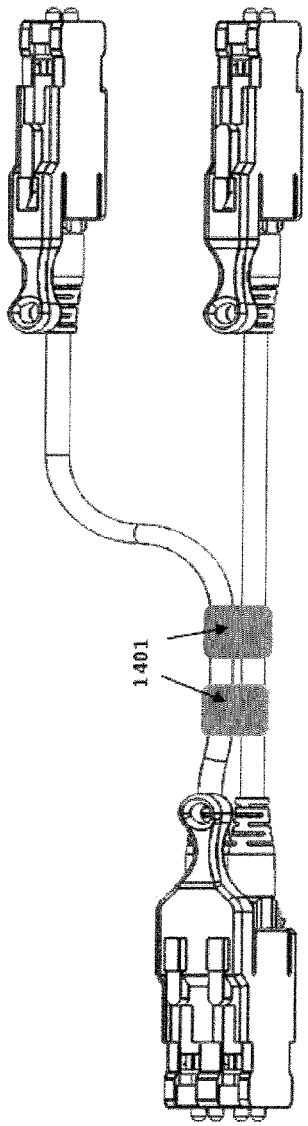

Various benefits and details have been discussed herein with regard to the connectors and their modular ability (e.g., to include multiple connectors into a single housing). In addition to the reduced footprint, structural improvements, and cost reduction, various embodiments herein may also be beneficial with regard to reducing the burden of cabling in a data center environment. Illustrative embodiments shown in FIGS. 14A through 14C depict cable configurations that may be used to reduce the complexity of optical cables in a compact environment. Note that any of the optical connectors described in this disclosure may be used in these embodiments, including the optical connectors of FIGS. 21B, 37, and 41, to be discussed in detail below. FIG. 14A shows two duplex cables similar to the cable shown in FIG. 6. In some embodiments, one or more detachable clips 1401 may be attached to two or more zip cables to prevent the zip cables from detaching. This allows for two or more cables to be bundled and reduce the risk of entanglement with additional cables. FIG. 14B is an illustrative example of how easily an embodiment can separate into two individual connectors by unbinding the cables and thus quickly and easily creating two independent fiber optic channels that can move and be connected independently. FIG. 14C shows an embodiment in which a duplex connector like that of FIGS. 6 and 14A is connected to two separate individual connectors. Through the variable housing configurations depicted above in FIG. 10, the cable of FIG. 14A can be reconfigured as the cables of either 14B or FIG. 14C.

In addition to binding existing fiber cables, some embodiments herein may utilize a new four fiber zip cable. Referring now to FIG. 15A, a conventional zip cable (i.e., one with a single fiber strand 1520 per jacket 1521) is shown in comparison with an embodiment in which two fibers 1522 per jacket 1523 are utilized. It should be understood that this is merely a non-limiting example. In some embodiments, multiple fibers may be included per jacket, such as, for example, four fibers per jacket in order to utilize the single boot 909 and uni-body rear body 906 of the connector shown in FIG. 9.

Figure 16:
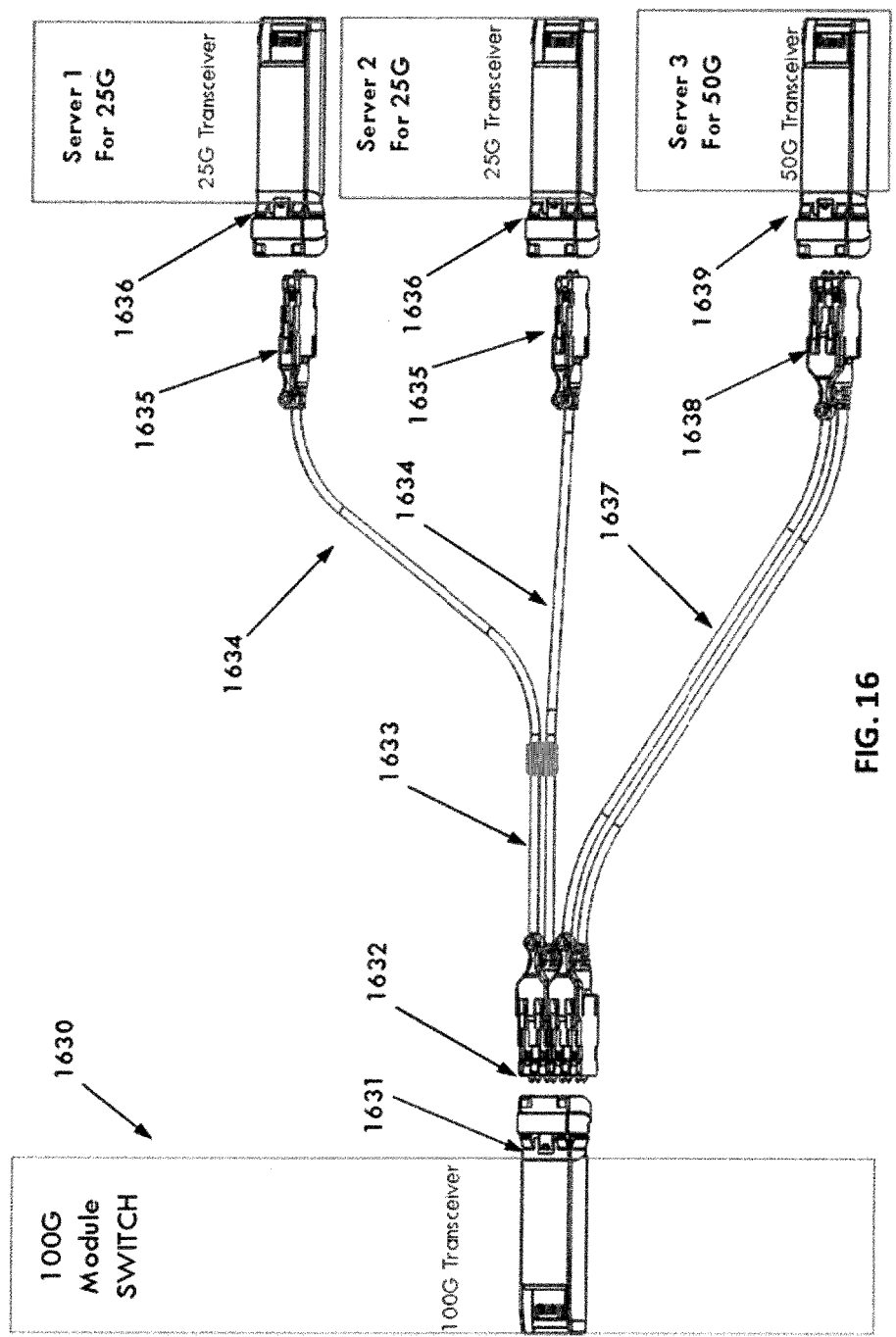
FIG. 16 is an illustrative example of using a cable management system using multiple fiber strands per jacket.

A specific example using multi-strand cables is shown in FIG. 16 for illustrative purposes only. It should be understood that numerous alternatives and modifications are possible, such as, for example, that shown in FIGS. 18A-18B and FIGS. 19A-19D. As shown, a switch (e.g., 100 G switch) 1630 is shown with a transceiver (e.g., 100 G transceiver) 1631. The transceiver 1631 has a receptacle to receive duplex connectors 1632. From each of the two duplex connectors 1632, a four fiber cable 1633 extends to connect to various other connectors and transceivers. In some embodiments, as discussed herein, a clip (e.g., detachable clip) 1640 may connect two or more cables (e.g., 1633) to ensure the zip cables do not come apart. As shown, one four fiber cable 1633 is split into two two-fiber cables 1634, which are then each attached to a single simplex connector 1635 and placed into a transceiver (e.g., 25 G transceiver) 1636. As further shown, one of the four fiber cables 1637 is connected to a single duplex connector 1638, which is then inserted into another transceiver (e.g., 50 G transceiver) 1639.

An additional or alternative embodiment is shown in FIG. 17. As shown, one or more switches (e.g., 400 G switches) 1730 and 1732 are shown each with a transceiver (e.g., 400 G transceiver) 1731 and 1733. The first transceiver 1731 has a receptacle that is receiving two simplex (single) connectors 1734 and one duplex (dual) connector 1735. From each of the two simplex connectors 1734, a two fiber cable 1736 extends to connect to various other connectors and transceivers. Similar to FIGS. 14 and 16, some embodiments may have a clip (e.g., detachable clip) 1740 that may connect two or more cables (e.g., 1736, 1738, etc.) to ensure the zip cables do not come apart. From the duplex connector 1735 a four-fiber cable 1737 is split into two two-fiber cables 1738, which are then each attached to a single simplex connector each and placed into a transceiver (e.g., 400 G transceiver).

Accordingly, embodiments described herein allow for improvements over the current state of the art. By way of specific example, connectors generally have three types of fixed cables. Moreover, some cables may be bifurcated. As such, the cable cannot be split once installed and the polarity of the cables cannot be changed. Alternatively, the embodiments discussed herein may allow a user to change from a four-way to a 2-Duplex, to a 4-simplex connector, etc. (e.g., FIG. 20). Moreover, as discussed herein, the individual connectors can be split into individual connectors anytime, even after deployment. Additionally, the polarity can be changed within the connectors easily in a manner that does not risk damage to the one or more ferrules and fibers, as discussed above. It should also be noted that the depicted connectors are used herein merely for illustrative purposes, and that various other connectors may be used in any embodiment (e.g., an MT connector, such as that shown in FIGS. 18A-18B, and the optical connectors of FIGS. 21, 37, and 41).

FIGS. 18A-18B depict an optical connector including an MT ferrule 1810 in a housing that is substantially similar to the housing 301 of FIG. 3. As with the embodiment of FIG. 3, the various features of the connector are configured such that two optical connectors having two MT-type optical ferrules may be accommodated in a small form-factor pluggable (SFP) transceiver footprint or at least four optical connectors having a total of four MT-type optical ferrules may be accommodated in a quad small form-factor pluggable (QSFP) transceiver footprint.

Figure 19A:
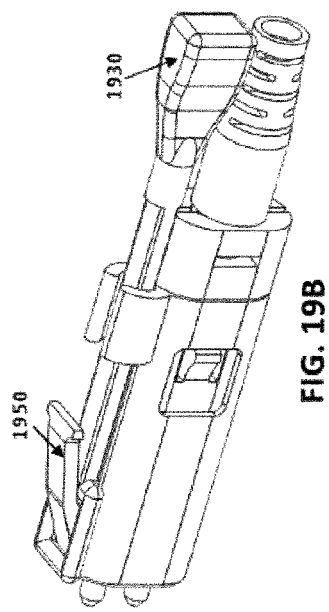
FIGS. 19A-D are illustrative examples of possible alternative connector designs.
Figure 19B:
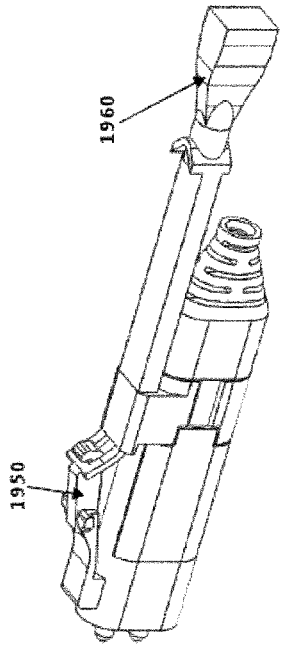
Figure 19C:
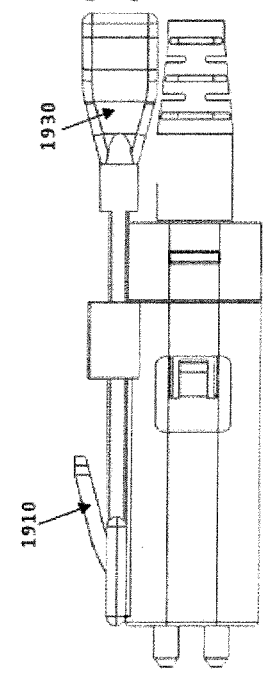
Figure 19D:
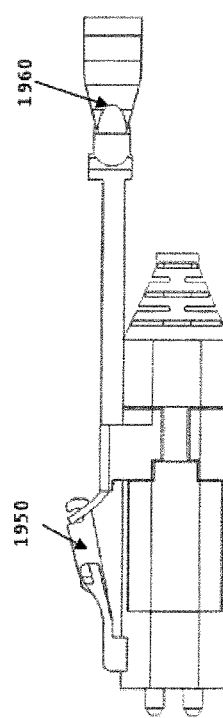

FIGS. 19A-19D show alternative embodiments of the optical connectors of FIG. 3 in which the push-pull tabs are not integrated with the optical connector housing. As seen in FIGS. 19A-19B, a push-pull tab 1930 is a separable element from a connector housing. The push-pull tab 1930 actuates a latch 1910 for inserting and extracting the connector from an adapter or transceiver. An alternative latching mechanism is depicted in FIGS. 19C-19D. Latch 1950 includes a notch that is actuated by push-pull tab 1960.

Figure 20:
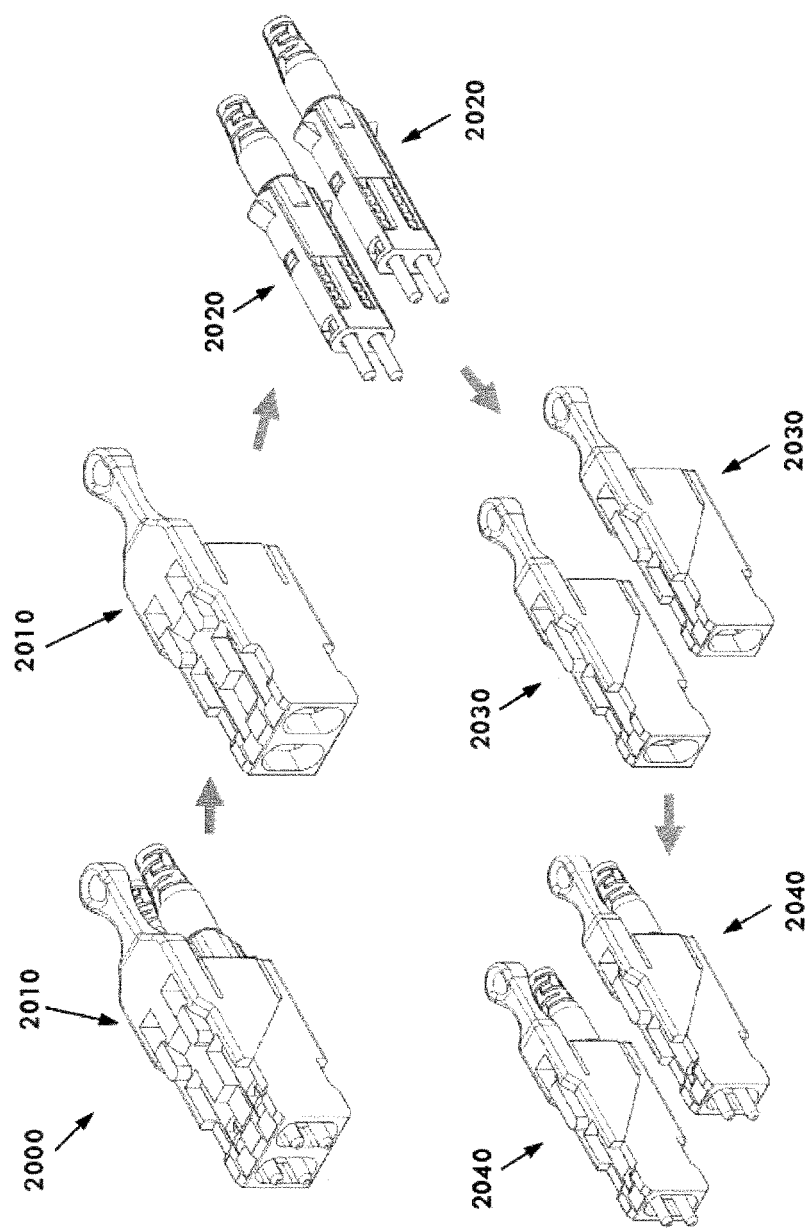
FIG. 20 shows moving two connectors from a duplex connector to two simplex connectors.

FIG. 20 depicts the disassembly of a four-connector housing (two duplex connectors in a single housing) into two duplex connectors. This may be performed in changing, for example, a connector as shown in FIG. 14A to a connector as shown in FIG. 14C. In FIG. 20, an optical connector 2000 is depicted including a housing 2010 that houses two duplex connectors (four optical fibers). The housing 2010 is removed, leaving the two duplex connectors 2020. Two housings 2030 are then provided and two individual duplex connectors 2040 are then created from the initial single housing connector 2000. This reconfigurable housing simplifies cable management, for example, when optical cables are interconnected between lower-speed transceivers and higher-speed transceivers as seen in FIG. 16.

Figure 21A:
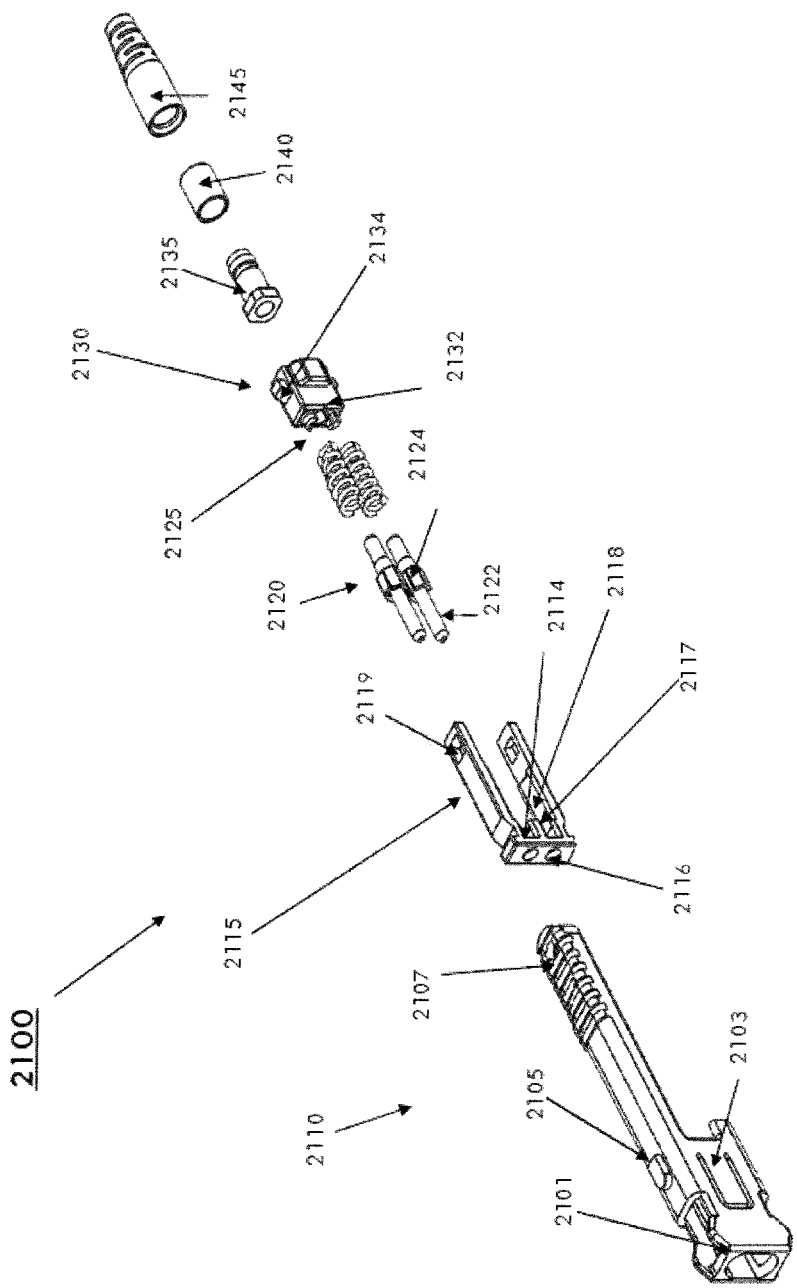
FIG. 21A is an exploded view of a micro optical connector according to an embodiment.

FIG. 21A depicts an embodiment of an optical connector 2100, shown in exploded view while 21B depicts the optical connector 2100 in an assembled view. Optical connector 2100 may include an outer housing 2110, a front body 2115, one or more ferrules 2122, one or more ferrule flanges 2124, one or more springs 2125, a back body 2130, a back post 2135, a crimp ring 2140, and a boot 2145. The outer housing 2110 may include a longitudinal bore for accommodating the front body 2115 and a ferrule assembly 2120, a connector alignment key 2105 used during interconnection, a connector flap 2103 and an optional pull tab 2107 to facilitate removal of the connector 2100 when connected in a dense array of optical connectors. Optionally, the ferrules may be LC-type ferrules having an outer diameter of 1.25 mm.

In prior art optical connectors, an inner enclosed housing was used in place of open front body 2115. Front body 2115 includes top and bottom portions but no sidewalls, termed "open sidewalls" in this embodiment. By using front body 2115, space occupied by the prior art inner housing sidewalls becomes available to increase the density of optical connectors within a given footprint, an advantage over prior art connectors. It was determined that the outer housing 2110, combined with the front body 2115, provided sufficient mechanical strength and ferrule protection, advantageously providing the space for additional optical connectors. Removal of sidewalls increases available space by 1-2 millimeters.

Note that, in this embodiment, the outer housing is configured to hold two optical ferrules 2122. Typically, two optical ferrules may be used in a "transmit" and "receive" pairing of optical fibers, called a duplex connector. However, the outer housing may be configured to hold more or fewer optical ferrules including a single optical ferrule, multiples of single optical ferrules, or multiple pairs of optical ferrules, depending upon the application. Further, the front body 2115 may be removed from the outer housing 2110 and the front body placed in a larger outer housing with other front bodies to form a larger optical connector in a manner to be discussed in more detail below. In particular, two front bodies may be used with a four-ferrule outer housing or four front bodies may be used with an eight-ferrule outer housing.

Figure 29B:
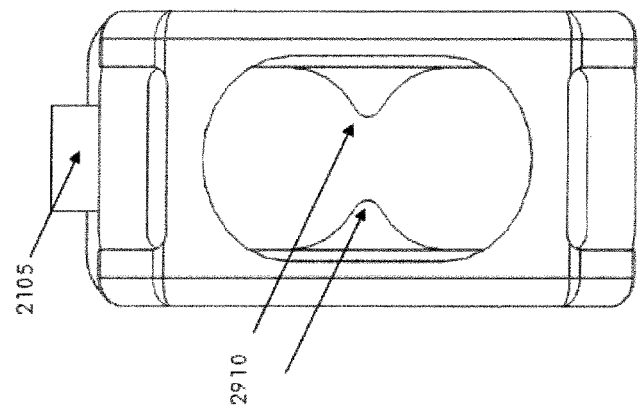
FIG. 29B is a front view of the outer housing of FIG. 29A.
Figure 29A:
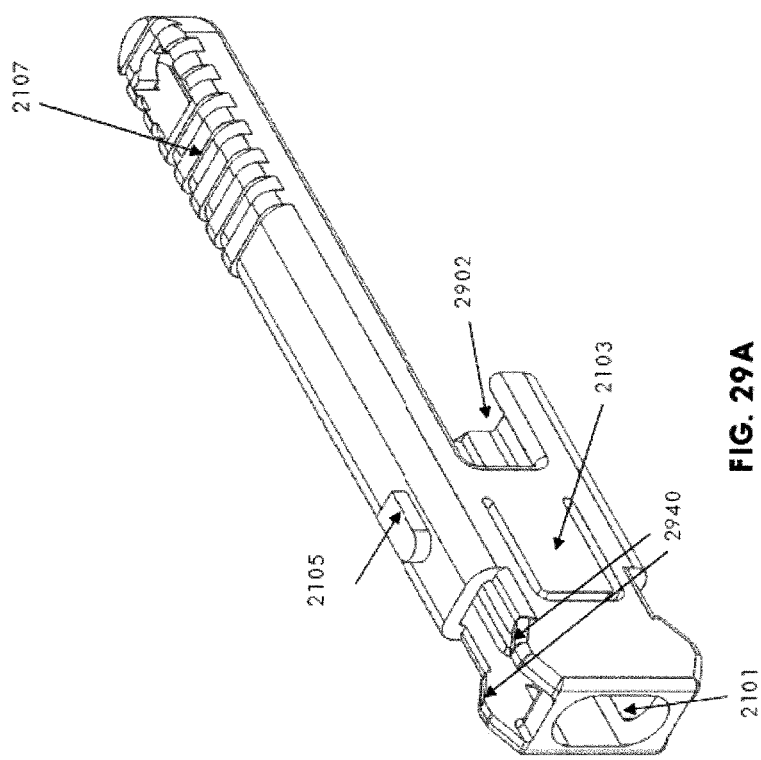
FIG. 29A is an isometric view of the outer housing of the micro optical connector of FIG. 21A.
Figure 29C:
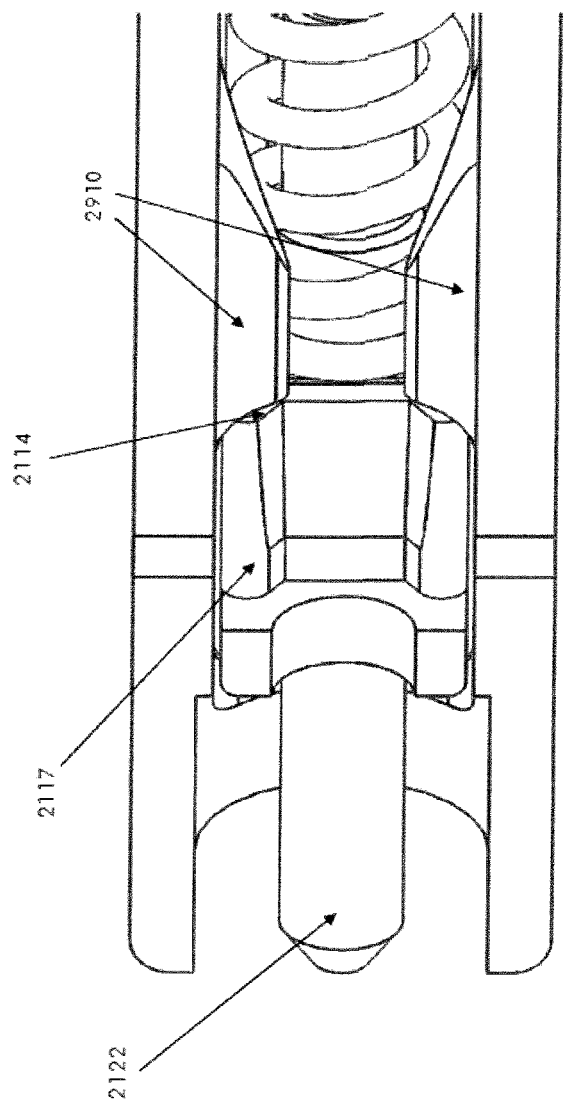
FIG. 29C is a cross-sectional view of the outer housing of FIG. 29A showing the top of an orientation protrusion.

Turning to FIGS. 29A and 29B, isometric and front views of the outer housing 2110 are shown. As seen in the front view of FIG. 29B and the cross-sectional view of FIG. 29C, connector orientation protrusions 2910 are provided within the interior of the outer housing 2110. Connector protrusion 2910 is further seen in the inner view of the housing, FIG. 29E. When the front body is inserted within the longitudinal bore 2101 of outer housing 2110, the outer housing connector flap 2103 locks the outer housing 2110 to the front body 2115 in the following manner. As the front body 2115 is inserted into the outer housing 2110, the outer housing locking surface 2114, best seen in FIG. 27C, engages the connector orientation protrusion 2910, seen in an inside view of the outer housing in FIG. 29D, labelled as "Flap A", flexing the connector flap 2103 outwardly from the outer housing body 2110, depicted in the inset of FIG. 29C. The flap protrusion mating location is indicated as "mating place B" in FIG. 29D. Once the locking surface 2114 passes beyond the orientation protrusion, the connector flap returns to its original position (FIG. 29A), and the protrusion 2910 engages locking surface 2114 and any withdrawal of the front body assembly from the outer housing 2110 is prevented as the proximal end face of the connector flap 2103 is stopped by protrusion 2910.

Figure 35B:
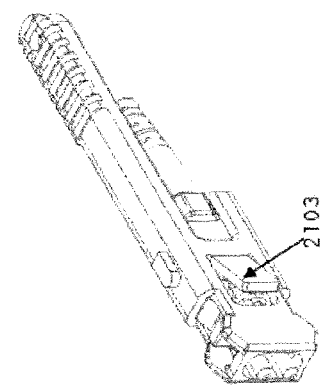
FIG. 35A-FIG. 35C depicts the micro optical connector of FIG. 21B side flap operation before (FIG. 35A), during (FIG. 35B), and after (FIG. 35C) latching.
Figure 35A:
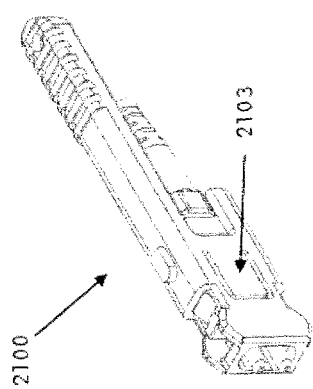
Figure 35C:
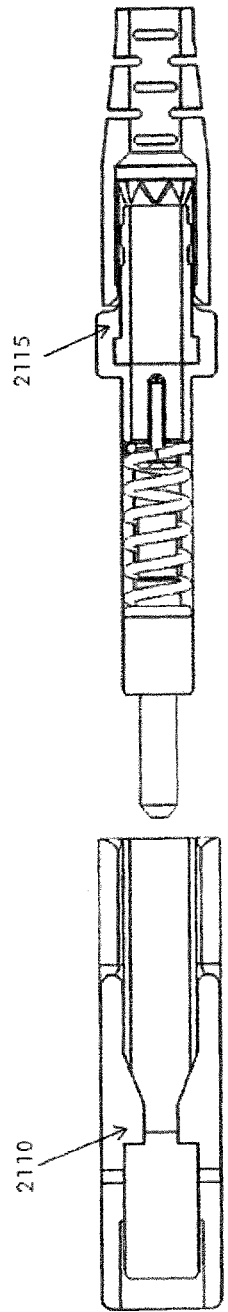

FIGS. 35A-35C depict the sequence of operations to remove an assembled front body from the outer housing in order to reverse polarity or to aggregate plural connectors in a multi-connector housing. To separate the front body from the outer housing, the connector flap 2103 is flexed outward using a finger or a tool, as depicted in FIG. 35B. Flexing the connector flap 2103 outwardly causes the protrusion 2910 to disengage from the front body's outer housing locking surface 2114, permitting the front body/ferrule assembly 2115 to be removed from the outer housing. This may be performed when it is desired to reverse the polarity of the connector (to be discussed below) or when desiring to aggregate plural connectors into a larger connector housing as discussed above. The separated components are depicted in FIG. 35C, that is, front body 2115 with the ferrule assembled therein and outer housing 2110.

In some embodiments, the back body 2130 may comprise one or more protrusions or hooks 2134, best seen in FIGS. 28A and 28B, which may interlock with a back body hook window/cutout 2119 in the front body 2115. This may allow for the back body 2130 and the front body 2115 to be securely fastened together around the ferrule(s) 2122, ferrule flange(s) 2124, and the spring(s) 2125. The back body 2130 includes a cable bore 2820, spring guides 2132, and side protrusions 2810.

Figure 23A:
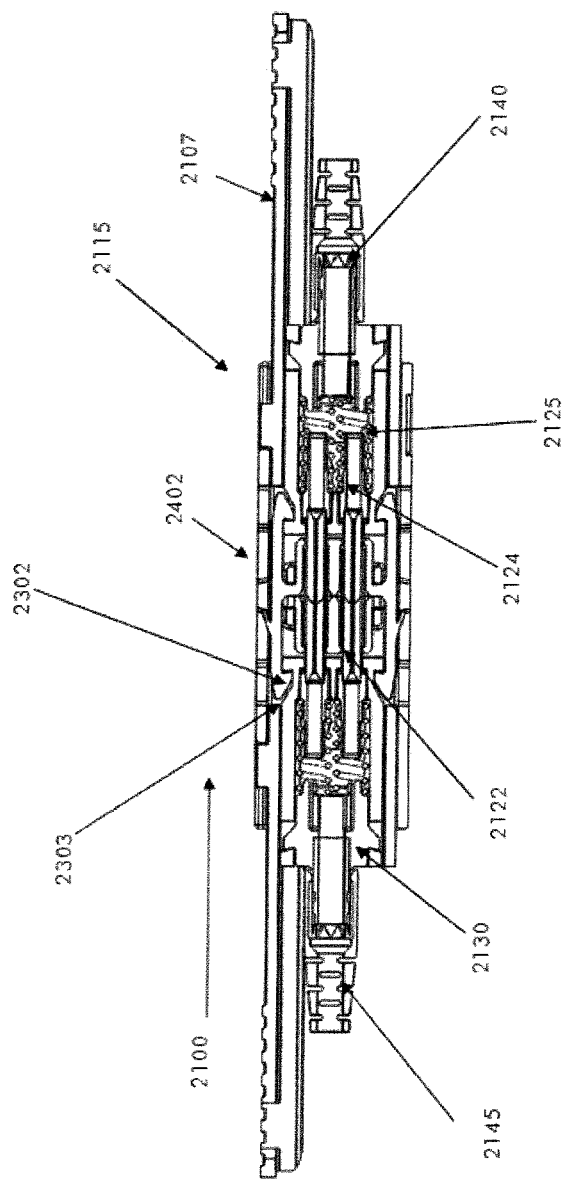
FIG. 23A is a cross-sectional view of the micro optical connector of FIG. 21B latched into the adapter of FIG. 24.
Figure 23B:
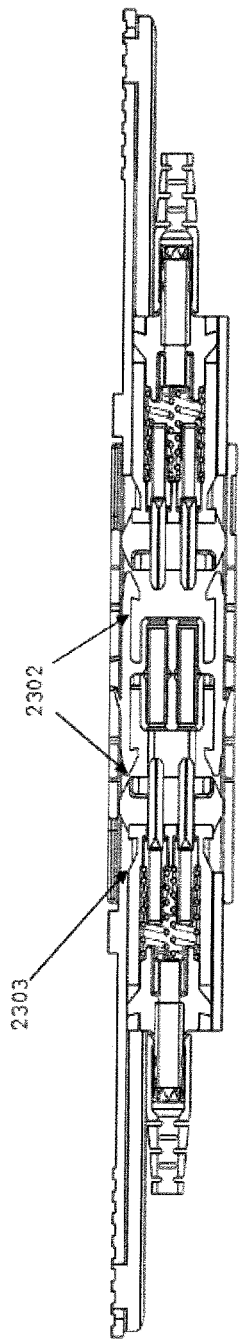
FIG. 23B is a cross-sectional view of the micro optical connectors of FIG. 21B unlatched from the adapter of FIG. 24.

During assembly, the ferrule flanges 2124 fit into ferrule flange alignment slots 2117 (see FIGS. 27A and 27B) adjacent the ferrule openings 2116 of the front body 2115, compressing the springs 2125 (preload) which are positioned along front body spring holders 2118. The ends of the springs 2125 are secured on spring guides 2132 (FIGS. 28A, 28B) of back body 2130 by spring tension. As seen in the assembled cross-sectional views of FIGS. 23A and 23B, the springs 2125 are positioned to urge the ferrules 2122 into contact with mating connectors or transceiver optics, ensuring minimum insertion loss. As further seen in FIGS. 27A and 27B, the front body includes a receptacle hook recess 2710 with a receptacle hook retainer surface 2720 the receiver a receptacle hook when mating with an adapter or with a transceiver receptacle, as shown in further detail below.

Further reductions in connector size may be obtained by reducing the size of springs 2125, see FIG. 21. By using a maximum spring outer diameter of 2.5 mm, the pitch of the ferrules, that is to say, the spacing between adjacent ferrules, may be reduced to 2.6 mm when coupled with the removal of inner housing walls and walls separating adjacent ferrules. This advantage is best seen in FIG. 22 which depicts the front of connector 2100 showing overall connector dimensions and ferrule pitch. The connector size 4.2×8.96×30.85 mm (excluding optional pull tab 2107 and connector alignment key 2105) with a ferrule pitch of 2.6 mm.

Figure 21B:
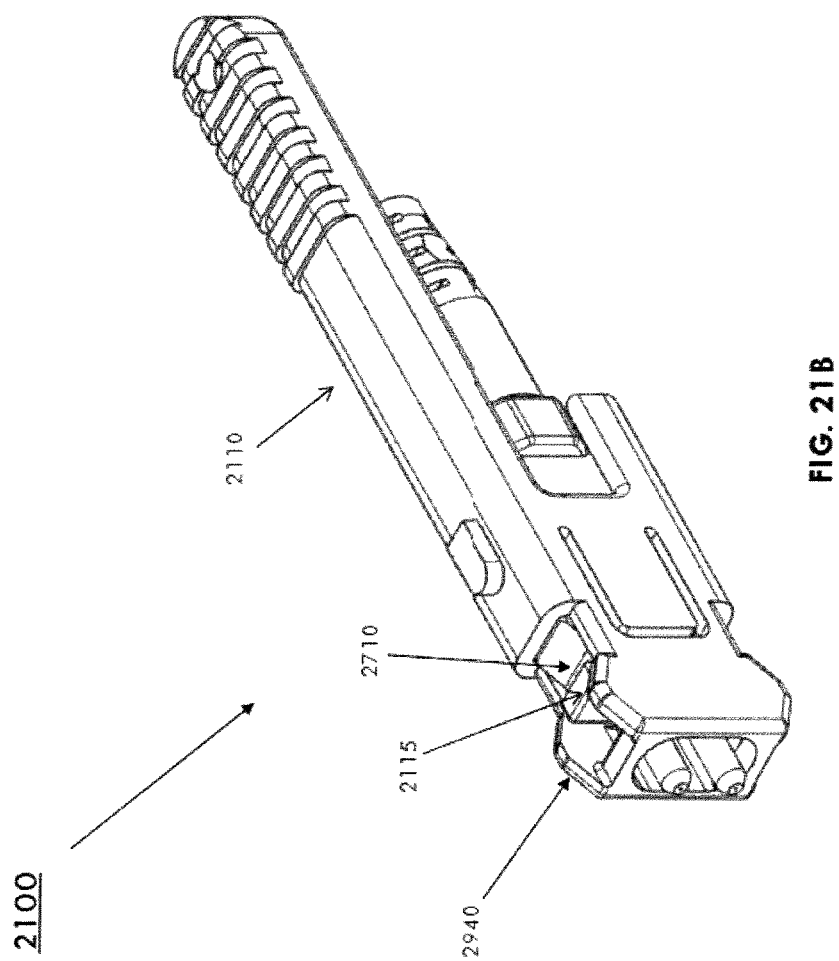
FIG. 21B is a perspective view of the assembled micro optical connector of FIG. 21A.
Figure 27B:
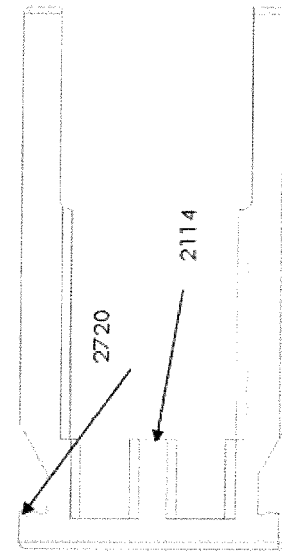
FIG. 27B is a right side view of the front body of FIG. 27A.
Figure 27A:
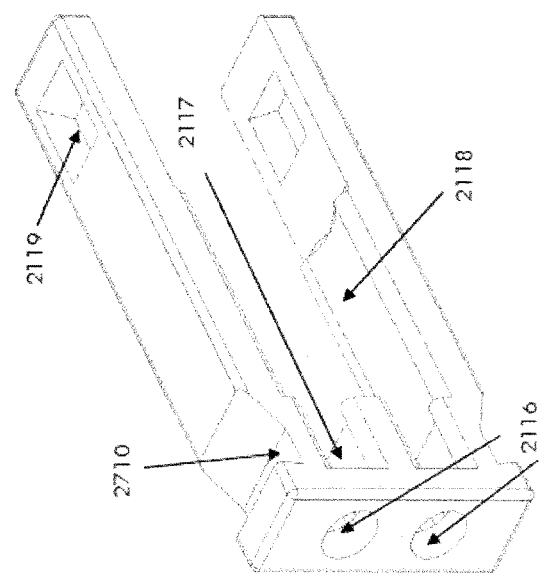
FIG. 27A is an isometric view of the front body of the micro optical connector of FIG. 21A.

As best seen in FIG. 21B, the outer housing 2110 and the front body 2115 together provide a receptacle hook ramp 2940 (on the outer housing) used to guide a receptacle hook into a receptacle hook recess 2170 (in the front body 2115), also shown in FIGS. 27A and 27B (receptacle hook recess 2710 and receptacle hook retainer surface 2720). The receptacle hook, to be discussed in more detail below, may be from an adapter or a transceiver to secure the optical connector 2100 thereto.

Figure 36A:
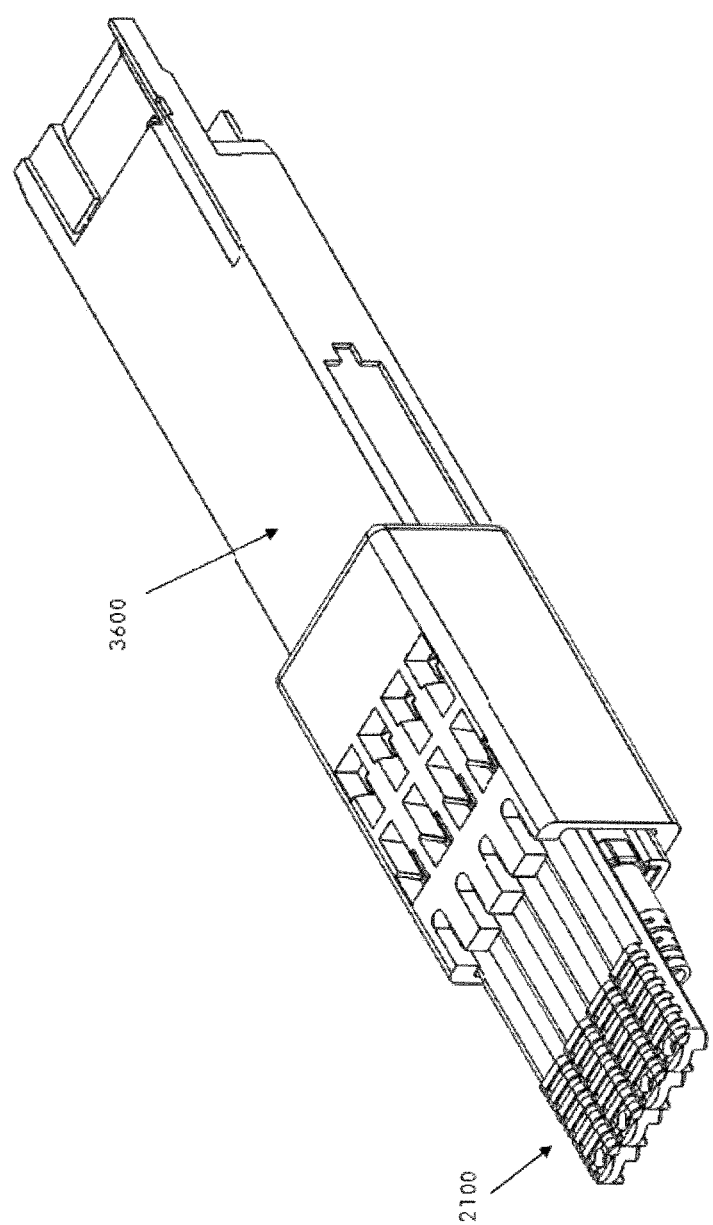
FIG. 36A depicts plural micro optical connectors in a transceiver.
Figure 36B:
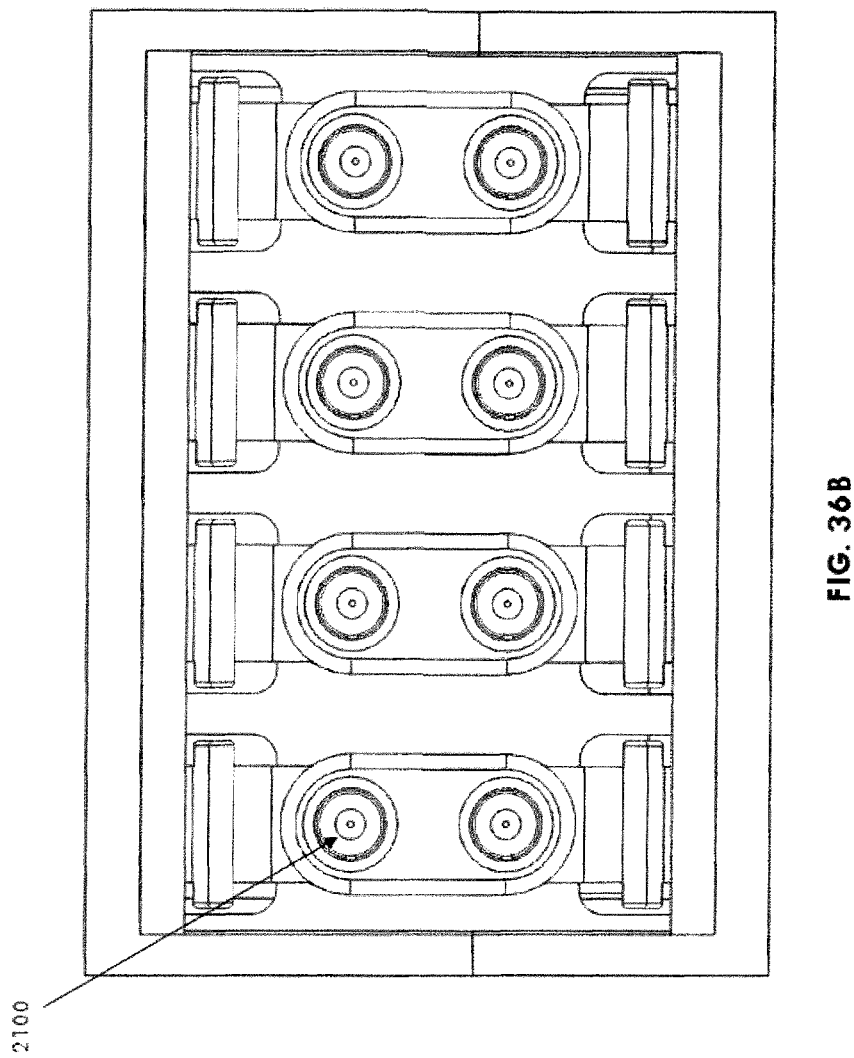
FIG. 36B is a front view of the transceiver of FIG. 36A.

The optical connectors 2100 may be used in a variety of connection environments. In some applications, the optical connectors 2100 will mate with other optical connectors. Typically, this mating will occur with a receptacle such as an adapter or optical transceiver receptacle. An exemplary adapter 2400 depicted in FIG. 24 in an exploded view and depicted in FIG. 31 having four mating pairs of optical connectors 2100 latched therein. In other applications, as when an optical signal is to be converted to an electrical signal, the micro optical connectors 2100 will mate with an optical receptacle in a transceiver 3600 as shown in FIG. 36. Typically, transceiver 3600 may be found in a data center, switching center, or any other location where optical signals are to be converted to electrical signals. Transceivers are often a part of another electrical device such as a switch or a server, as is known in the art. Although much of the connection operation of this embodiment will be described with respect to an adapter, 2400, it is understood that substantially similar mechanical retention mechanisms are positioned within the receptacle of transceiver 3600 so that any description of connector retention in adapter 2400 applies in a substantially similar way to retention of an optical connector within transceiver 3600. An example of a transceiver optical receptacle is depicted in FIG. 36B (holding optical connectors 2100); as seen in FIG. 36B, the connection environment is substantially similar to one-half of an adapter 2400.

Figure 24:
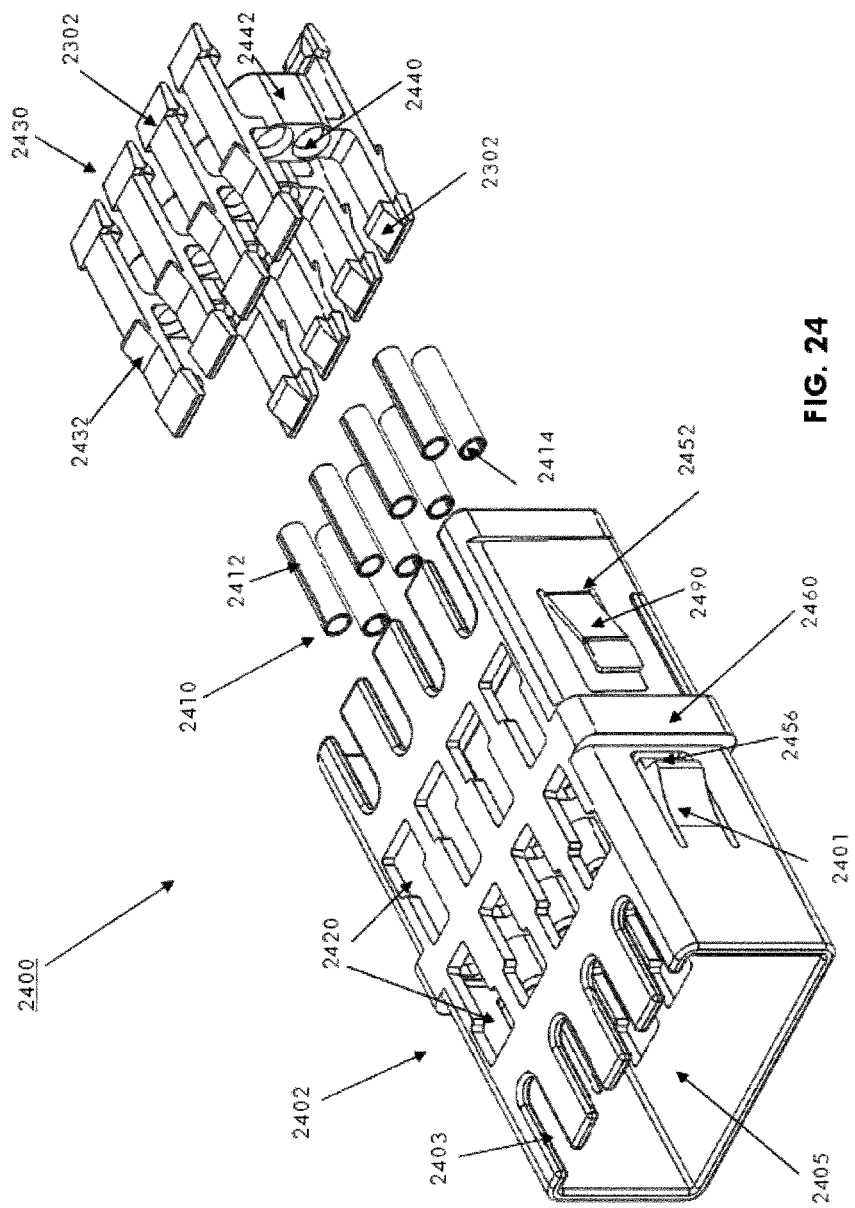
FIG. 24 is an exploded view of an adapter for the micro optical connectors of FIG. 21B.

Turning to FIG. 24, further size reductions in the overall optical assembly of connectors plus adapter or connectors plus transceiver may be obtained through various connection mechanisms to be described with respect to the adapter 2400 but also apply to optical connection features within the front end of transceiver 3600. The adapter 2400 includes an adapter housing 2402 having an adapter alignment assembly 2430 positioned therein. The adapter alignment assembly 2430 includes alignment sleeves 2410 positioned within alignment sleeve openings 2440 of alignment sleeve holders 2442. The adapter alignment assembly further includes receptacle hooks 2302 that will grip optical connectors 2100 through front body connector hook recess 2710 of FIG. 21B. As seen in FIG. 30, receptacle hooks 2302 include an inner surface 3110. The adapter housing 2402 further includes connector alignment slots 2403 that mate with connector alignment key 2105 of FIG. 21A. The connectors 2100 are received through connector opening 2405 of the adapter housing 2402 which also includes flex tab 2401, cutout 2456, mount plate 2452 and panel hook 2490. To assemble the adapter alignment assembly 2430 in the adapter housing 2402, adapter housing hooks 2432 are provided. Adapter housing hooks 2432 are received in housing adapter hook openings.

It should be understood that above description of connection mechanisms with respect to adapter 2400 may be applied in a substantially similar way with respect to the receptacle of transceiver 3600. Particularly, the receptacle of transceiver 3600 may include a receptacle housing having a receptacle alignment assembly positioned therein. The receptacle alignment assembly includes alignment sleeves positioned within alignment sleeve openings of alignment sleeve holders. The receptacle alignment assembly further includes receptacle hooks that will grip optical connectors 2100 through front body connector hook recess 2710 of FIG. 21B. As seen in FIG. 30, receptacle hooks 2302 include an inner surface 3110. The receptacle housing further includes connector alignment slots that mate with connector alignment key of FIG. 21A. The connectors 2100 are received through connector opening of the receptacle housing which also includes flex tab, cutout, mount plate and panel hook. To assemble the receptacle alignment assembly in the receptacle housing, receptacle housing hooks are provided. Receptacle housing hooks are received in housing receptacle hook openings.

Figure 25A:
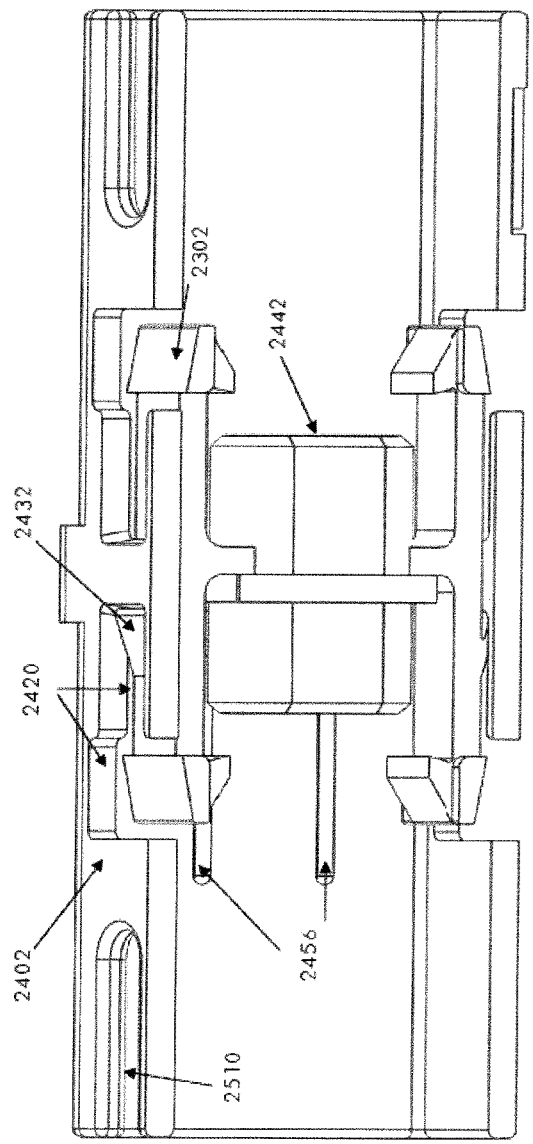
FIG. 25A is a cross-sectional view of the adapter of FIG. 24, assembled.
Figure 32A:
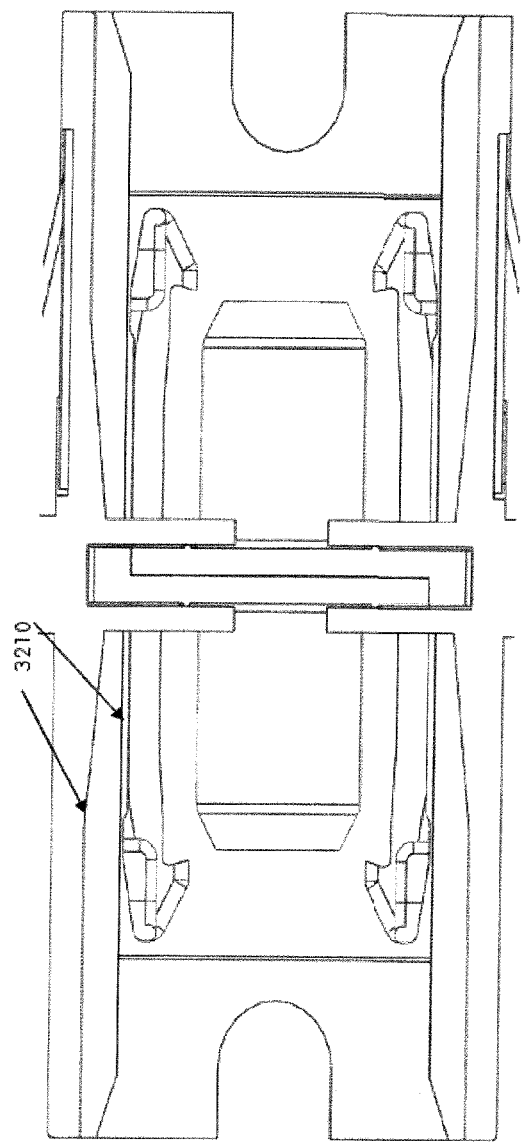
FIG. 32A is cross-sectional view of a prior art connector showing a latch gap.
Figure 32B:
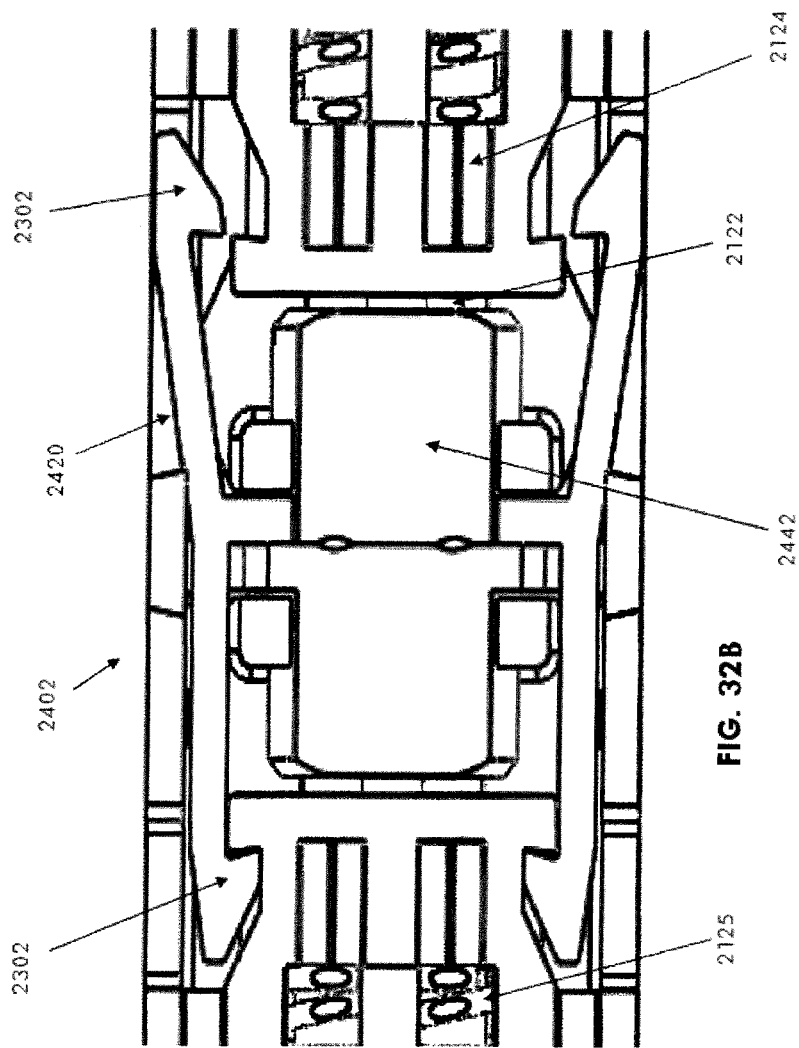
FIG. 32B is a cross-sectional view of the micro optical connector of FIG. 21B latched (left) and unlatched (right) within the adapter of FIG. 24, assembled.

To further reduce the size of optical connectors and associated mating components, the adapter housing 2402 includes receptacle hook openings 2420, seen in FIGS. 25A and 25B. Receptacle hook openings 2420 accommodate the clearance required by receptacle hooks 2302 when they flex upwards prior to latching with connectors 2100. The interaction of the receptacle hooks 2302, having slanted inner surfaces 3110, with the receptacle hook openings 2420 is best seen in FIGS. 32B and 34A-C. Prior to latching (FIG. 34A), the receptacle hook 2302 is in an unflexed condition within the receptacle (adapter or transceiver). As the connector 2100 is inserted into the adapter housing 2402 or the transceiver, the receptacle ramp 2490 pushes against the receptacle hook inner surfaces 3110, flexing receptacle hook 2302 into the receptacle hook opening 2420. Without providing the opening, additional clearance would need to be provided to accommodate the flexing of the receptacle hook 2302. This additional required clearance is depicted in the prior art connector/adapter of FIG. 32A. As seen in FIG. 32A, a connector latch gap 3210 must be provided in the prior art to accommodate the prior art connector hooks, increasing the overall footprint of the prior art connector/adapter assembly. By providing receptacle hook openings 2420 in the present disclosure, approximately 2.25 mm of valuable footprint real estate is obtained which may be used to increase connector density.

Figure 26:
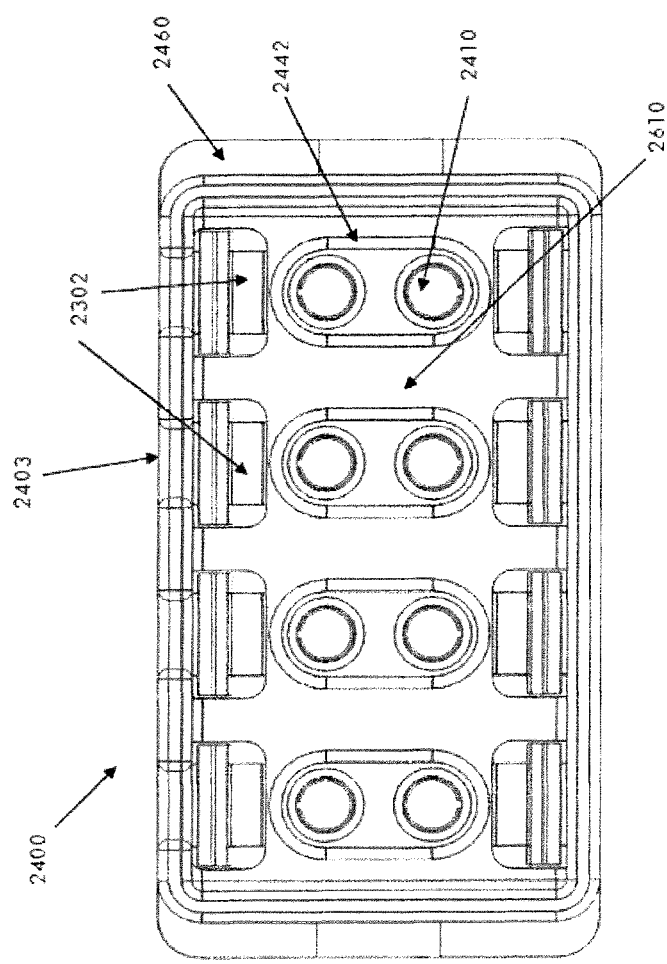
FIG. 26 is a front view of the assembled adapter of FIG. 24.

Another improvement in adapter size is obtained by removing prior art adapter walls between adjacent connectors. This is best seen in the front view of an assembled adapter 2400 shown in FIG. 26. As seen, pairs of ferrule alignment sleeves 2410 are separated only by connector gap 2610 with a 4.35 mm pitch between adjacent connectors. The adapter size is 19.0×10.71×32.5 mm (excluding the adapter flange 2460). Also seen in FIG. 26 is the connector alignment slot 2403, alignment sleeve holder 2442, and a front view of receptacle hooks 2302.

Figure 31:
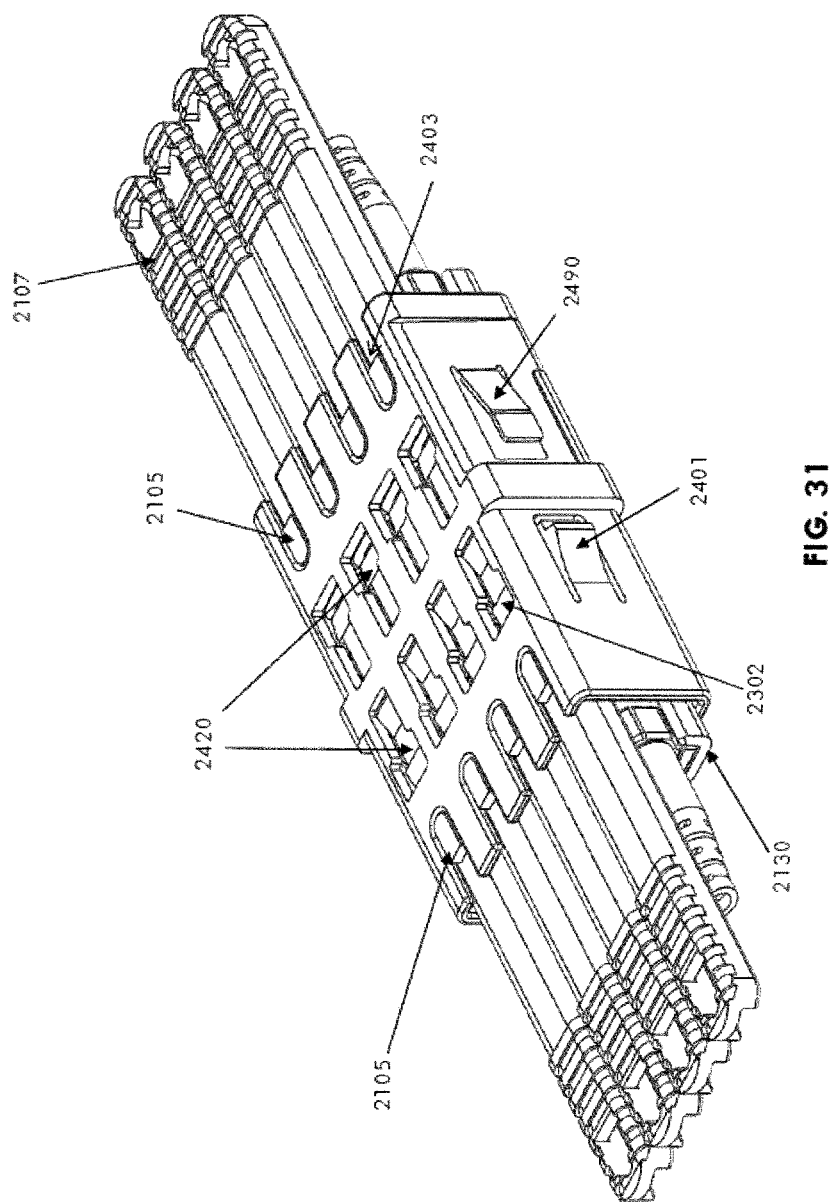
FIG. 31 is an isometric view of the adapter of FIG. 24 assembled with the micro optical connectors of FIG. 21B.

FIG. 31 depicts an assembled adapter 2400 with four pairs of mating connectors 2100 latched therein. Note that in the latched position, receptacle hooks 2302 do not extend into receptacle hook openings 2420. This is further visible in the cross-sectional view of an assembled adapter 2400 of FIG. 25A. Connector alignment keys 2105 are positioned within connector alignment slots 2403. As seen in the cross-sectional view of FIG. 23A, the push-pull tab 2017 may extend beyond the connector boot 2145 providing clearance to easily grip the tab and remove a connector. Also seen in FIG. 31 is adapter flex tab 2401 and panel hook 2490 for interaction with racks or other equipment.

Through the various features described above, the density of optical connectors 2100 that may be provided in the standard transceiver footprint connector spaces may be doubled. For example, in a small form factor pluggable (SFP) footprint of 14×12.25 mm, two connectors 2100 having four LC-type ferrules 2122 of 1.25 mm outer diameter may be accommodated as seen in FIG. 33B. Similarly, in a quad small form factor pluggable (QSFP) footprint of 13.5×19 mm, four connectors 2100 having a total of eight LC-type ferrules 2122 may be accommodated as seen in FIG. 33A. Further, by providing the connectors in transmit and receive pairs, greater flexibility in optical routing is obtained, as demonstrated by previous FIGS. 16 and 17.

Turning to FIG. 37, another embodiment of an optical connector is depicted. In this embodiment, the last two digits of each element correspond to the similar elements in the optical connector of FIG. 21A et seq. In FIG. 37, connector 3700 may include an outer housing 3710, a front body 3715, one or more ferrules 3722, one or more ferrule flanges 3724, one or more springs 3725, a back body 3730, a back post 3735, a crimp ring 3740 (depicted with an optional heat shrink tube extending therefrom), and a boot 3745. The outer housing 3710 may include a longitudinal bore 3701 for accommodating the front body 3715 and ferrules 3722, a connector alignment key 3705 used during interconnection, a connector flap 3703 and an optional pull tab 3707 to facilitate removal of the connector 3700 when connected in a dense array of optical connectors. Optionally, the ferrules may be LC-type ferrules having an outer diameter of 1.25 mm.

Figure 38:
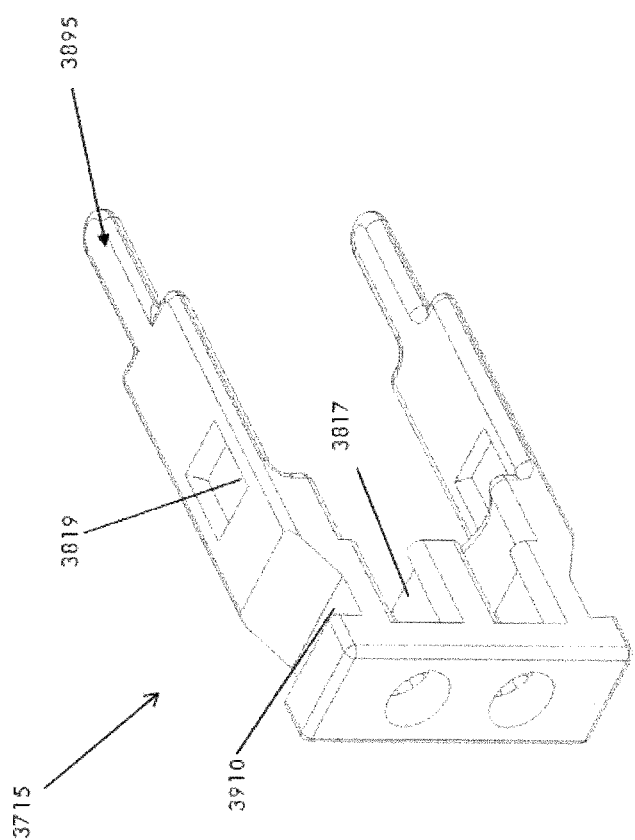
FIG. 38 is an isometric view of a front body of the micro optical connector of FIG. 37.

In FIG. 38 an isometric view of the front body 3715 is depicted. In this embodiment, the back body hook cutout 3819 has been moved forward, advantageously strengthening the assembled connector in side load environments. An alignment tab 3895 is provided for mating with a receiving recess on the back body. The receptacle hook recess 3910 operates in a substantially similar manner to the recess of FIG. 21A, described above. A ferrule flange alignment slot 3817 is also provided.

In FIG. 39, the back body 3730 is depicted, showing alignment tab recess 3997 for receiving alignment tab 3895. The front body hook 3934, for interconnecting in back body hook cutout 3819, extends outwardly from the main portion of the back body through extended hook arm 3996. Through the extended hook arm 3996 and the alignment tab 3895, breakage during side loads is reduced as the load is redistributed more evenly across the entire connector, reducing stress on the backpost.

Figures 40A, 40B, 40C:
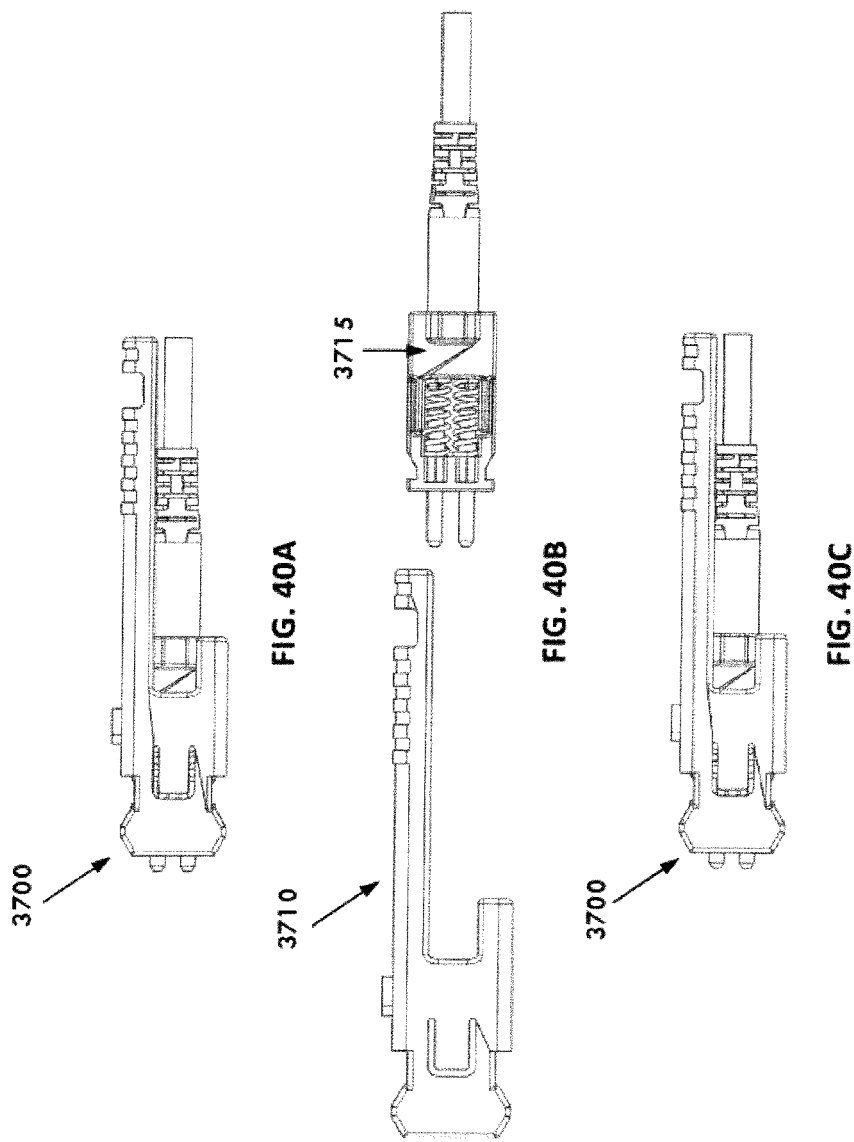
FIGS. 40A, 40B, and 40C depict a technique for reversing polarity of the optical connector of FIG. 37.

As seen in FIGS. 40A-40C, the assembled front body 3715 may be removed from the outer housing 3710, rotated 180° as indicated by the arrow (FIG. 40B), and re-inserted into the outer housing (FIG. 40C). This allows for a change in the polarity of the front body 3715, and therefore the ferrules can switch quickly and easily without unnecessarily risking the delicate fiber cables and ferrules. As described previously with respect to FIGS. 35A-35C, connector flap 3703 is flexed outward to release the front body from the outer housing.

Figure 41:
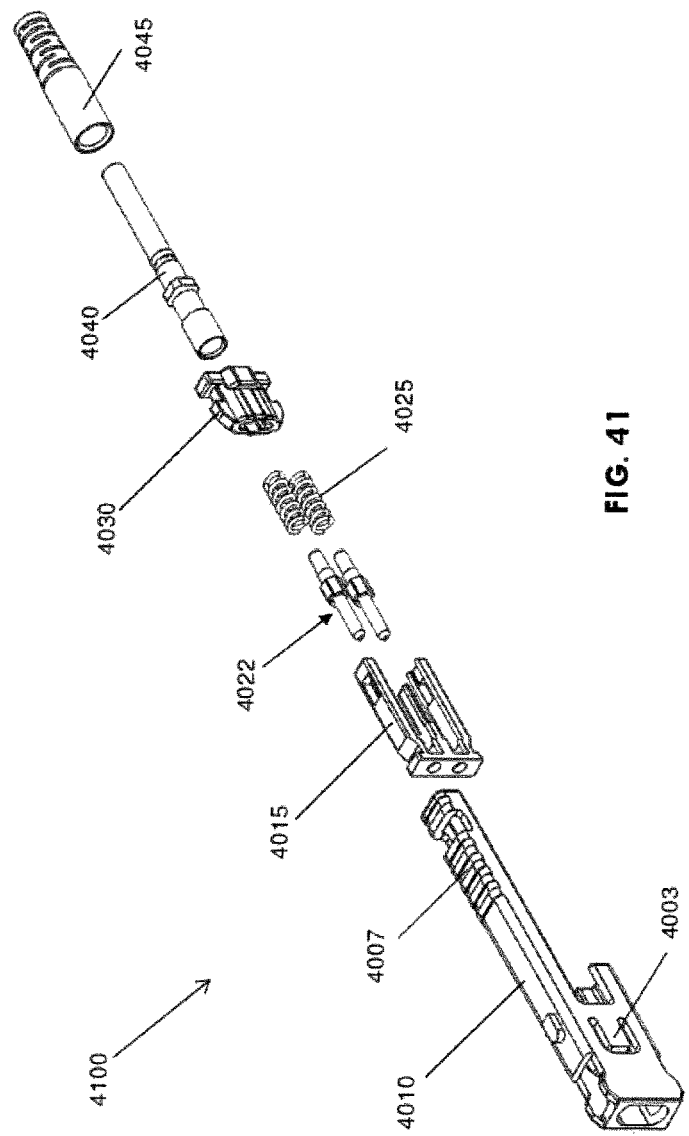
FIG. 41 is an exploded view of a micro optical connector according to a further embodiment.

Turning to FIG. 41, another embodiment of an optical connector is depicted. In this embodiment, the last two digits of each element correspond to the similar elements in the micro optical connectors of FIG. 21A and FIG. 37. In FIG. 41, connector 4100 may include an outer housing 4110, a front body 4115, one or more ferrules 4122, one or more springs 4125, a back body 4130, a crimp ring 4140, and a boot 4145. The outer housing 4110 may include a connector flap 4103 and an optional pull tab 4107 to facilitate removal of the connector 4100 when connected in a dense array of optical connectors. Optionally, the ferrules may be LC-type ferrules having an outer diameter of 1.25 mm.

Figure 42:
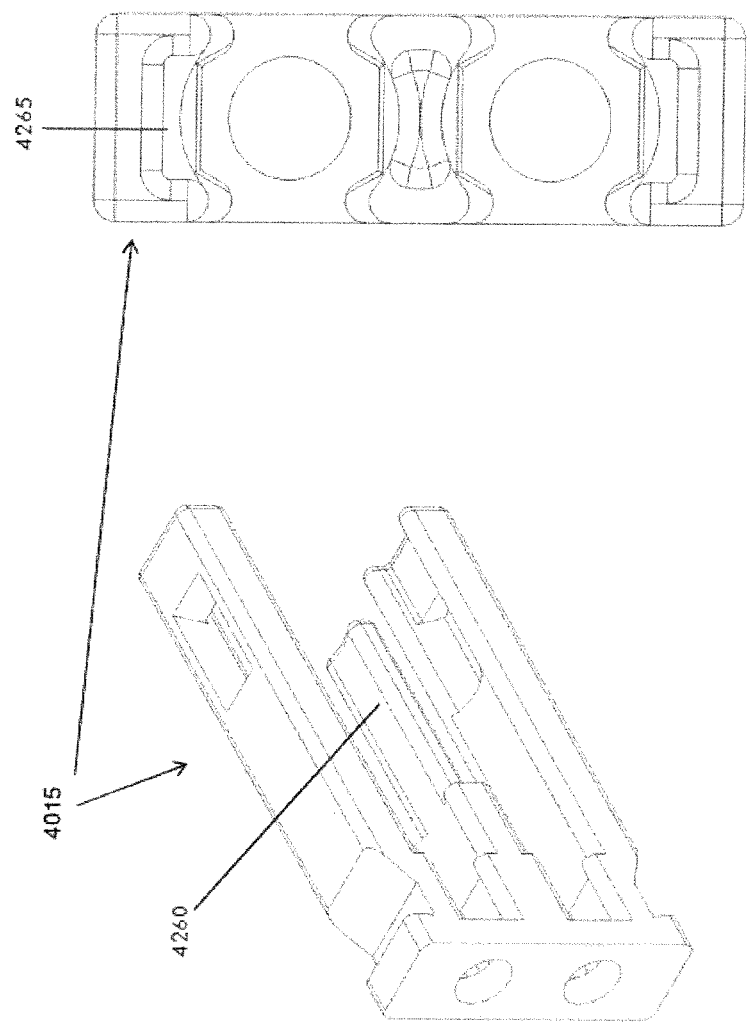
FIG. 42A is an isometric view of the front body of the micro optical connector of FIG. 41.
FIG. 42B is a side view of the front body of FIG. 42A.

As seen in FIG. 42A, the front body 4015 in this embodiment includes a middle wall 4260 interposed between the ferrules and springs when the front body is assembled. This middle wall reduces the possibility of the springs becoming entangled with each other, binding the connector and breaking the optical fibers. The front body 4015 also includes an alignment cut out guide 4625, seen in the side view of FIG. 42B. The alignment cut out guides the back body 4030 into the front body 4015 during assembly of the connecter, and also further reduces the side load that leads to connector breakage or disconnection of the front body and the back body 4030.

Figure 43:
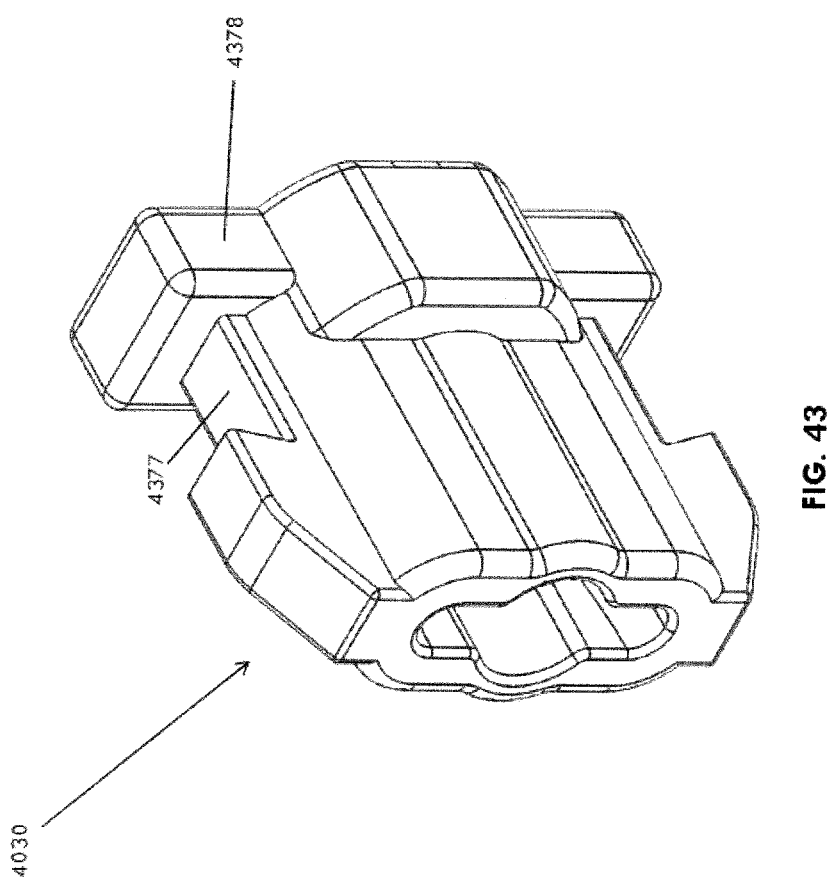
FIG. 43 is an isometric view of the back body of the micro optical connector of FIG. 41.

Back body 4030, depicted in an enlarged view in FIG. 43, includes an alignment guide 4377 that fits into the alignment cut out guide 4265 of FIG. 42B. The wall structure 4378 also stops the front body to prevent over-compressing the springs and provides strength under a side load.

Figure 44A:
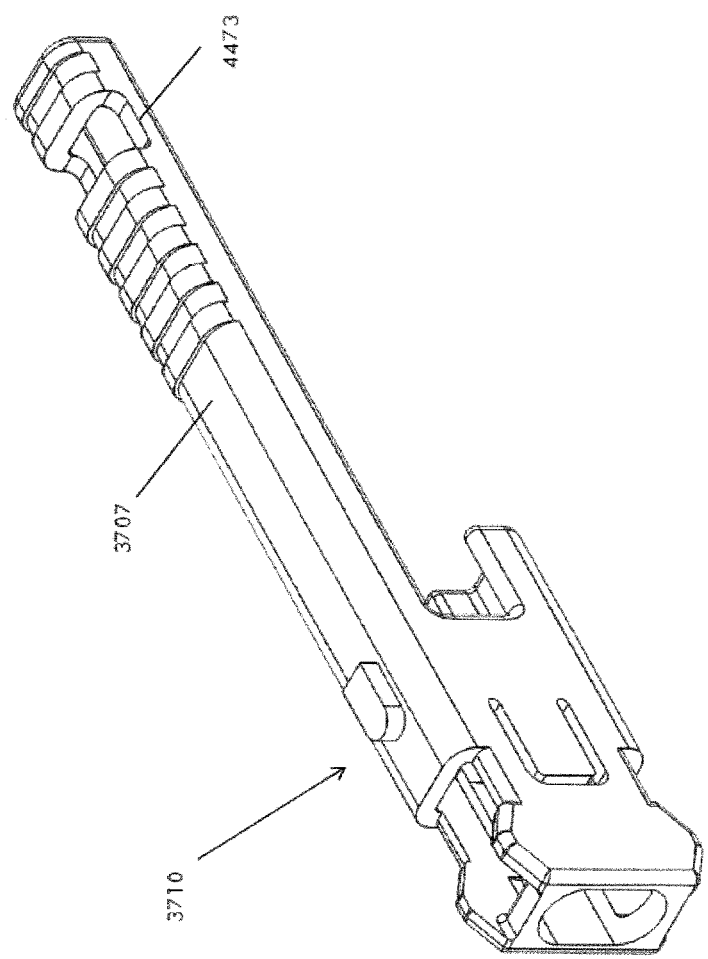
FIGS. 44A, 44B, and 44C are isometric views of the outer housings that may be used with any of the micro optical connectors of FIGS. 21A, 37, and 41.
Figure 44B:
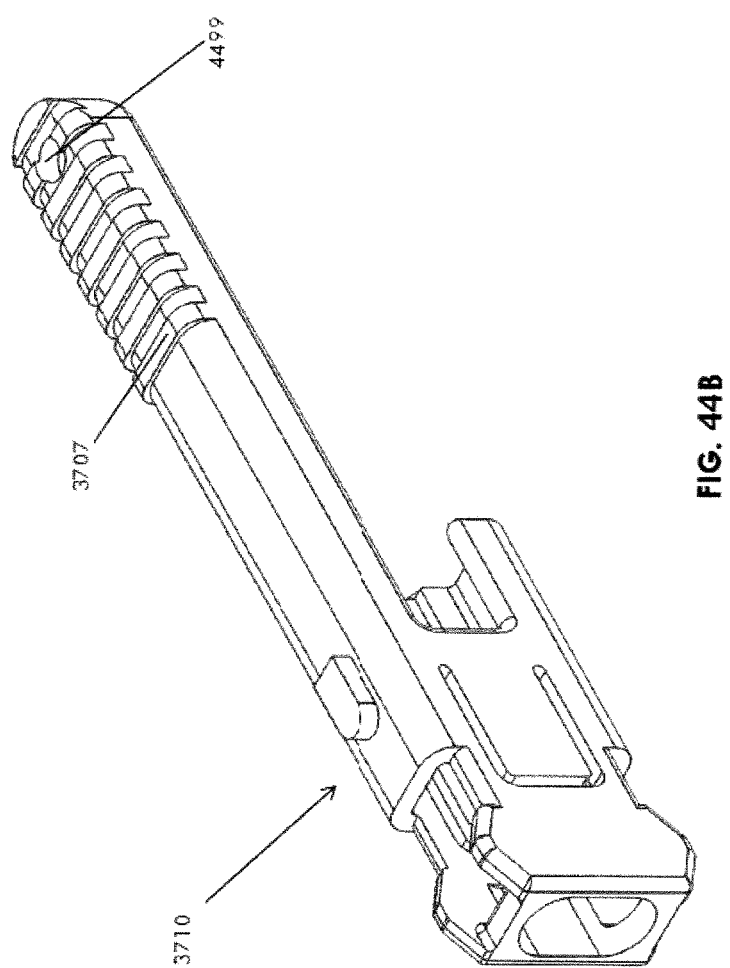
Figure 44C:
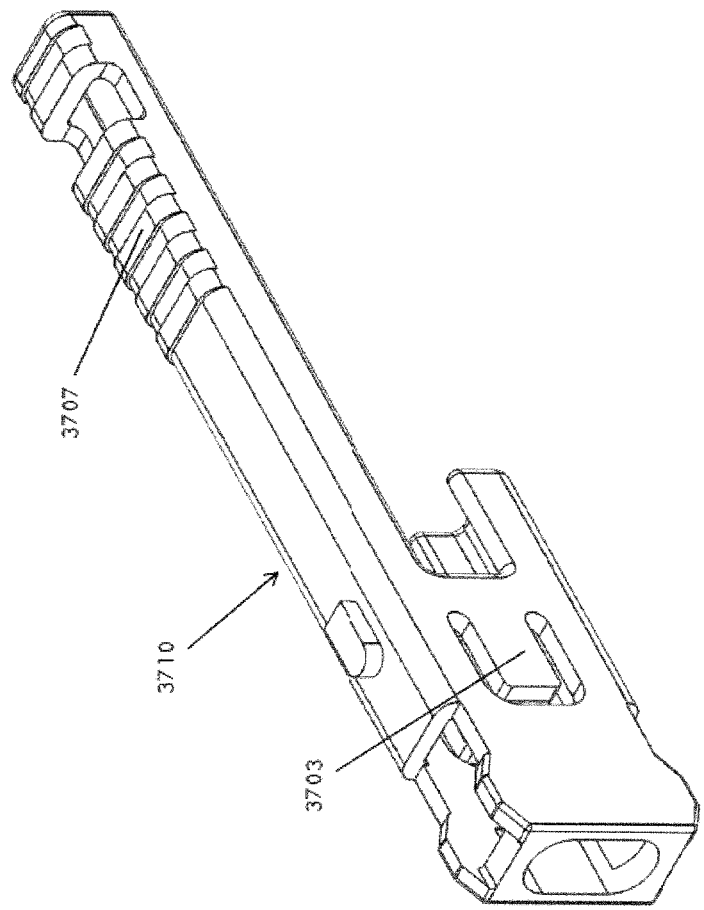

Various modifications to the outer housing, depicted in FIGS. 44A-44C, may be used with any of the optical connectors depicted in FIGS. 21, 37, and 41 or earlier embodiments. In FIG. 44A, the push-pull tab 3707 may include a release recess 4473. Release recess 4473 permits insertion of a tool or fingernail to remove the connector from an adapter or transceiver, without disturbing adjacent connectors. Similarly, FIG. 44B depicts a release hole 4499 in push-pull tab 3707 to permit insertion of an extraction tool to remove the connector from an adapter or transceiver. FIG. 44C shows a modified connector flap 3703 with an increased cutout size of 1 mm to make it easier to insert a tool or a finger to flex the flap 3703 and remove the front body assembly when making a polarity change or aggregating the front body with other front bodies in a larger outer housing.

Figure 46:
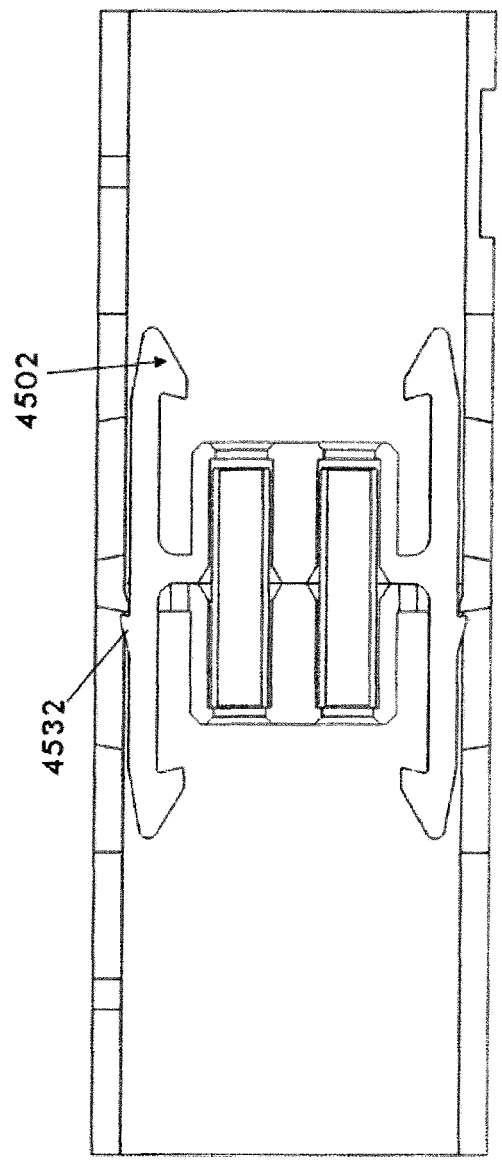
FIG. 46 is a cross-section of the adapter of FIG. 45, assembled.

Another embodiment of an adapter/transceiver receptacle is depicted in FIG. 45. Unlabeled elements are substantially similar to elements depicted in FIG. 24. In this FIG., adapter housing hooks 4532 can be seen along with receptacle hooks 4502. Turning to the cross-sectional view of the assembled adapter in FIG. 46, the engagement of these elements may be seen.

Figure 47:
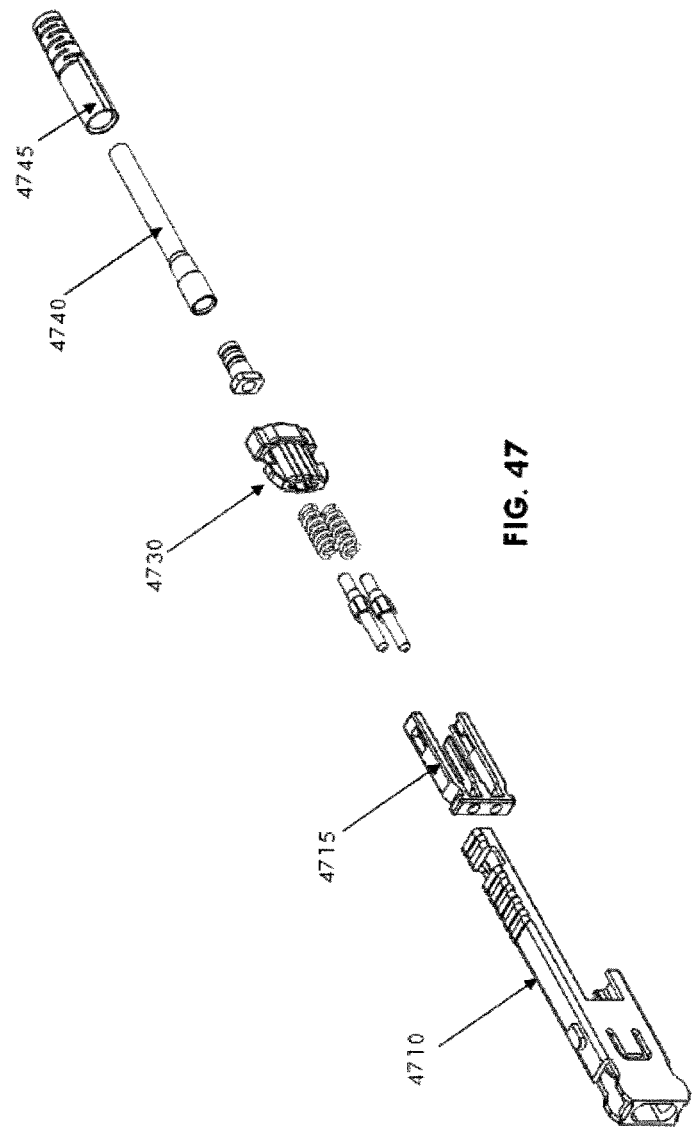
FIG. 47 is an exploded view of a connector according to another embodiment.

Another embodiment of an optical connector 4700 is depicted in FIG. 47. The optical connector of FIG. 47 includes outer housing 4710, front body 4715, ferrules 4722, springs 4725, back body 4730, backpost 4735, crimp ring 4740, and boot 4745. Here, the emphasis is on the back body, 4730. A more detailed view of the back body 4730 is presented in FIG. 48. In this embodiment, the backpost flange has a substantially rectangular shape in order to narrow the overall connector profile by approximately 0.5 mm. Back post overmolding 4859 accommodates the back post flange 4857 and reduces the potential for back post breakage. The back wall 4853 is extended in length to 3 mm from 1.5 mm to improve the sideload strength of the overall connector. The crimp ring positioning 4855 is inversed from earlier embodiments to improve holding of aramid fiber from an optical fiber cable, improving cable retention of the back post.

Figure 48:
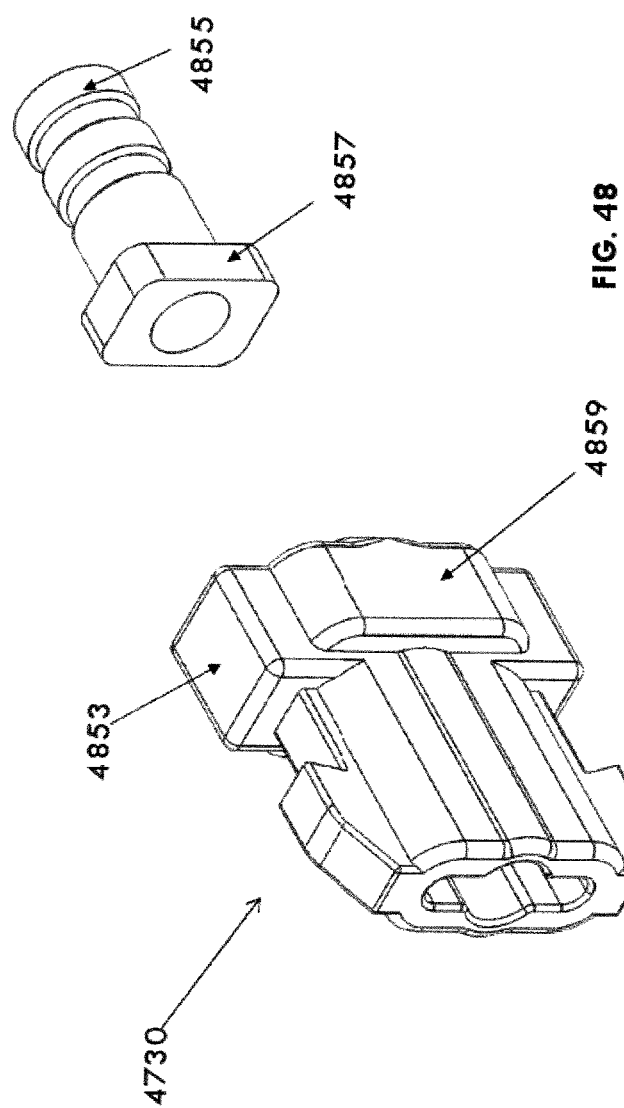
FIG. 48 is an isometric view of the back body and the back post of the connector of FIG. 47.
Figure 49:
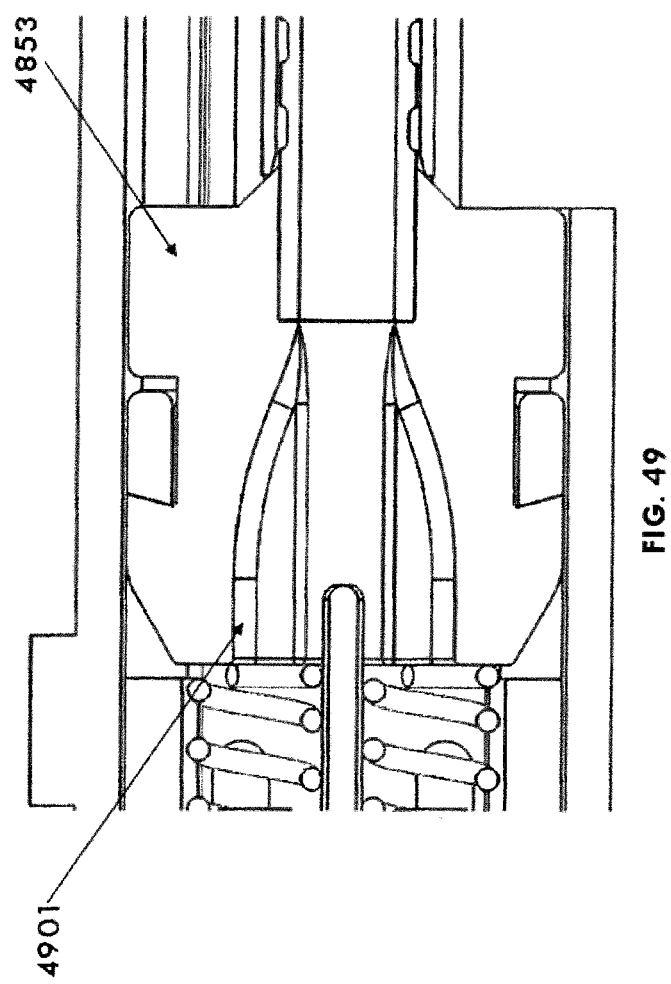
FIG. 49 is a cross-section of the back post of FIG. 47 assembled with optical fibers.

Many advantages are achieved by the backpost of FIG. 48. In addition to increased connector strength, a longer fiber path 4901 is provided as shown in FIG. 49. This longer fiber path, approximately 1.5 mm longer than in previous embodiments, allows for a gentler curve as the fibers are split from the fiber optic cable, improving insertion and return loss of the fibers. In FIG. 49, the back wall 4853 can be seen as a portion of the back body 4730.

Figure 50:
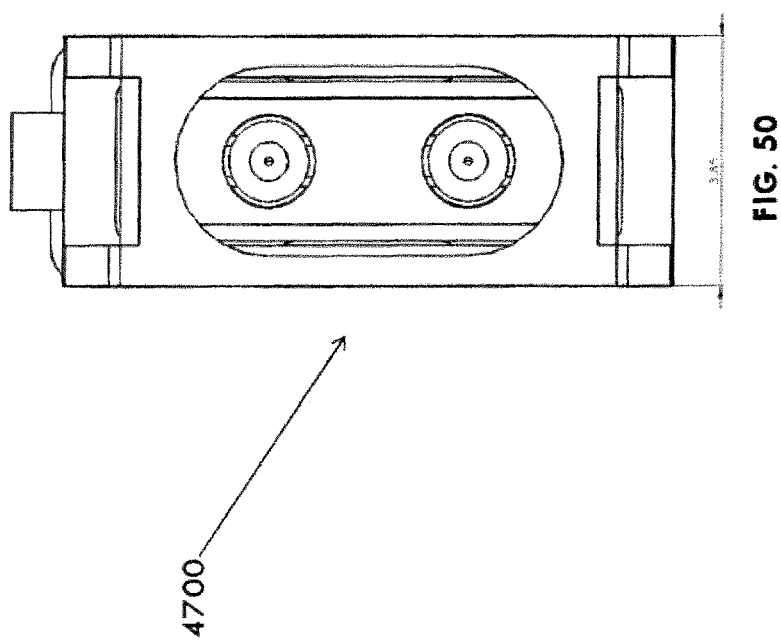
FIG. 50 is a front view of the connector of FIG. 47.

In view of the various modifications of this embodiment, FIG. 50 depicts a connector 4700 front view showing overall reduced connector width of 3.85 mm. Such a size reduction permits 4 optical connectors (a total of 8 ferrules) to be accommodated in a transceiver or connector footprint of 16 mm (including tolerances). Thus, the connectors of the present invention may be used to connect 8 LC-ferrule-housed fibers in a QSFP footprint.

Figure 51:
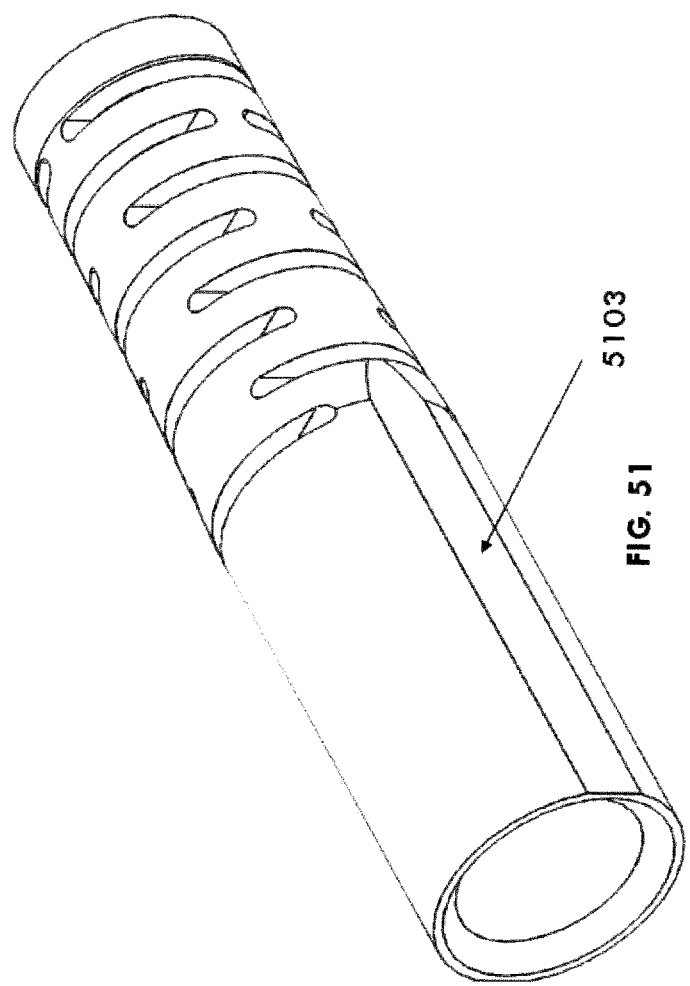
FIG. 51 is an isometric view of the boot of the connector of FIG. 47.
Figure 52:
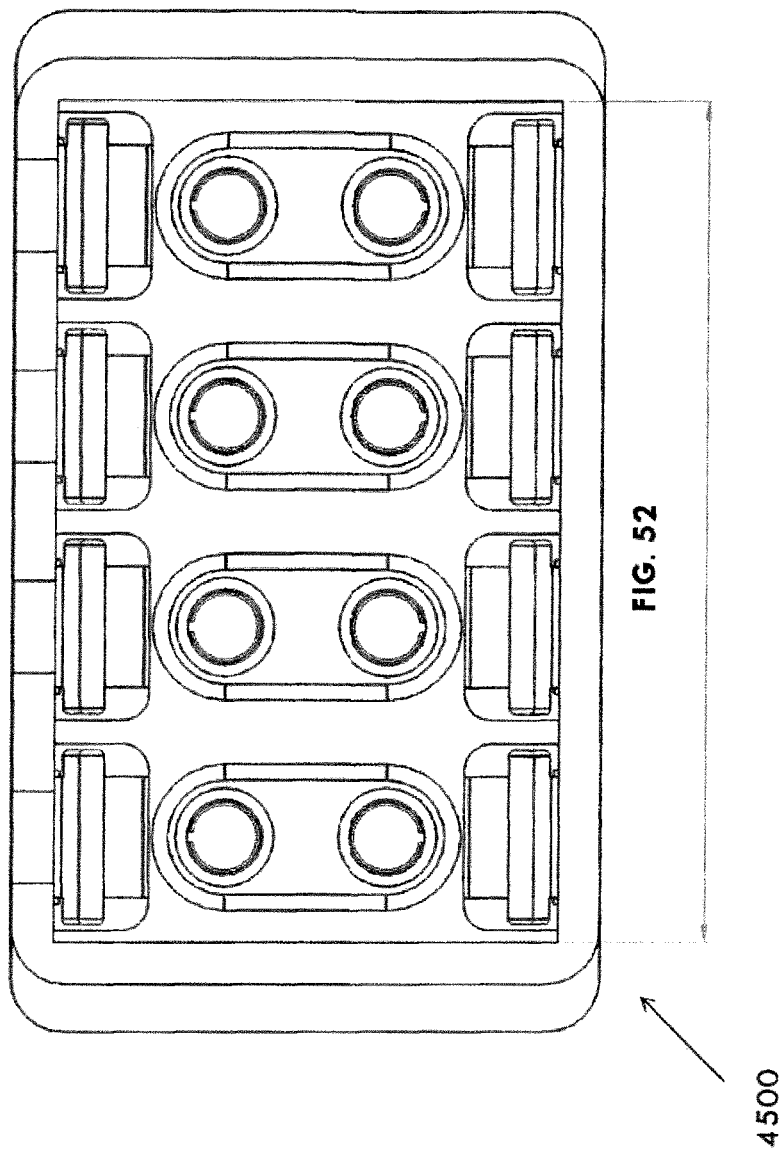
FIG. 52 is a front view of the adapter of FIG. 45.

To further decrease the space required by the optical connectors, a side thickness reduction may be carried out on the boot of connector 4700. Side thickness reduction 5103, depicted in FIG. 51, narrows the thickness of the boot on either side, reducing the space required by the boot to the 3.85 mm profile of connector 4700. Thus four connectors will fit in the QSFP transceiver footprint. This footprint is shown in the adapter front view of FIG. 52—as noted above, the front view of an adapter and that of a transceiver are substantially similar from the optical perspective. In FIG. 52, the adapter inner wall is reduced from 17.4 mm to 16 mm. All of the modifications set forth in the FIG. 47 et seq. embodiment make it possible for the four connectors to fit in the profile of FIG. 52.

Figure 53:
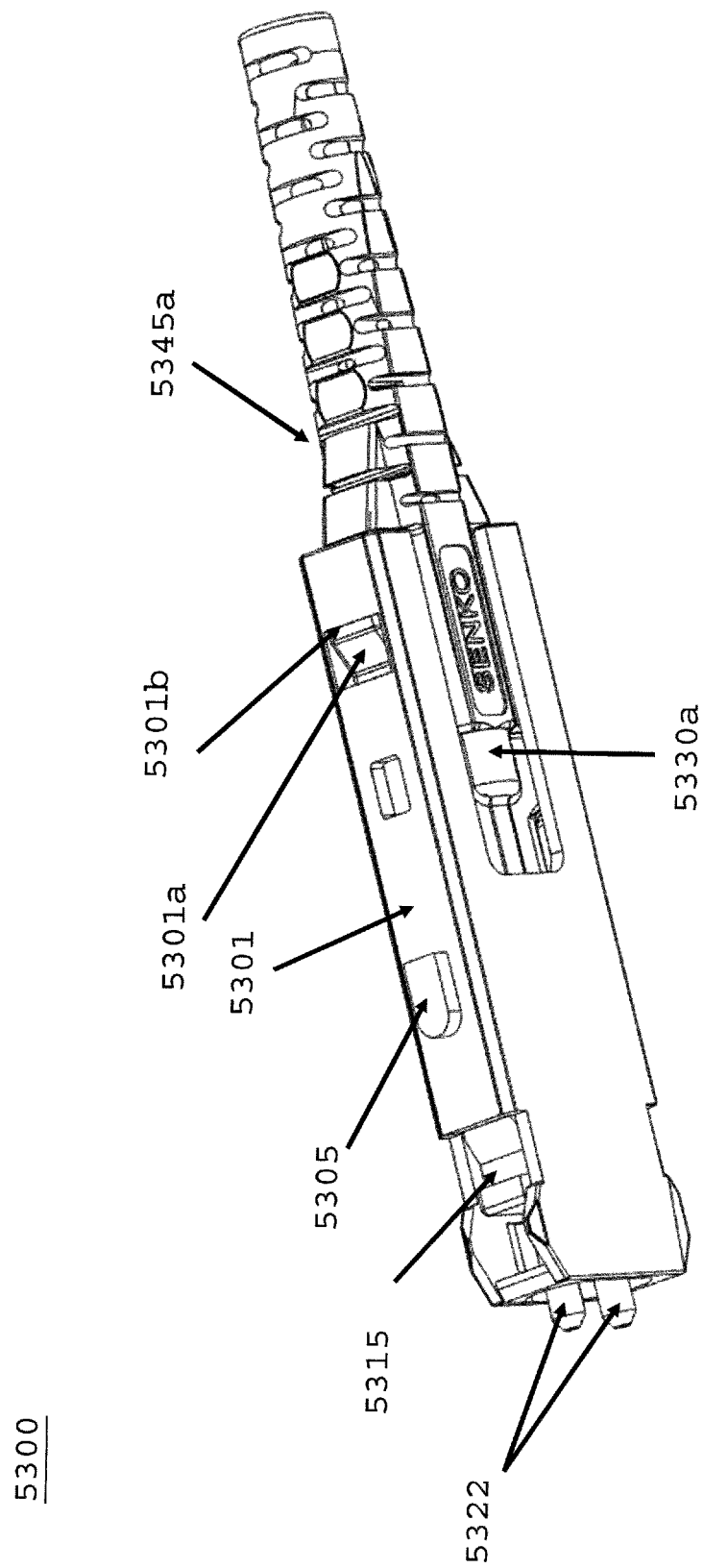
FIG. 53 is perspective view of connector of FIG. 47 with push/pull release embodiment incorporated therein.
Figure 57:
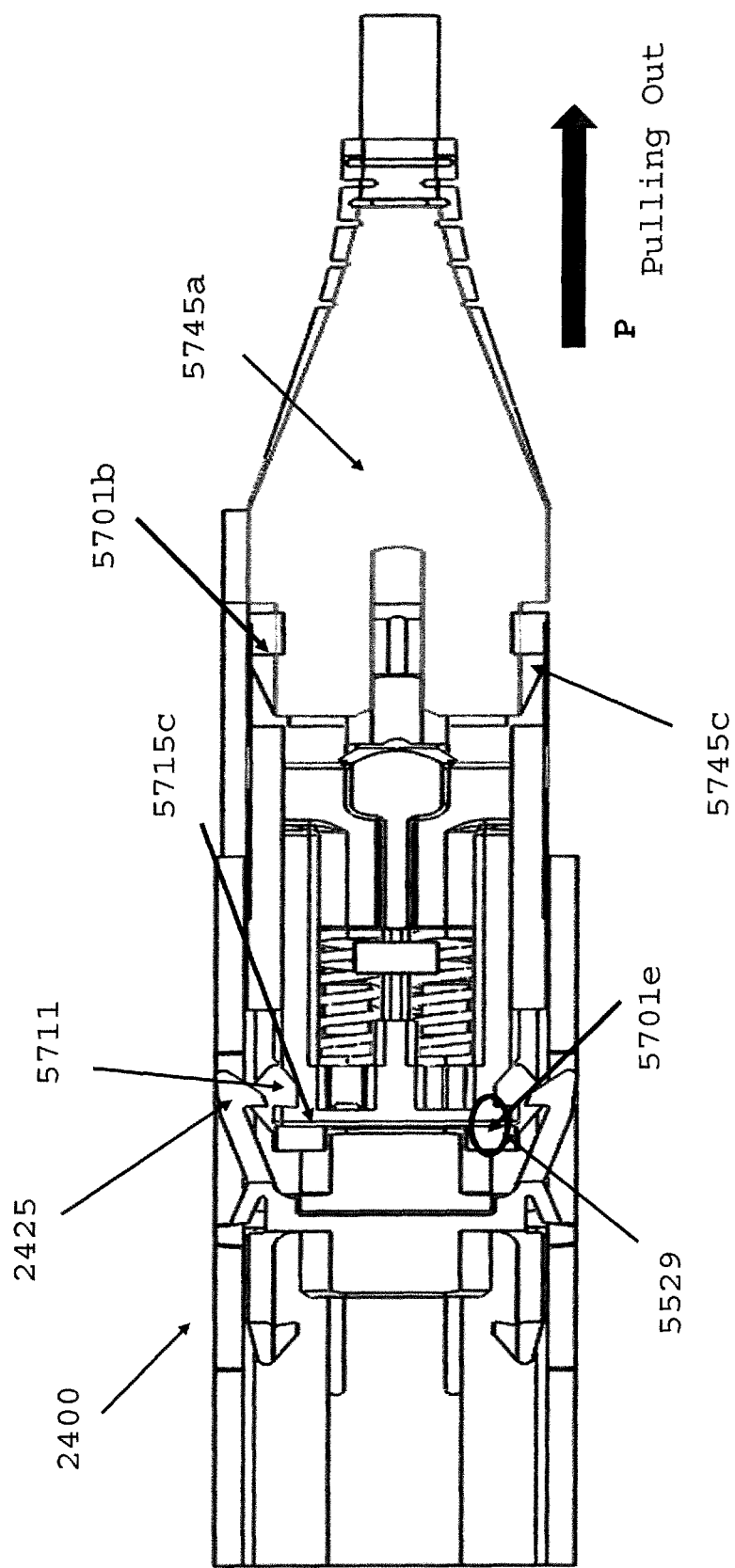
FIG. 57 is a cross-section view of connector of FIG. 53 partial removed using push/pull release boot according to the present invention.

FIG. 53 depicts connector 2100 with a push/pull boot assembly 5345a at its distal end receiving a fiber cable with a plural of fiber strands therein, and a proximal end configured to connect and secure to a back body 5330 secured with outer housing 5301. Outer housing 5301 has an opening 5301a with a stop face 5301b that boot wing (5445b, 5445c) (refer to FIG. 54) engages when boot assembly 5345a is pulled in a distal direction fully to release connector 5300 from a receptacle as shown in FIG. 57.

Figure 54:
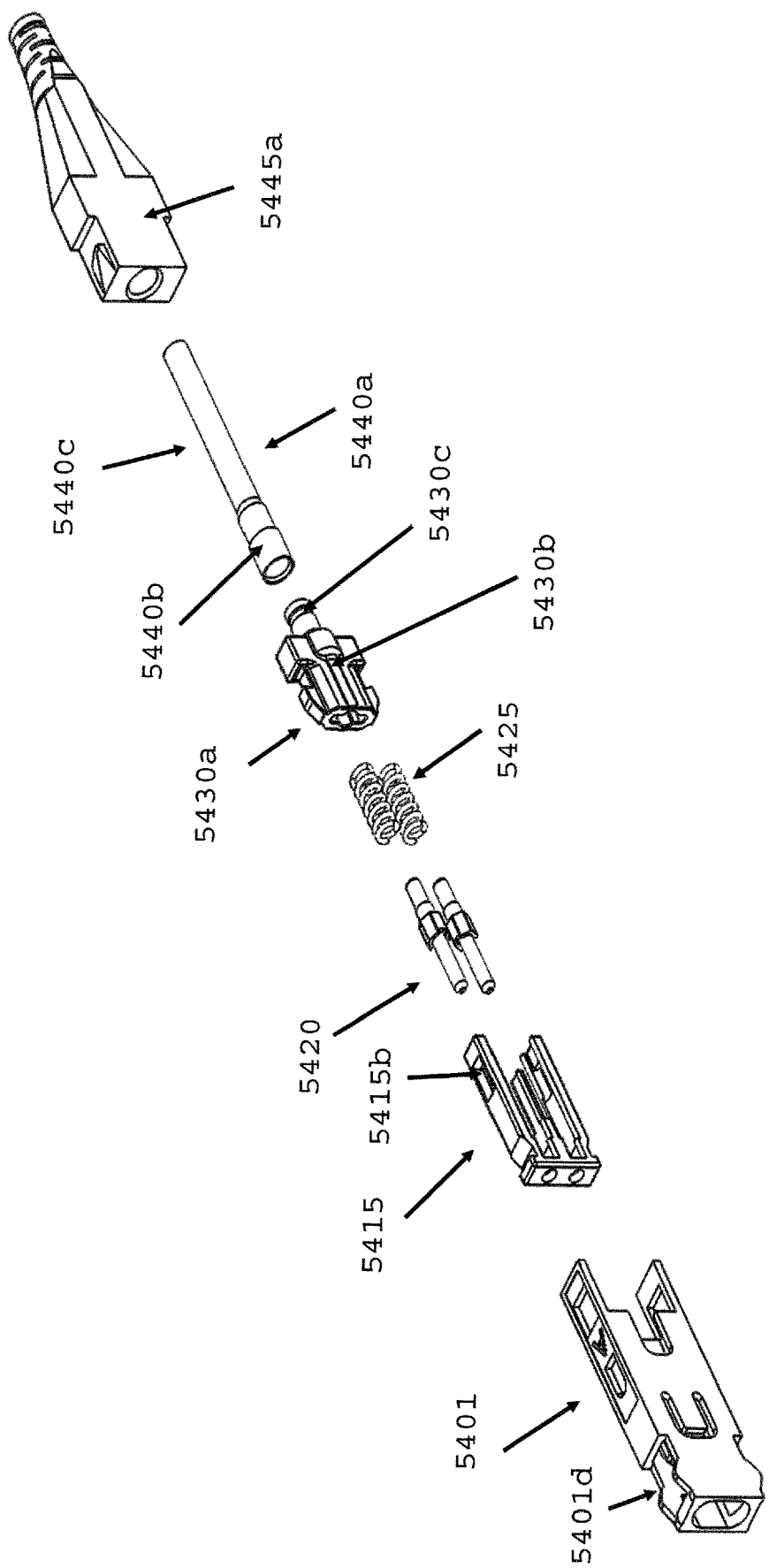
FIG. 54 is an exploded view of FIG. 53 connector.

FIG. 54 depicts an exploded view of connector 5300 of FIG. 53. Boot assembly 5445a accepts crimp ring assembly 5440a having a protective tube 5440c covering fiber strands and a crimp ring 5440b secured to a back post 5430c of back body assembly 5430a including a back body 5430b. A pair of springs 5425 are placed over a corresponding ferrule assembly 5420 comprising a ferrule and ferrule flange. The ferrule assembly and springs are held within front body 5415 by back body assembly 5430a, as described for connector 2400. The front body 5415 is inserted into a distal opening of outer housing 5401 with boot assembly wing 5545a secured with a distal opening 5301a of outer housing.

Figure 55:
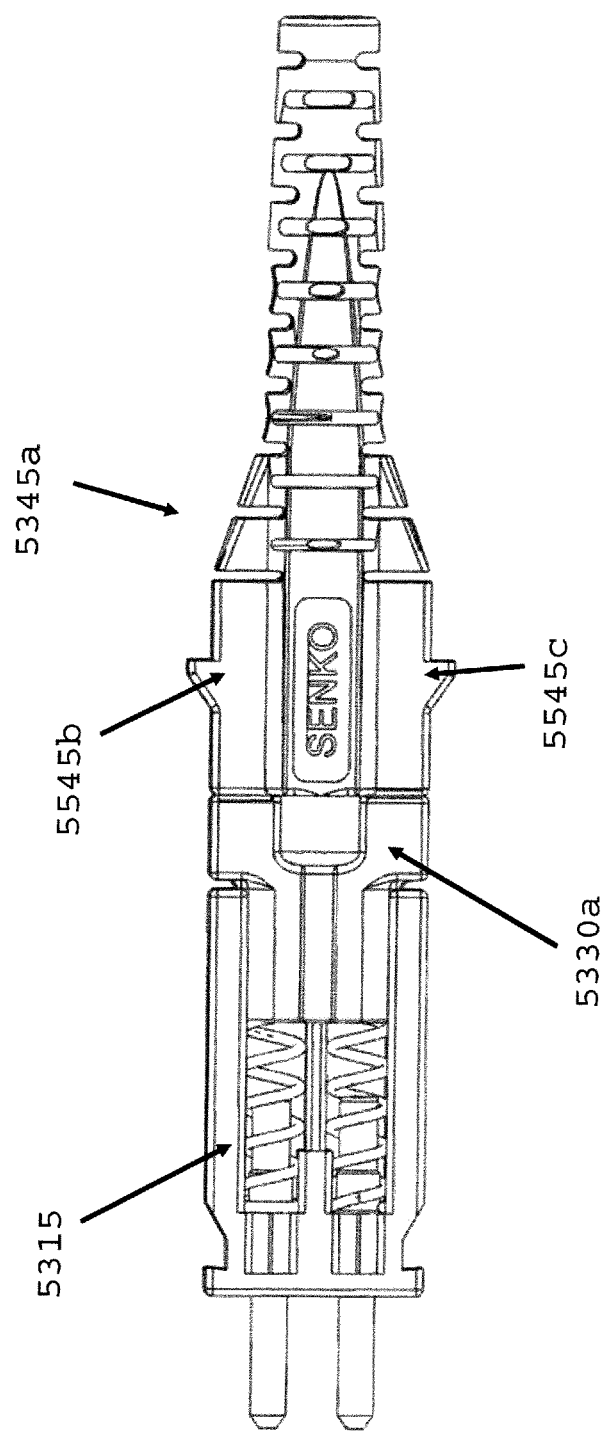
FIG. 55 is a side perspective view of connector of FIG. 53 without an outer housing.

FIG. 55 depicts connector of FIG. 53 without its outer housing 5301, in an assembled configuration. Boot assembly 5345a is secured on back post 5430c of back body 5330a via crimp ring 5440a, as described in FIG. 54. Wings (5545b, 5545c) secure FIG. 55 assembly within outer housing 5301, and during release of connector 5300 from a receptacle, wings (5545b, 5545c) pull back outer housing a specific distance "d", which releases hook 5625 that is seated in recess 5611 (refer to FIG. 56), while connector 5300 is secured within receptacle 2400.

Figure 56:
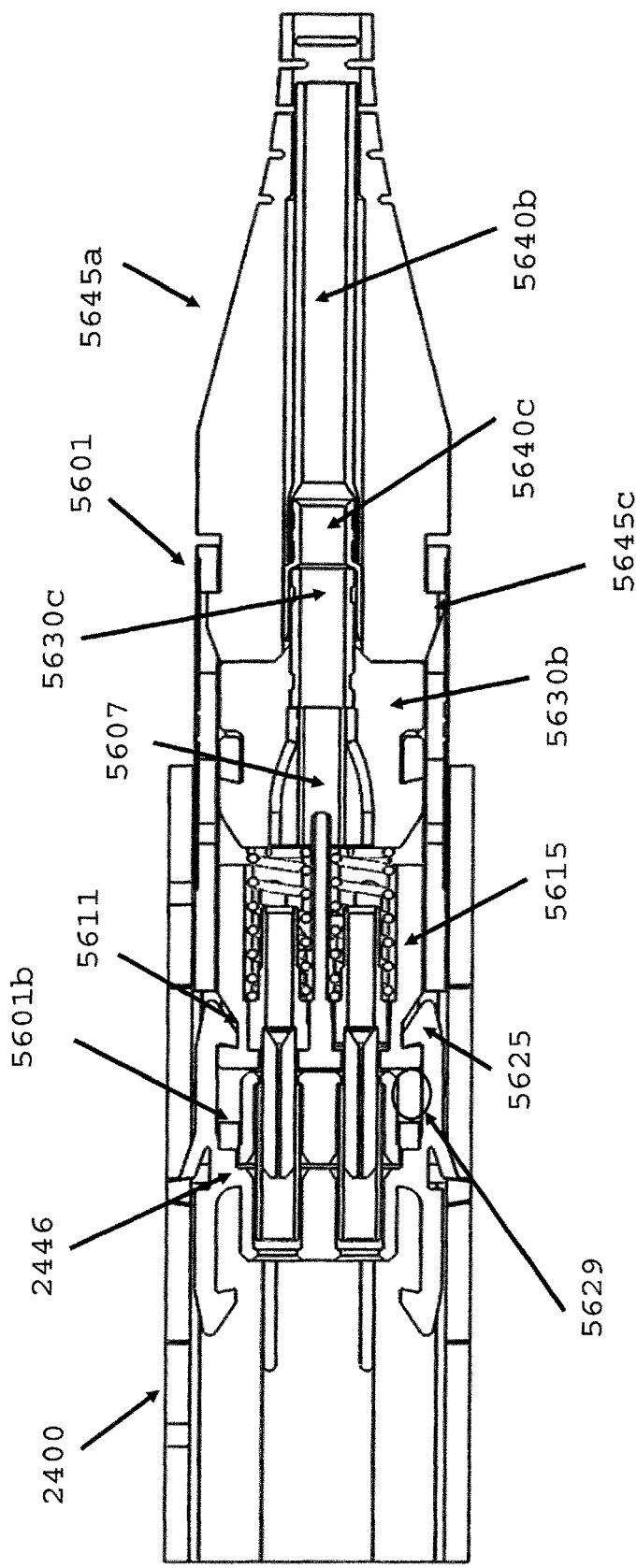
FIG. 56 is a cross-section view of connector of FIG. 53 latched into a receptacle.

FIG. 56 depicts connector 5300 secured within receptacle 2400 of FIG. 24. Receptacle hook or latch 5625 rests in connector recess 5611 formed within front body 5615, at its proximal end. A gap of distance "d" 5629 limits travel of outer housing 5601 as boot release 5645a wings (5645b, 5545b) engage 5301b stop face of outer housing 5601. Crimp ring 564c is shown secured to back post 5630c. Back body 5630b is secured within front body 5615 distal openings 5451b (FIG. 54).

Figure 58:
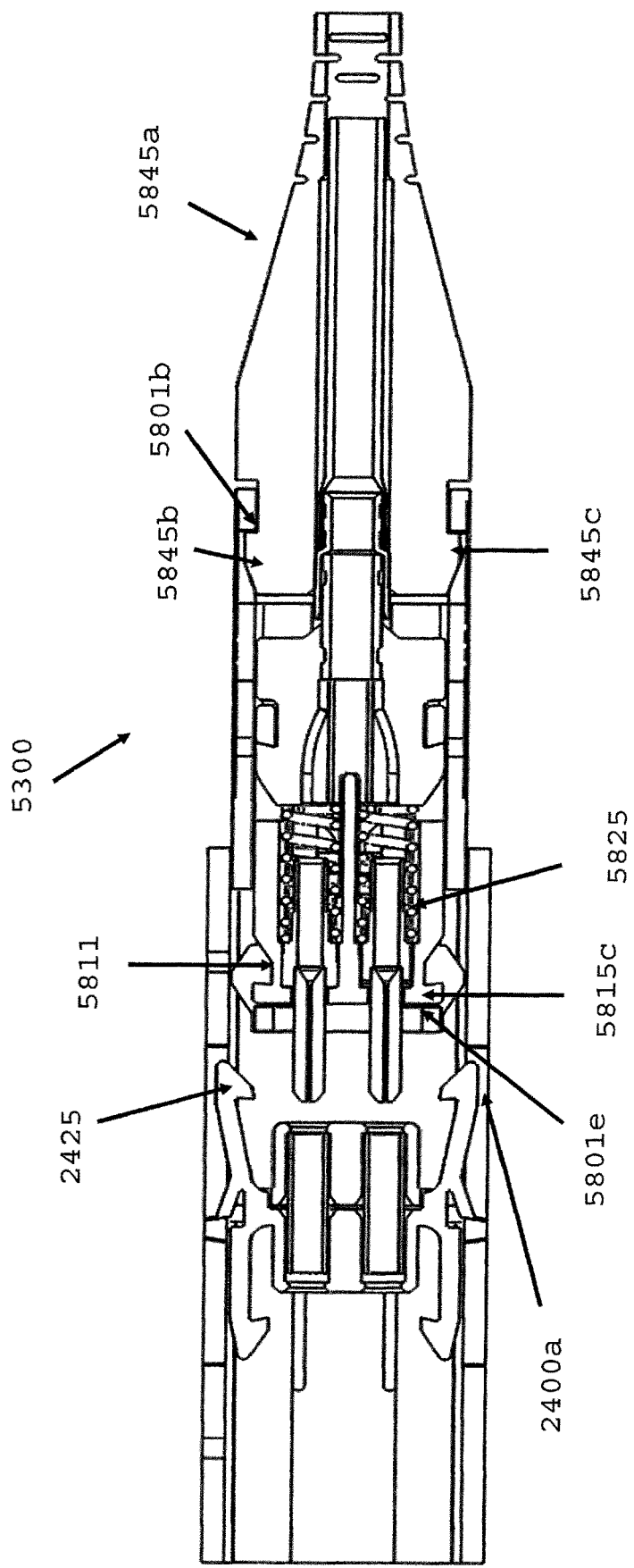
FIG. 58 is a cross-section view of connector of FIG. 53 released from receptacle inner latches or hooks of FIG. 24.

FIG. 57 depicts connector 5300 being removed or pulled out of receptacle 2400 in direction "P". Hook or latch 2425 within receptacle housing lifts out of recess 5711 along front body ramp 5401d (FIG. 54), as boot assembly is being pulled rearward or in a distal direction. Gap 5529 is closed as shown in FIG. 57. Inner face of connector housing 5715c is flush with front face of front body 5701e, which stops travel of boot assembly and is configured to ensure hook 2425 is displaced from recess 5711 to release connector from receptacle, as shown in FIG. 58. FIG. 58 depicts connector 5300 removed from receptacle 2400 using boot assembly 5845a. Wings (5845b, 5845c) are flush with outer housing face 5801b. Spring 2825 bias forward front body face 5815c to be flush with front body face 5801e. Hook or latch 2425 is displaced from recess 5811, and hook resides in a gap 2400a within outer housing of receptacle 2400.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A reconfigurable optical connector for holding two or more LC-type optical ferrules, comprising:
   a removable outer housing having a longitudinal bore;
   at least one inner front body removably received in the outer housing longitudinal bore, the inner front body supporting two LC-type optical ferrules;
   ferrule springs for urging the optical ferrules towards a mating receptacle;
   a back body for supporting the ferrule springs;
   a back body post configured to accept a crimp ring inserted within a proximal end of a boot assembly;
   boot assembly including at least one wing configured to be received in an opening within removable outer housing for securing outer housing and front body with boot assembly; and
   wherein pulling boot assembly in a distal direction displaces a receptacle hook of the mating receptacle to release the connector from the mating receptacle;
   wherein the inner front body comprising top and bottom portions with open sidewalls.

2. The reconfigurable optical connector of claim 1, further comprising a flap in the outer housing having a retainer on the inner side thereof for holding the front body to the outer housing.

3. The reconfigurable optical connector of claim 1, further comprising a wall in the front body for separating the ferrule springs from each other.

4. The reconfigurable optical connector of claim 1, further comprising protective tubing around fiber strands from a fiber cable secured within boot assembly at a distal end thereof.

5. The reconfigurable optical connector of claim 1, wherein back body is configured to be secured within a distal opening of front body.

6. The reconfigurable optical connector of claim 1, wherein the inner front body includes an alignment tab for aligning with a receiving recess on the back body.

7. The reconfigurable optical connector of claim 1, wherein the outer housing is configured to hold four LC-type optical ferrules in two inner bodies.

8. The reconfigurable optical connector of claim 1, wherein the outer housing is configured to hold eight LC-type optical ferrules in four inner bodies.

9. An optical cable terminating in the reconfigurable optical connector of claim 1.

10. A method of reconfiguring an optical cable, comprising:
    providing the optical cable of claim 9;
    removing the outer housing;
    inserting the inner front body, ferrules, ferrule springs, back body assembly, and boot assembly into at least one second outer housing, the second outer housing having greater or lesser optical ferrule capacity than the outer housing.

11. The method of reconfiguring an optical cable according to claim 10, wherein the outer housing has a two-ferrule capacity and the second outer housing has a four-ferrule or eight-ferrule capacity.

12. The method of reconfiguring an optical cable according to claim 10, wherein the outer housing has a four-ferrule capacity and the at least one second outer housing comprises two second housings, each of the two second housings having a two-ferrule capacity.

13. The method of reconfiguring an optical cable according to claim 10, wherein the outer housing has an eight-ferrule capacity and the at least one second outer housing comprises four second housings, each of the four second housings having a two-ferrule capacity.

14. The method of reconfiguring an optical cable according to claim 10, wherein the outer housing has an eight-ferrule capacity and the at least one second outer housing comprises two second housings, each of the two second housings having a four-ferrule capacity.

15. The method of reconfiguring an optical cable according to claim 10, wherein the outer housing has an eight-ferrule capacity and the at least one second outer housing comprises three second housings, one of the three second housings having a four-ferrule capacity and two of the three second housings having a two-ferrule capacity.

16. The reconfigurable optical connector of claim 1, wherein the inner front body comprising top and bottom portions with open sidewalls.

17. The reconfigurable optical connector of claim 1, wherein the inner front body comprises a receptacle hook recess configured to receive the receptacle hook from the mating receptacle.

* * * * *